US008351087B2

(12) United States Patent
Amidror et al.

(10) Patent No.: US 8,351,087 B2
(45) Date of Patent: Jan. 8, 2013

(54) AUTHENTICATION WITH BUILT-IN ENCRYPTION BY USING MOIRE PARALLAX EFFECTS BETWEEN FIXED CORRELATED S-RANDOM LAYERS

(75) Inventors: Isaac Amidror, Lausanne (CH); Roger D. Hersch, Epalinges (CH)

(73) Assignee: Ecole Polytechnique Federale de Lausanne (EPFL), Lausanne (CH)

( * ) Notice: Subject to any disclaimer, the term of this patent is extended or adjusted under 35 U.S.C. 154(b) by 877 days.

(21) Appl. No.: 12/456,263

(22) Filed: Jun. 15, 2009

(65) Prior Publication Data

US 2010/0314861 A1 Dec. 16, 2010

(51) Int. Cl.
*H04N 1/40* (2006.01)

(52) U.S. Cl. ...................................... 358/3.28; 358/3.29

(58) Field of Classification Search ................. 358/3.28, 358/1.18, 1.9, 2.1, 3.29–3.32; 382/100, 135, 382/137, 181; 283/91, 93–94, 107, 902; 359/619–627

See application file for complete search history.

(56) References Cited

U.S. PATENT DOCUMENTS 2,432,896 A 12/1947 Hotchner
2,833,176 A 5/1958 Ossoinak
4,761,253 A 8/1988 Antes
4,984,824 A 1/1991 Antes
5,018,767 A 5/1991 Wicker
5,032,003 A 7/1991 Antes
5,113,213 A 5/1992 Sandor et al.
5,275,870 A 1/1994 Halope et al.
5,396,559 A 3/1995 McGrew
5,708,717 A 1/1998 Alaisia
5,712,731 A 1/1998 Drinkwater et al.
5,995,638 A 11/1999 Amidror
5,999,280 A 12/1999 Huang
6,249,588 B1 6/2001 Amidror
6,286,873 B1 9/2001 Seder (Continued)

FOREIGN PATENT DOCUMENTS

GB 1138011 12/1968

(Continued)

OTHER PUBLICATIONS

I. Amidror, R.D. Hersch, Fourier-based analysis and synthesis of moires in the superposition of geometrically transormed . . . ; J. Opt. Soc. Am. A, vol. 15, 1998, pp. 1100-1113.

(Continued)

*Primary Examiner* — Thomas D Lee
*Assistant Examiner* — Stephen M Brinich

(57) ABSTRACT

This invention discloses new methods and security devices for authenticating documents and valuable products which may be applied to any support, including transparent synthetic materials and traditional opaque materials such as paper. The invention relates to parallax moire shapes which occur in a compound layer consisting of the superposition of specially designed and possibly geometrically transformed s-random base layer and s-random revealing layer with a small gap between them. The base and revealing layers are formed respectively by base layer element shapes and revealing layer sampling elements positioned at s-random locations, where the base layer locations and the revealing layer locations are strongly correlated. When tilting the compound layer or changing the viewing angle, a parallax moire intensity profile of a chosen shape is seen moving in the superposition, thereby allowing the authentication of the document. A major advantage of the present invention is in its intrinsically incorporated encryption system due to the arbitrary choice of the s-random number sequences used for defining the positions of the specially designed base layer element shapes and revealing layer sampling elements that are used in this invention.

34 Claims, 36 Drawing Sheets

U.S. PATENT DOCUMENTS

| | | | |
|---|---|---|---|
| 6,494,491 B1 | 12/2002 | Zeiter et al. | |
| 6,819,775 B2 | 11/2004 | Amidror | |
| 7,054,038 B1 | 5/2006 | Ostromoukhov | |
| 7,058,202 B2 | 6/2006 | Amidror | |
| 7,194,105 B2 | 3/2007 | Hersch | |
| 7,265,775 B2 | 9/2007 | Hirayama | |
| 7,295,717 B2 | 11/2007 | Hersch et al. | |
| 7,305,105 B2 | 12/2007 | Chosson | |
| 7,333,268 B2 | 2/2008 | Steenblik et al. | |
| 7,468,842 B2 | 12/2008 | Steenblik et al. | |
| 2006/0003295 A1 | 1/2006 | Hersch | |
| 2006/0129489 A1 | 6/2006 | Hersch | |
| 2008/0036196 A1 | 2/2008 | Steenblik et al. | |
| 2008/0037131 A1 | 2/2008 | Steenblik et al. | |

FOREIGN PATENT DOCUMENTS

GB 2224240 A 5/1990

OTHER PUBLICATIONS

I. Amidror, The Theory of the Moire Phenomenon; Kluwer Academic Publishers, 2000.

I. Amidror, The Theory of the Moire Phenomenon vol. II: Aperiodic layers; Springer, May 2007.

I. Amidror, A generalized Fourier-based method for the analysis of 2D moire envelope-forms in screen superpositions; J. of Modern Optics, vol. 41, 1994, pp. 1837-1862.

I. Amidror, Moire patterns between aperiodic layers: quantitative analysis and synthesis; J. Opt. Soc. Am. A, vol. 20, 2003, pp. 1900-1919.

I. Amidror, Glass patterns as moire effects: new surprising results; Optics Letters, vol. 28, 2003, pp. 7-9.

I. Amidror, Glass patterns in the superposition of random line gratings; J. of Optics A, vol. 5, 2003, pp. 205-215.

I. Amidror, Unified approach for the explanation of stochastic and periodic moires; J. of Electronic Imaging, vol. 12, 2003, pp. 669-681.

J. Huck, Moire patterns and the illusion of depth; Proc. of the fifth Interdisciplinary Conf. of the International Soc. of Arts, Math. and Architecture, Chicago, Jun. 2004.

S. H. Kaplan, Theory of parallax barriers; J. of the SMPTE, vol. 59, 1952, pp. 11-21.

M. Hutley, R. Stevens, D. Daly, Microlens arrays; Physics World, Jul. 1991, pp. 27-32.

O. Mikami, New imaging functions of moire by fly's eye lenses; Japan J. of Applied Physics, vol. 14, 1975, pp. 417-418.

O. Mikami, New image-rotation using moire lenses; Japan J. of Applied Physics, vol. 14, 1975, pp. 1065-1066.

R. Van Renesse, Optical Document Security; Artech House, 1998 (second edition), pp. 207-211.

V. Ostromoukhov, R. D. Hersch, Multi-color and artistic dithering; SIGGRAPH Annual Conference, 1999, pp. 425-432.

B. Saleh, M. C. Teich, Fundamentals of Photonics; John Wiley, 1991, p. 116.

Roger D. Hersch, Sylvain Chosson, Band moiré images; Proc. SIGGRAPH 2004, ACM Trans. on Graphics vol. 23, No. 3, pp. 239-248.

AUTHENTICATION WITH BUILT-IN ENCRYPTION BY USING MOIRE PARALLAX EFFECTS BETWEEN FIXED CORRELATED S-RANDOM LAYERS

BACKGROUND OF THE INVENTION

The present invention relates generally to the field of anti-counterfeiting and authentication methods and devices and, more particularly, to methods and security devices for authentication of documents and valuable products using the moire parallax effect.

Counterfeiting of documents such as banknotes, checks, identity cards, travel documents, etc. is becoming now more than ever a serious problem, due to the availability of high-quality and low-priced color photocopiers and desk-top publishing systems. The same is also true for other valuable products such as watches, CDs, DVDs, software products, industrial products, medical drugs, etc., that are often marketed in easy to counterfeit packages.

The present invention is therefore concerned with providing a novel security element and authentication means offering enhanced security for documents or articles needing to be protected against counterfeits.

Various sophisticated means have been introduced in prior art for counterfeit prevention and for authentication of documents or valuable products. Some of these means are clearly visible to the naked eye and are intended for the general public, while other means are hidden and only detectable by the competent authorities, or by automatic devices. Some of the already used anti-counterfeit and authentication means include the use of special paper, special inks, watermarks, micro-letters, security threads, holograms, etc. Nevertheless, there is still an urgent need to introduce further security elements, which do not considerably increase the cost of the produced documents or goods.

Moire effects have already been used in prior art for the authentication of documents. For example, United Kingdom Pat. No. 1,138,011 (Canadian Bank Note Company) discloses a method which relates to printing on the original document special elements which, when counterfeited by means of halftone reproduction, show a moire pattern of high contrast. Similar methods are also applied to the prevention of digital photocopying or digital scanning of documents (for example, U.S. Pat. No. 5,018,767 (Wicker), or U.K. Pat. Application No. 2,224,240 A (Kenrick & Jefferson)). In all these cases, the presence of moire patterns indicates that the document in question is counterfeit.

Other prior art methods, on the contrary, take advantage of the intentional generation of a moire pattern whose existence, and whose precise shape, are used as a means of authenticating the document. One known method in which a moire effect is used to make visible an image encoded on the document (as described, for example, in the section "Background" of U.S. Pat. No. 5,396,559 (McGrew), U.S. Pat. No. 5,708,717 (Alasia) and U.S. Pat. No. 5,999,280 (Huang)) is based on the physical presence of that image on the document as a latent image, using the technique known as "phase modulation". In this technique, a uniform line grating or a uniform screen of dots is printed on the document, but within the pre-defined borders of the latent image on the document the same line grating (or respectively, the same dot-screen) is printed in a different phase, or possibly in a different orientation. For a layman, the latent image thus printed on the document is hard to distinguish from its background; but when a revealing layer comprising an identical, but unmodulated, line grating (respectively, dot-screen) is superposed on the document, thereby generating a moire effect, the latent image pre-designed on the document becomes clearly visible, since within its pre-defined borders the moire effect appears in a different phase than in the background. However, this previously known method has the major flaw of being simple to simulate, since the form of the latent image is physically present on the document and only filled by a different texture. The existence of such a latent image on the document will not escape the eye of a skilled person, and moreover, its imitation by filling the form by a texture of lines (or dots) in an inversed (or different) phase can easily be carried out by anyone skilled in the graphics arts. A second limitation of phase modulation methods resides in the fact that they do not provide a dynamic visual effect such as scrolling, magnification, rotation, etc.: the image revealed by the superposition of the base layer and the revealing layer is always fixed, and it has precisely the same shape, location, size and orientation as the latent image that is embedded in the document.

U.S. Pat. No. 7,305,105 (Chosson and Hersch) teaches an authenticating method relying on a superposition image obtained when superposing a base layer embedding a shape elevation profile and a revealing layer formed by transparent lines. The superposition image then yields the shape elevation profiles level lines. But here, too, the image obtained by the superposition cannot be shifted by moving the revealing layer.

Other moire based methods, in which the presence of moire intensity profiles indicates the authenticity of the document, have been disclosed by Amidror and Hersch (the present inventors) in U.S. Pat. No. 6,249,588 and its continuation-in-part U.S. Pat. No. 5,995,638, both of which are herein fully incorporated by reference. These methods completely differ from the above mentioned techniques, since no phase modulation is used, and furthermore, no latent image is present on the document. On the contrary, all the spatial information which is made visible by the moire intensity profiles according to the inventions of Amidror and Hersch is encoded in the specially designed forms of the individual dots which constitute the dot-screens. These inventions are based on specially designed two-dimensional periodic structures, such as dot-screens (including variable intensity dot-screens such as those used in real, full gray level or color halftoned images), pinhole-screens, or microlens arrays, which generate in their superposition two-dimensional periodic moire intensity profiles of any chosen colors and shapes (letters, digits, the country emblem, etc.) whose size, location and orientation gradually vary as the superposed layers are rotated or shifted on top of each other.

In a third invention, U.S. Pat. No. 6,819,775, which is herein fully incorporated by reference, the present inventors disclosed new methods improving their previously disclosed methods mentioned above, and which make them even more difficult to counterfeit. These new improvements make use of the theory developed in the paper "Fourier-based analysis and synthesis of moires in the superposition of geometrically transformed periodic structures" by I. Amidror and R. D. Hersch, Journal of the Optical Society of America A, Vol. 15, 1998, pp. 1110-1113, and in the book "The Theory of the Moire Phenomenon" by I. Amidror, Kluwer, 2000. Based on this theory, said third invention discloses how to use geometric transformations of originally periodic structures which in spite of being aperiodic in themselves, still generate, when they are superposed on top of one another, periodic moire intensity profiles with clearly visible and undistorted elements, just like in the periodic cases disclosed by Amidror and Hersch in their previous U.S. Pat. Nos. 6,249,588 and 5,995,638. Furthermore, it was disclosed there how even cases which do not yield periodic moires can still be advantageously used for anticounterfeiting and authentication of documents and valuable products.

Yet a different category of moire based methods in which the presence of moire intensity profiles indicates the authenticity of the document has been disclosed by Hersch et al. in U.S. Pat. No. 7,194,105, in U.S. patent application Ser. No. 10/879,218 filed Jun. 30 2004 and Ser. No. 11/349,992 filed Feb. 9 2006, and in U.S. Pat. No. 7,295,717, all of which are herein fully incorporated by reference. These methods are based on the fact that an originally periodic rectilinear (but possibly geometrically transformed) base band grating incorporating any chosen original shapes superposed with an appropriately designed originally periodic rectilinear (but possibly geometrically transformed) revealing layer yield in their superposition rectilinear moire bands comprising moire shapes which are a magnified transformation of the original shapes incorporated within the base band grating. Here, too, the resulting moire effects dynamically move across the superposition as the revealing layer is shifted on top of the base layer, in contrast to the above mentioned phase modulation methods. Patent application Ser. No. 11/349,992 mentions explicitly the possibility of having a fixed setup of base and revealing layers separated by a gap, which upon tilting, generates dynamically moving repetitive moire bands.

A further invention, U.S. Pat. No. 7,058,202 (Amidror), herein fully incorporated by reference, is based on the fact that if, instead of superposing two periodic or repetitive geometrically transformed dot screens, we superpose two specially designed random or pseudorandom dot-screens which are fully or partially correlated, a moire intensity profile will be generated in the superposition, which is not repeated throughout, as in the periodic or repetitive cases, but consists of one instance of the moire intensity profile whose size, location and orientation gradually vary as the superposed layers are rotated or shifted on top of each other, again, in contrast to the above mentioned phase modulation methods.

It should be stressed that the moire based methods developed by the present inventors completely differ from the above mentioned phase modulation techniques since in our methods no latent image is present, and the moire patterns resulting from the superposition of a base layer and a revealing layer are a transformation of the original pattern shapes embedded within the individual elements (dots or lines) of the base layer. This transformation comprises always an enlargement, and possibly a rotation, a shearing, a mirroring, and/or a bending transformation. In addition, in our methods, translating or rotating the revealing layer on top of the base layer yields a dynamic displacement, rotation or magnification of the moire intensity profiles. Phase modulation techniques are not capable of smoothly displacing, rotating or otherwise transforming the revealed latent image when the revealing layer is moved on top of the base layer.

Another moire based method, in which the presence of moire patterns indicates the authenticity of the document, has been disclosed by Drinkwater et al. in U.S. Pat. No. 5,712,731. In this patent a moire based method is disclosed which relies on periodic 2D microlens arrays. But this disclosure has the disadvantage of being limited to the case where the superposed revealing layer is a periodic microlens array and the base layer on the document is a periodic constant 2D array of identical dot-shapes that are replicated horizontally and vertically. Thus, in contrast to the inventions of Amidror and Hersch, this disclosure excludes the use of dot-screens or pinhole-screens as revealing structures, as well as the use on the document of full, real halftoned images with varying tone levels (such as portraits, landscapes, etc.), either in full gray levels or in color, that are made of halftone dots of varying sizes and shapes—which are the core of the methods disclosed by Amidror and Hersch, and which make them so difficult to counterfeit. Similar 2D microlense arrays are also disclosed by Steenblik et al. in U.S. Pat. No. 7,333,268, filed Nov. 22, 2004, U.S. patent application Ser. No. 11/438,081, priority May 18, 2005, and U.S. patent application Ser. No. 11/770,592, filed 28 Jun. 2007. These inventions also consider a compound layer of a periodic microlens array and a periodic dot shape array separated by a gap, where, thanks to the well-known parallax effect, changing the observation orientation has the effect of moving or changing the size of the resulting 2D moire patterns. But neither of these inventions can be applied to the case where the two layers of the compound layer are not periodic but rather correlated random (or pseudo-random) layers, as disclosed for the first time in the present invention.

It should be mentioned that the well-known parallax effect has been also used in many other applications, for example for the generation of 3D displays or imaging systems (like in U.S. Pat. No. 7,265,775 (Hirayama) or U.S. Pat. No. 5,113,213 (Sandor et al.)); for various animation displays (like in U.S. Pat. No. 2,432,896 (Hotchner), U.S. Pat. No. 2,833,176 (Ossoinak) or U.S. Pat. No. 6,286,873 (Seder)); for postcards, keyholders or toys that show two or more distinct images when they are being tilted; etc. But these devices are not based on moire intensity profiles, but rather on a completely different technique, where the device contains interleaved stripes (or dots) from two or more predesigned latent images; when viewed through an appropriate line grating or lenticular revealing layer, these stripes (or dots) are integrated by the viewer's eyes thanks to the parallax effect into slightly different views, thus producing a typical 3D or kinematic effect. Yet another technique, also unrelated to moire intensity profiles, appears in U.S. Pat. No. 6,494,491 where Zeiter et al. disclose a further variant of the phase modulation technique mentioned above that is based on the parallax effect: it consists of having similar periodic line segments printed in registration on two sides of a thin transparent layer of a certain width; thanks to the parallax effect the superposition of both layers can be viewed either in phase or out of phase depending on the observation angle. But in all of these previous applications parallax effects were obtained with periodic revealing layers. And indeed, the surprising fact that parallax effects can generate moire intensity profiles between two correlated random or pseudo-random layers (such as random dot screens or random line gratings) was not known until now, and it is disclosed for the first time in the present Application, thus making it clearly distinct from all prior art applications that are based on the well-known parallax effect between periodic layers.

Finally, it should be noted that our present invention is completely different from the 3D nonwoven random structure mentioned in p. 211 of the book "Optical Document Security" edited by R. van Renesse, Artech House, 1998, second edition (hereinafter, [Renesse98]). In that invention, a machine-readable 3D random pattern is generated by mounting two layers containing a nonwoven structure of randomly placed fibers in both sides of a transparent window in the security document. An optical sensor captures two images of the random structure under different viewing angles. Because the document has a certain depth (approximately 0.3 mm) the two captured random images are distinctly different due to parallax effect; this parallax is an authentication measure of the document. As clearly understood, in that invention the images obtained by the optical sensor consist of a random pattern of fibers, which are only machine-detectable but not intelligible to the eye. In our present invention, on the contrary, the random layers consist of randomly located tiny elements (dots or lines) having specially designed shapes (for example, letters, digits, logos, etc.), and the parallax moire effect that is obtained consists of a magnified version of these shapes that are easily observed and recognized by the viewer, and which dynamically change (scroll, rotate, etc.) according to the viewing angle.

SUMMARY OF THE INVENTION

The present invention relates to new methods and security devices for authenticating documents (such as banknotes, trust papers, securities, identification cards, passports, credit cards, security labels, etc.) or other valuable products (such as optical disks, CDs, DVDs, software products, medical products, watches, clocks, hand-held phones, hand-held computers, etc.), by means of s-random moire parallax effects.

The parallax effect between two repetitive layers is well known in the art, and it has been used for many different applications, as explained above in the section "Background of the invention". In the present invention, however, it is disclosed for the first time that moire parallax effects can be also obtained between two layers which are not repetitive but rather random or pseudo-random, if the random element locations in the two layers are correlated. This new discovery that the parallax moire effect also generates intensity profiles in the case of correlated random layers now opens the way to the introduction of new powerful authentication and anti-counterfeiting methods and devices which are disclosed for the first time in the present invention. The main difference between the repetitive case and the random case is that in the repetitive case the dynamic parallax moire effect that is obtained is repetitive, while in the random case the dynamic parallax moire effect consists of only one instance of the repetitive effect that is obtained in the repetitive case.

It is therefore an aim of the present invention to show how we can advantageously use for the authentication of documents and valuable products parallax moire effects which occur in a compound layer consisting of two correlated 2D or 1D random layers (a base layer and a revealing layer) that are fixed together with a certain small distance (gap).

A major advantage of the 2D or 1D random moire methods used in the present invention is in their intrinsically incorporated encryption system due to the arbitrary choice of the random number sequences for the generation of the specially designed random dot screens (or line gratings) that are used in this invention.

Throughout the present disclosure the terms "random screen", "random grating", "random base layer", "random revealing layer", "random microlens array", etc. should be understood as screens, gratings, microlens arrays, etc. whose individual elements are located arbitrarily, not in a strictly periodic way. Their element locations can be determined in various different ways, for example by using random, pseudo-random, or deterministic methods (including aperiodic sequences such as Fibonacci series, or even aperiodic sequences modulo k that repeat after k elements), which are used either directly to determine the element locations or indirectly by applying perturbations to an underlying periodic lattice of element locations. To clearly reflect this intended largest possible meaning, the terms "s-random" and "simili-random" are also used interchangeably as synonyms throughout the present disclosure, englobing all the possible variants of the traditional terms "random", "pseudo-random", "non-repetitive", "non-periodic deterministic", etc., as explained above.

Furthermore, throughout the present disclosure the terms "moire", "moire shape", "moire intensity profile", and "moire shape intensity profile" are used interchangeably as synonyms.

Also, the term "base layer element shape instances" means either "s-random dot shapes" or "s-random base band elements", and the term "underlying periodicity" means the periodicity of an original structure before it has been s-randomly perturbed.

The term "cylindric microlens array" (hereinafter also called "1D microlens array" or "1D microlens") refers to cylindric microlenses capable of sampling lines of the underlying base layer and making the sampled base layer lines visible to the observer. They generally have a cylindric shape, but they can have other shapes as well. The cylindric microlenses need not be continuous. They may be composed of separate cylindric segments.

Moreover, we use the terms "bent" and "curvilinear" interchangeably, and the terms "unbent" and "rectilinear" are also used as synonyms.

Also, throughout this disclosure the terms "valuable item" or "valuable product" stand for any valuable document (such as banknotes, checks, trust papers, securities, identification cards, passports, credit cards, security labels, etc.) or valuable article (such as optical disks, CDs, DVDs, software products, medical products, watches, industrial packages, luxury products, hand-held phones, hand-held computers, etc.).

Finally, the terms "print" and "printing" refer throughout the present disclosure to any process for depositing, affixing or transferring an image onto a support, including by means of a lithographic, photolithographic, photographic, electrophotographic or any other process (for example: engraving, etching, ablation, perforating, embossing, coating, foil transfer, hot stamping, thin film deposition, de-metallization, laser marking, gluing, serigraphy, offset, flexography, gravure, intaglio, ink jet, thermal transfer, dye sublimation, etc.). Security devices according to the present invention may be used on various supports, including but not limited to transparent synthetic materials.

The disclosed method for creating counterfeit-proof valuable items such as valuable documents and valuable articles relies on a compound layer incorporated into the valuable item. The compound layer displays a dynamically moving single moire shape instance. This compound layer is formed by the superposition of a base layer and a revealing layer with a gap between them. The base layer is an s-random base layer comprising substantially identical (or gradually varying) base layer elements laid out at s-random locations. The revealing layer is an s-random revealing layer comprising substantially identical revealing layer elements laid out at s-random locations, the s-random locations of the revealing layer elements being derived from the s-random locations of the base layer elements. The base layer element locations and the revealing layer element locations are therefore strongly correlated. In one embodiment, the s-random locations are determined by applying s-random perturbations or displacements to a periodic set of locations. When tilting the compound layer, the superposition of said s-random base and revealing layers yields a single moire shape instance, which dynamically varies in its size or orientation and/or moves along a trajectory determined by the respective layouts of the base layer and the revealing layer. In particular, layouts are available where the moire shape moves along a direction substantially perpendicular to the tilting direction.

The method also allows specifying a desired geometrically transformed moire shape layout, generally a curvilinear or bent moire, generated by a geometric transformation from an unbent moire shape layout. The revealing layer may remain untransformed or be transformed according to a desired geometric transformation. Thanks to the mathematical relationship known from moire theory between moire transformation, revealing layer transformation and base layer transformation, the geometric transformation of the base layer is derived from the selected geometric transformations of the moire and of the revealing layer. The resulting moire shapes may move along radial, spiral or any other curvilinear trajectories.

The authenticity of a valuable item (document or article) is first verified by checking in the compound layer the presence of a dynamically moving moire shape. As an optional second level authenticating measure, an additional revealing layer whose layout parameters and s-random displacement values are known to be authentic may be superposed onto the compound layer and the presence of the moire shape instance is checked. If no moire shape instance is visible, then the valuable item is a counterfeit. This second authenticating measure may also be carried out by authenticating software running on a computing device connected to an image acquisition device.

The compound layer may provide additional security by segmenting its base and revealing layers into spatially distinct juxtaposed sub-domains, each sub-domain having its own layout parameters and s-random displacement values. With appropriately conceived base and revealing layer sub-domains, the resulting moire shape produced by the superpositions of respective base and revealing layer sub-domains move together in a coordinated manner when tilting the compound layer.

The base and revealing layers can be also segmented into multiple partially overlapping sub-domains, each sub-domain having its own layout parameters and s-random displacements, and where different sub-domains generate different partially overlapping moire shapes moving along their own trajectories.

As disclosed in U.S. Pat. No. 5,275,870 (Halope et al.) it may be advantageous in the manufacture of long lasting documents or documents which must withstand highly adverse handling to replace paper by synthetic material. Transparent sheets of synthetic materials have been successfully introduced for printing banknotes (for example, Australian banknotes). And indeed, our present invention applies equally well to both a transparent support and an opaque support.

The fact that moire effects generated between superposed base and revealing layers are very sensitive to any microscopic variations in the individual layers makes any document protected according to the present invention practically impossible to counterfeit, and serves as a means to distinguish easily between a real document and a counterfeited one.

It should be noted that the dot-screens or the base band gratings that are generated on the document in accordance with the present invention need not be of a constant intensity level. On the contrary, they may include dots (or base band elements) of gradually varying sizes, widths and shapes, and they can be incorporated (or dissimulated) within any variable intensity halftoned image on the document (such as a portrait, landscape, or any decorative motif, which may be different from the motif generated by the moire effect in the superposition). To reflect this fact, the terms “base layer” and “revealing layer” used hereinafter will also include cases where the base layers (respectively: the revealing layers) are not constant and represent halftoned images. As is well known in the art, the size of the elements (dots or base band elements) in halftoned images determine the intensity levels in the image: larger elements give darker intensity levels, while smaller elements give brighter intensity levels.

In a further important embodiment of the present invention, the moire shape is buried and hidden within background random noise, so that it is not visible when the compound layer is not tilted, and it only appears and becomes visible upon tilting movement of the compound layer (or when the observer is moving). This happens because upon such movements the random background noise randomly varies, and only the parallax moire shape itself is not varied randomly and remains clearly visible against the varying random background noise. This prevents the appearance of the moire shape in counterfeits made by simple image acquisition (e.g. in a photocopy).

Also described in the present disclosure is the multichromatic case, in which the base layers used are multichromatic, thereby generating a multichromatic moire effect.

BRIEF DESCRIPTION OF THE DRAWINGS

The invention will be further described, by way of example only, with reference to the accompanying figures, in which.

DETAILED DESCRIPTION

Figure 1A:
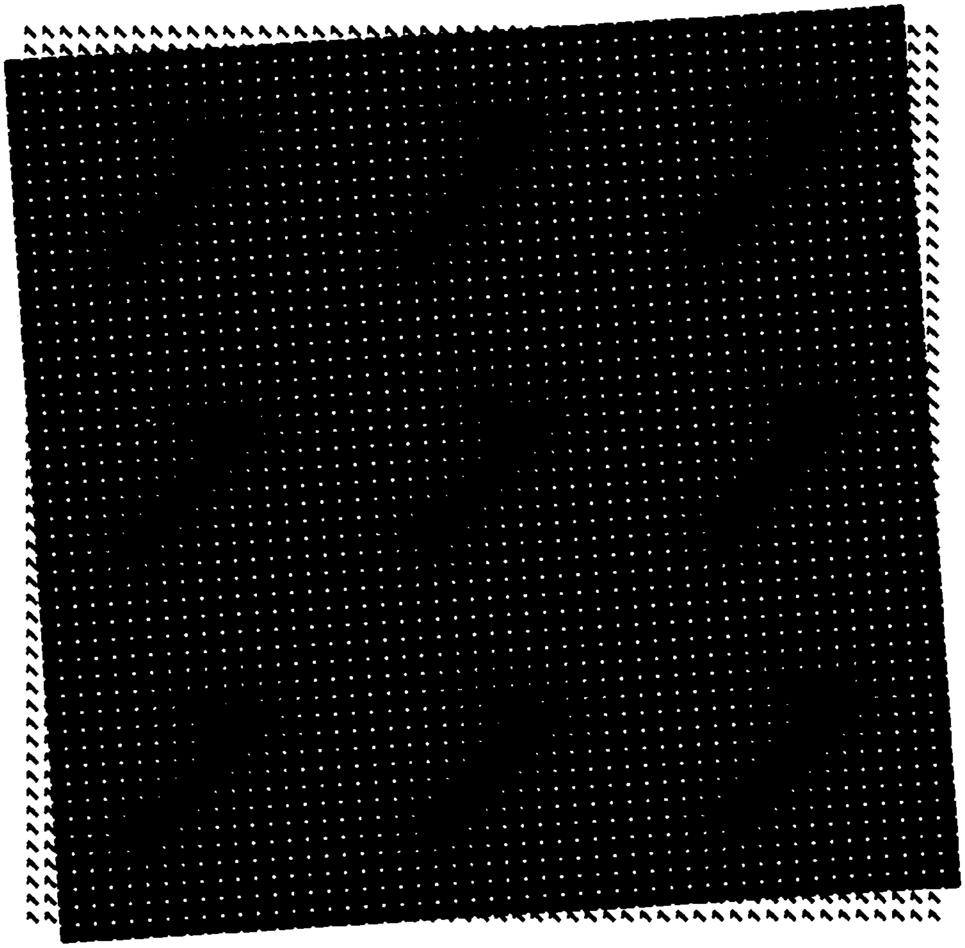
FIG. 1A (prior art) shows a simple example of a moire based method belonging to the category of 2D repetitive moire methods.

The present invention relates to new methods and devices for document or product security which are based on the parallax effects that occur in the cases of 1D random moire or 2D random moire, as disclosed in detail below. But in order to better understand our present disclosure and its advantages, a short review of our previous related disclosures is first provided in the following paragraphs.

In U.S. Pat. Nos. 6,249,588, 5,995,638 and 6,819,775 Amidror and Hersch (the present inventors) disclosed methods for the authentication of documents and valuable articles by using the intensity profile of moire patterns. These methods jointly called hereinafter "2D repetitive moire") are based on the fact that a specially designed 2D repetitive basic dot-screen comprising tiny dots of any chosen color or shape (such as letters, digits, the country emblem, etc.; see, for example, FIG. 1B) superposed with an appropriately designed 2D repetitive revealing layer (such as a pinhole-screen or a microlens array; see, for example, FIG. 1C), yield in their superposition highly magnified 2D repetitive moire intensity profiles of the same chosen shape and color (see FIG. 1A) whose size, location and orientation gradually vary as the superposed layers are rotated or shifted on top of each other.

In U.S. Pat. No. 7,194,105 and in U.S. patent application Ser. No. 10/879,218 filed Jun. 30 2004 and Ser. No. 11/349,992 filed Feb. 9 2006, Hersch et al. disclosed a different family of moire based methods jointly called hereinafter "1D repetitive moire"). These methods are based on the fact that a periodic rectilinear (but possibly geometrically transformed) base band grating incorporating any chosen original shapes (that are highly flattened like in FIG. 2B) superposed with an appropriately designed periodic rectilinear (but possibly geometrically transformed) revealing layer (such as a line grating or a rectilinear 1D microlens array; see FIG. 2C) yield in their superposition rectilinear moire bands comprising moire shapes which are a magnified (unflattened) transformation of the original shapes incorporated within the base band grating (see, in the present example, FIG. 2A). Here, too, the resulting moire effects dynamically move across the superposition as the revealing layer is shifted on top of the base layer, though this movement has less degrees of freedom than in the 2D case. But since band moires have a better light efficiency than moire intensity profiles relying on 2D dots screens, band moire images can be advantageously used in cases where the previous disclosures relying on 2D screens fail to show strong enough moire patterns. In particular, the base band grating incorporating the original pattern shapes may be printed on a reflective support and the revealing line screen may simply be a black (or opaque) film with thin transparent lines. Due to the high light efficiency of the revealing line screen, the band moire patterns can be clearly observed by reflectance, too, and not only by transmittance. A further advantage of band moire images resides in the fact that it may comprise a larger number of symbols, for example one or several words, one or several sophisticated logos, or one or several signs.

Figure 1B:
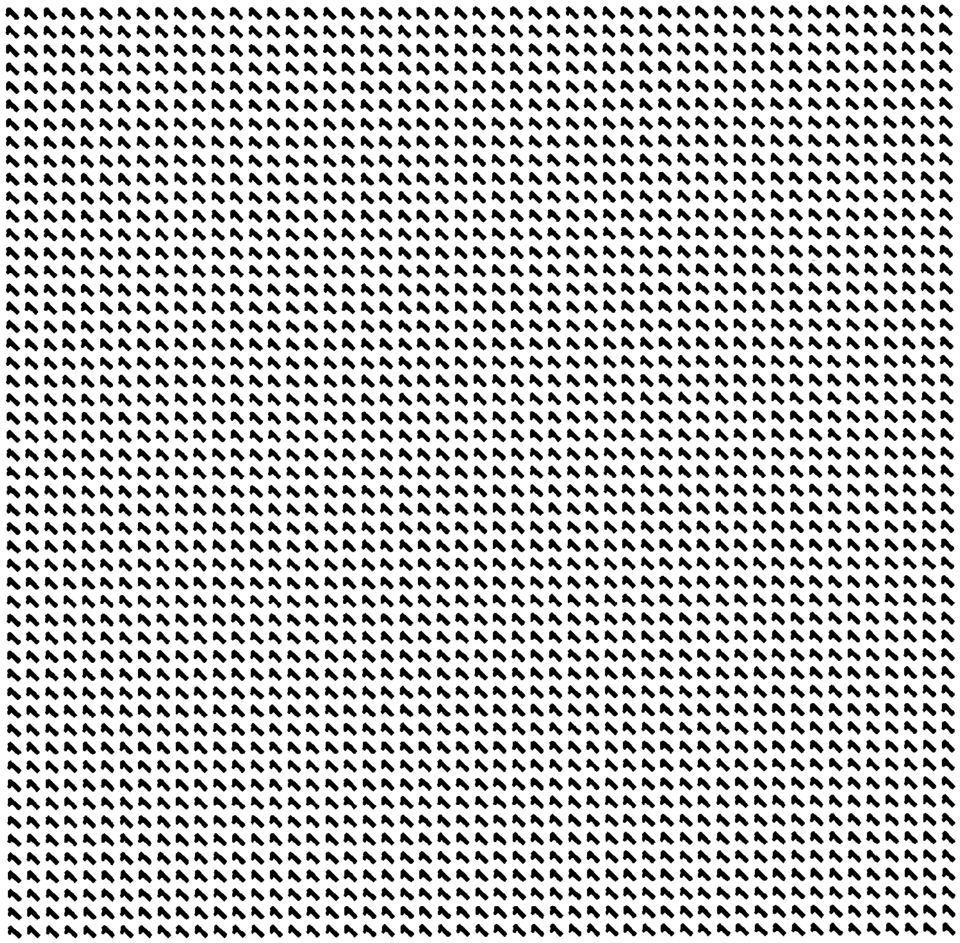
FIG. 1B (prior art) shows the 2D repetitive basic dot screen used in the superposition shown in FIG. 1A.
Figure 1D:
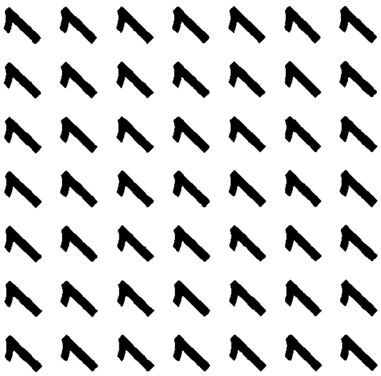
FIGS. 1D and 1E show a magnified view of a small portion of FIGS. 1B and 1C, respectively.
Figure 1C:
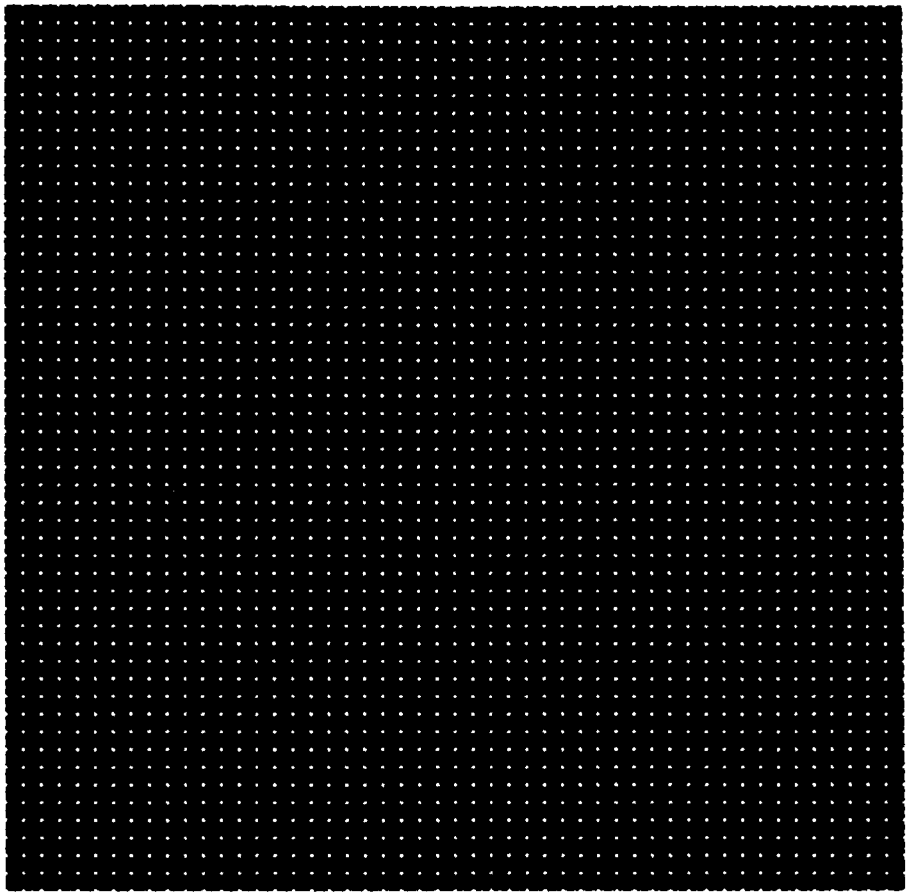
FIG. 1C (prior art) shows the 2D repetitive master dot screen (revealing layer) used in the superposition shown in FIG. 1A.
Figure 1E:
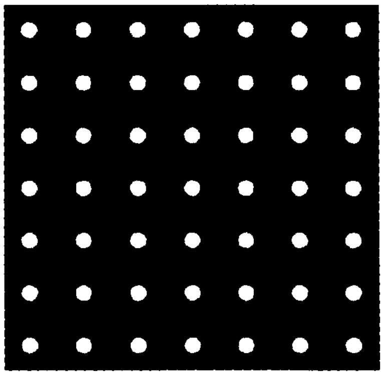
Figure 2A:
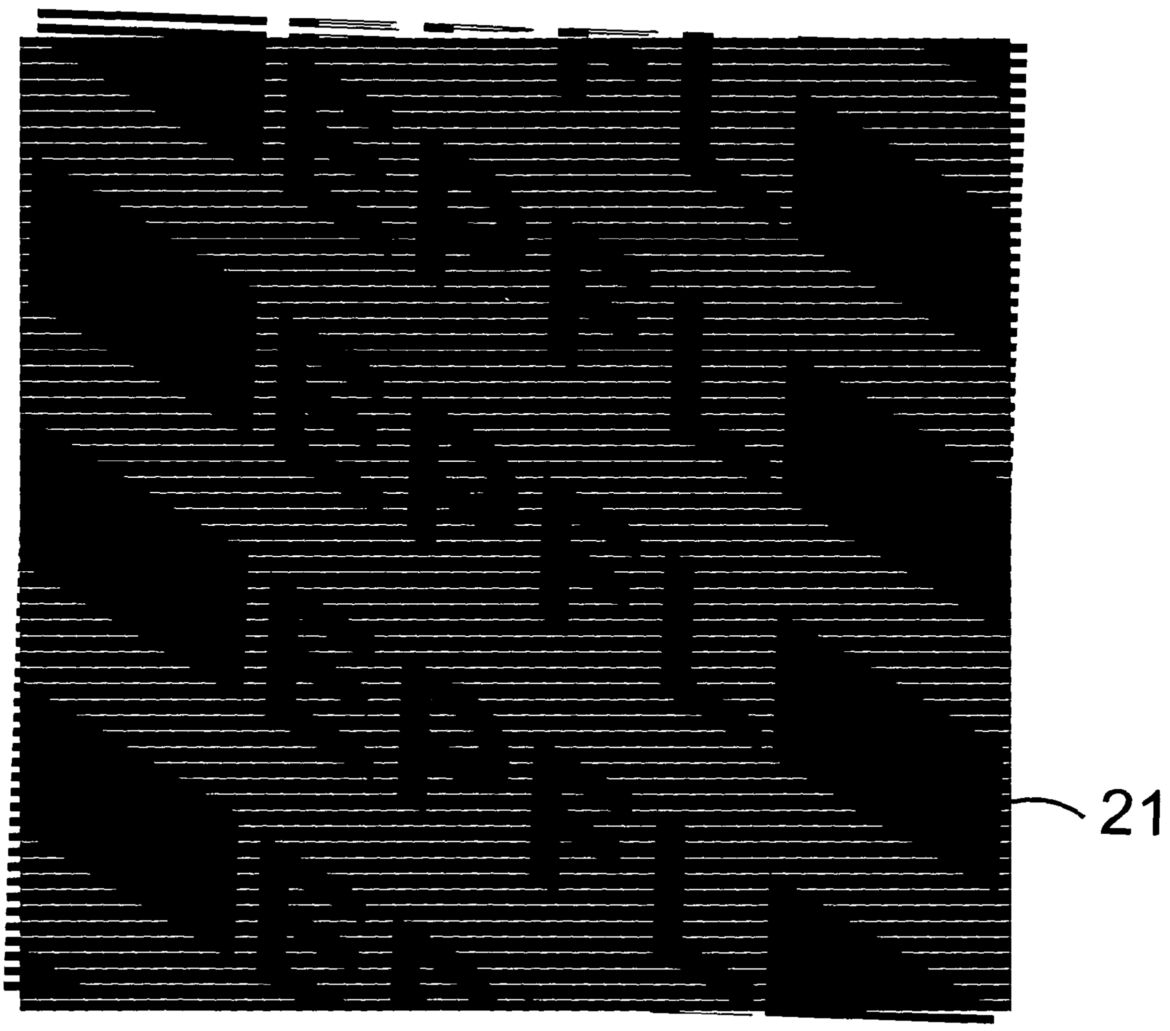
FIG. 2A (prior art) shows a simple example of a moire based method belonging to the category of 1D repetitive moire methods.
Figure 2B:
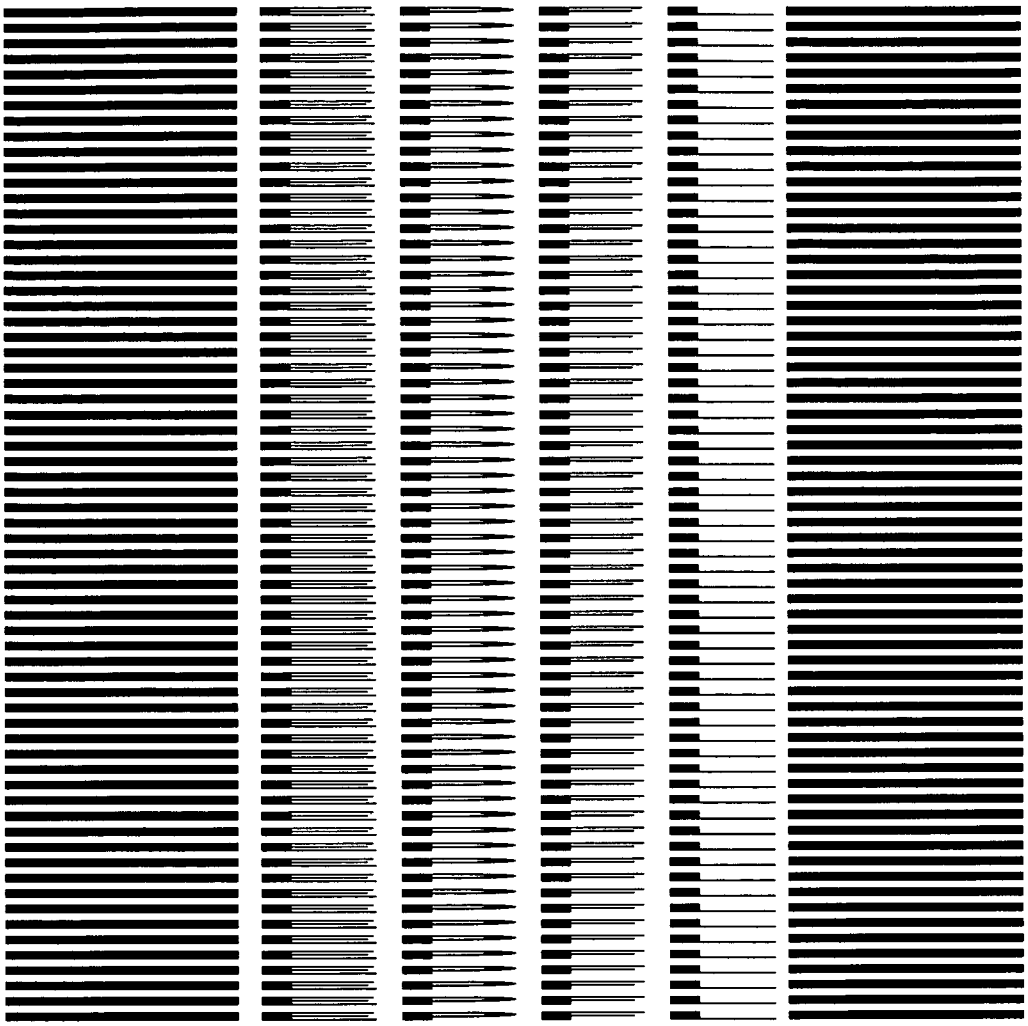
FIG. 2B (prior art) shows the 1D repetitive base band grating used in the superposition shown in FIG. 2A.
Figure 2D:
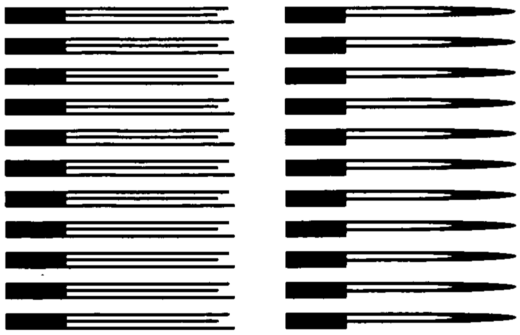
FIGS. 2D and 2E show a magnified view of a small portion of FIGS. 2B and 2C, respectively.
Figure 2C:
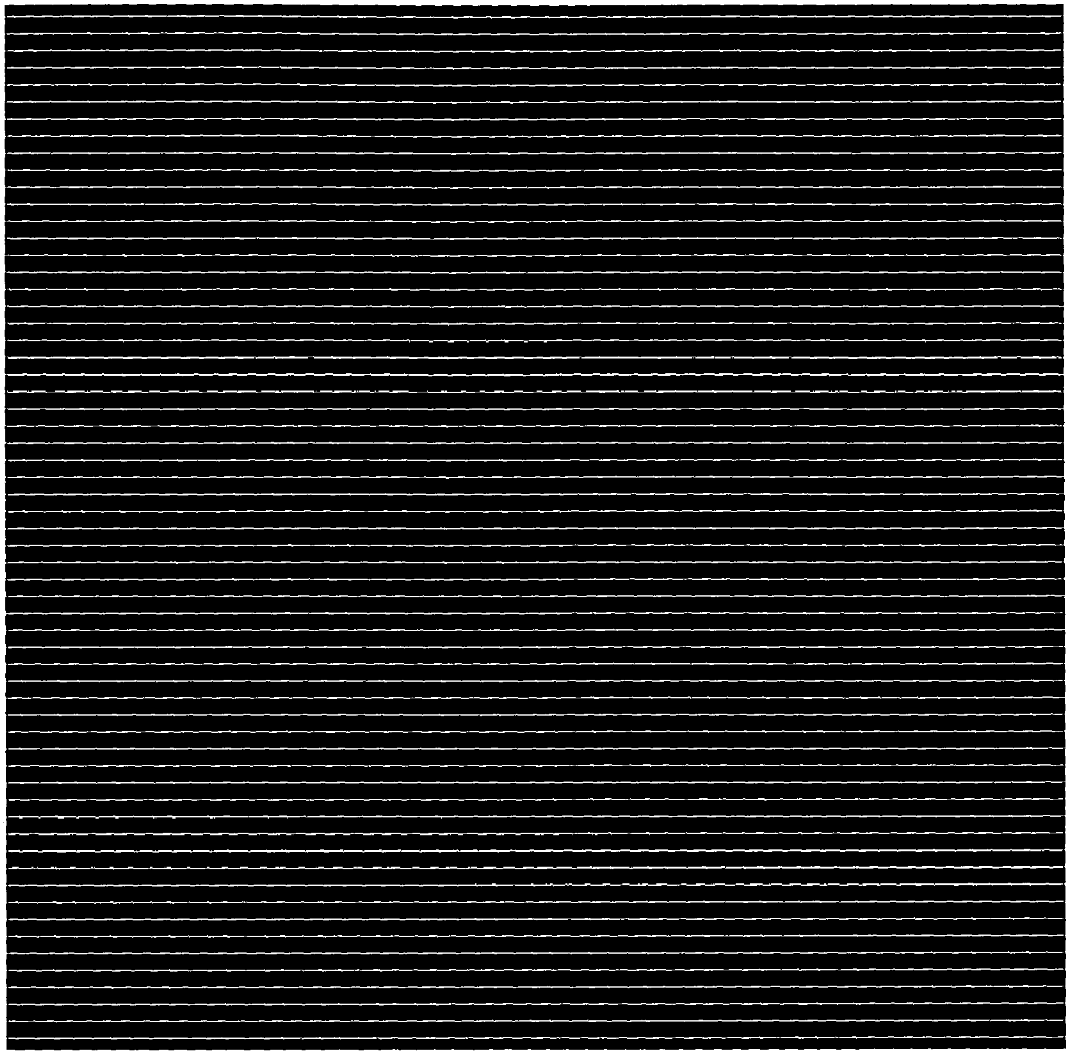
FIG. 2C (prior art) shows the 1D repetitive line grating (revealing layer) used in the superposition shown in FIG. 2A.
Figure 2E:
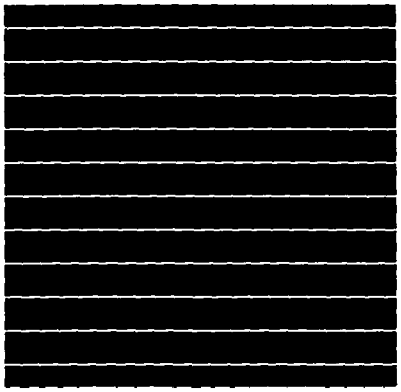

In both of these moire based method families (2D repetitive moire and 1D repetitive moire) the two superposed layers are repetitive (either 2D repetitive dot screens as in FIGS. 1B-1C, or 1D repetitive base band and line gratings as in FIGS. 2B-2C, respectively), and the resulting moire effect that carries the desired information is also repetitive (respectively, 2D repetitive moire cells that are replicated along two directions, as in FIG. 1A, or 1D repetitive moire bands that are replicated along a single direction, as in FIG. 2A). Although in some applications this repetitivity of the moire intensity profile may be advantageous, in other cases it may be clearly undesireable, for example when the repeated letters may be misinterpreted or lead to confusion. However, in the above mentioned inventions it is not possible to avoid the repetitivity of the moire intensity profiles in the superposition, due to the periodic or repetitive nature of the superposed layers However, as stated in the paper "Glass patterns as moire effects: new surprising results" by I. Amidror, Optics Letters, Vol. 28, 2003, pp. 7-9 and in the book "The Theory of the Moire Phenomenon, Vol. II: Aperiodic layers" by I. Amidror, Springer, published May 2007 (hereinafter, [Amidror07]), when the superposed layers are not repetitive but rather correlated random (or pseudo-random) layers, the resulting moire effect in the superposition is no longer repetitive, and it consists of just one instance of the repetitive moire that is obtained by repetitive layers. This is true both in the 2D case (as one can clearly see by comparing the 2D repetitive case shown in FIGS. 1A-1C with its 2D random counterpart shown in FIGS. 3A-3C) and in the 1D case (as one can see by comparing the 1D repetitive case shown in FIGS. 2A-2C with its 1D random counterpart shown in FIGS. 4A-4C).

The high potential that exists in such random cases for the authentication of documents and valuable products has been recognized by Amidror in U.S. Pat. No. 7,058,202. This patent discloses a category of moire based methods (henceforth jointly called "2D random moire"), which is the random (or pseudo-random) counterpart of the 2D repetitive moire. In this category of methods the individual, specially designed dots of the base layer and of the revealing layer are randomly positioned, though highly correlated between the two layers (see, for example, the base layer shown in FIG. 3B, the revealing layer shown in FIG. 3C, and the resulting moire effect in FIG. 3A). As explained above, the resulting moire effect obtained in this case consists of one instance of the repetitive moire effect that is obtained in its repetitive counterpart (compare FIG. 3A with FIG. 1A). But just as in the repetitive case this moire effect is highly dynamic, and its size, location and orientation gradually vary as the superposed layers are rotated or shifted on top of each other, and this, exactly in the same way as in the repetitive case. As explained at length in the section "Encryption as built-in feature of 2D or 1D s-random moire" below, such aperiodic screens are more difficult to generate and extremely hard to reverse engineer; furthermore, they benefit from a built-in encryption due to the choice of the random number sequence being used. Hence, they offer higher security against counterfeiting than the previous disclosures.

There also exists a fourth category of moire based methods (henceforth jointly called "1D random moire"), whose application for the authentication of documents and valuable products is disclosed here for the first time, and which is the random (or pseudo-random) counterpart of the 1D repetitive moire (see the theoretical background in [Amidror07, pp. 452-456]). In this category of methods the individual, specially designed base bands of the base band grating and the individual lines of the revealing line grating are randomly positioned, though highly correlated between the two layers (see, for example, the s-random base band grating shown in FIG. 4B, the s-random revealing line grating shown in FIG. 4C, and the resulting moire effect in FIG. 4A). The moire effect obtained in this case consists of one instance of the repetitive moire bands that are obtained in its repetitive counterpart (compare FIG. 4A with FIG. 2A), but just as in the repetitive case this moire band is highly dynamic and it scrolls across the superposition as the revealing layer is shifted on top of the base layer, exactly in the same way as in the repetitive case. 1D random moire methods have the same advantages as those mentioned above for the 2D random moire, but in addition they also benefit from the advantages of the 1D repetitive moire, namely, better light efficiency than in the 2D case, the ability to work by reflectance and not only by transmittance, and the ability to comprise a larger number of symbols, for example one or several words, one or several sophisticated logos, or one or several signs.

It should be noted that in all of these methods (2D or 1D, repetitive or random) the base layer may consist of elements of gradually varying sizes and widths, and thus convey varying gray (or color) levels, so that it can be incorporated (or dissimulated) within any desired halftone image that is printed, deposited or otherwise reproduced on the protected document or product, as explained for the 2D case in U.S. Pat. No. 6,819,775 (Amidror and Hersch) and U.S. Pat. No. 7,058,202 (Amidror) and for the 1D case in U.S. patent application Ser. No. 11/349,992 (Hersch et al.).

Furthermore, all of these methods can be also used in conjunction with various geometric layer transformations, as described for the 2D case in U.S. Pat. No. 6,819,775 (Amidror and Hersch) and U.S. Pat. No. 7,058,202 (Amidror) and for the 1D case in U.S. patent application Ser. No. 11/349,992 (Hersch et al.), thus making the resulting visual moire effect even more spectacular, and much more difficult to counterfeit.

One of the most characteristic properties of all of our above mentioned moire based methods (2D or 1D, repetitive or random), which clearly distinguishes them from other moire based methods such as phase modulation methods (see the section "Background of the invention"), is the dynamic nature of the resulting moire intensity profiles. Unlike in the other methods, when the revealing layer is moved, shifted or rotated on top of the base layer, the resulting moire effect (2D or 1D, repetitive or random) gradually scrolls across the superposition, increases or decreases, rotates, or undergoes other spectacular dynamic transformations (depending on the case and on the geometric transformations undergone by the base layer and the revealing layer). This inherent dynamic behaviour of the moire intensity profiles makes them very spectacular and very easy to recognize by the observer, and hence particularly useful for the authentication of documents and valuable products in many different configurations.

In our previous inventions (see, for example, U.S. Pat. No. 6,819,775 (Amidror and Hersch), U.S. Pat. No. 7,058,202 (Amidror) and U.S. patent application Ser. No. 11/349,992 (Hersch et al.)), there were disclosed several embodiments of particular interest for the authentication of documents and valuable products using our moire based methods. These embodiments can be used with each of the above mentioned moire method categories (2D repetitive moire, 1D repetitive moire, 2D random moire, and 1D random moire). In one embodiment, the moire intensity profiles can be visualized by superposing the base layer and the revealing layer which are both located on two different areas of the same document (banknote, etc.). In a second embodiment, only the base layer appears on the document itself, and the revealing layer is superposed on it by the human operator or the apparatus which visually, optically or electronically validates the authenticity of the document. In a third embodiment, the revealing layer is a 2D microlens array (or a 1D microlens array) rather than a 2D pinhole screen (or, respectively, a 1D line grating). An advantage of this third embodiment is that microlenses offer a higher light efficiency than other revealing layers such as pinhole screens or line gratings. A further advantage of this third embodiment is that it applies equally well to both transparent support, where the moire is observed by transmittance, and to opaque support, where the moire is observed by reflection. The term "opaque support" as employed in the present disclosure also includes the case of transparent materials which have been made opaque by an inking process or by a photographic or any other process. In a fourth embodiment the base layer is reproduced on an optically variable device and revealed by a revealing layer which can be embodied by a 2D or 1D screen, grating, microlens array or diffractive device emulating microlenses.

Figure 5A:
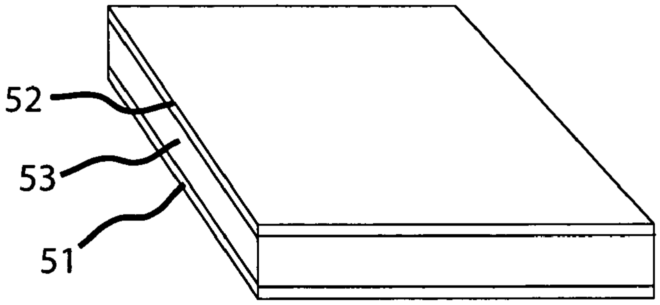
FIG. 5A shows a schematic view of a compound layer comprising the base layer (51), the revealing layer (52), and the gap between them (53)
Figure 6:
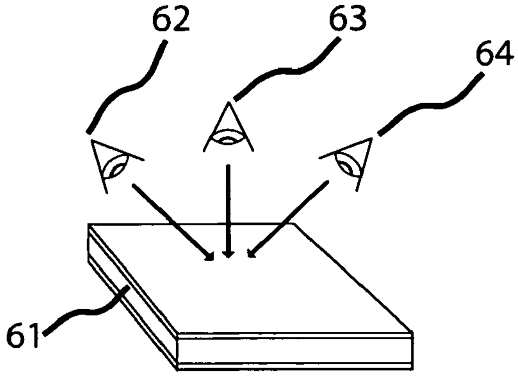
FIG. 6 schematically shows how a dynamic movement of the parallax moire effect can be obtained by moving the observer’s eyes in front of the compound layer 61 (in this example horizontally, i.e. along the x direction)
Figure 7A:
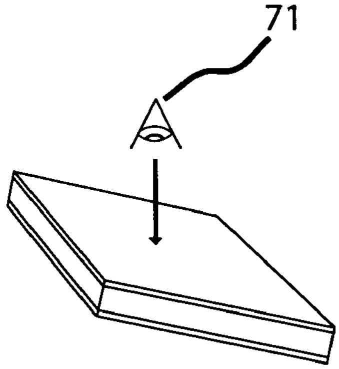
FIGS. 7A and 7B schematically show how the same dynamic movement of the parallax moire effect as in FIG. 6 can be obtained by tilting the compound layer (in this example, horizontally) in front of the observer's eyes.
Figure 7B:
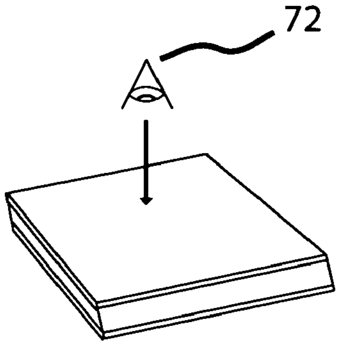
Figure 8:
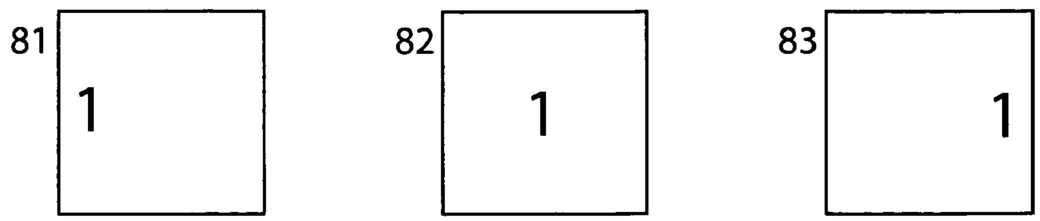
FIG. 8 schematically shows a possible dynamic evolution of a "1"-like parallax moire effect that can be observed as shown in FIG. 6 or 7A-7B, where said dynamic evolution consists of horizontal scrolling, as illustrated in the views 81-83.

In all of these previously disclosed embodiments, when the base layer and the revealing layer are superposed in contact, the dynamic effect of the moire is obtained by moving or rotating the revealing layer on top of the base layer. However, as disclosed by Hersch et al. in U.S. patent application Ser. No. 11/349,992 and in U.S. Pat. No. 7,295,717 (both for the case of 1D repetitive moire methods), there also exists a further embodiment, which is based on the parallax effect. In this embodiment the base layer and the revealing layer are fixed (or "sandwiched") together, one on top of the other, but separated from each other for example by a thin transparent layer of a certain width (generally less than 1 mm, typically between 0.02 and 0.5 mm), as shown in FIG. 5A. Because the two layers are fixed together they cannot be freely moved on top of each other as in the previous embodiments. Therefore, the dynamic effects of the moire intensity profiles, which are a fundamental characteristic property of our moire based methods, cannot be obtained here by moving or rotating one of the two layers on top of the other. Instead, the dynamic effects of the moire intensity profiles are obtained here by the well-known parallax effect, thanks to the fixed distance 53 (hereinafter called "gap") between the base layer 51 and the revealing layer 52 that are fixed together (and which we henceforth call "the compound layer" or "the fixed setup"). Thanks to this gap between the base layer and the revealing layer, gradual variations of the observation angle (for example, by small movements of the observer, as shown in FIG. 6, or due to a vertical or horizontal tilting of the compound layer in the hands of the observer, as shown in FIGS. 7A, 7B) lead to gradually varying sampling of the base layer by the revealing layer, thereby causing a dynamic movement of the resulting moire intensity profiles thanks to the parallax effect. In fact, the shape and the dynamic movement of the moire due to the parallax effect (hereinafter called "the parallax moire effect") when changing the observation angle (e.g. by tilting the compound layer) are identical to the shape and the dynamic movement of the moire when the same layers are superposed in contact and the revealing layer is shifted on top of the base layer—except that the range of the movement in the first case is more limited than in the second case, where the two layers are free and can be mutually shifted as much as desired. This fact will be henceforth called "the basic rule of the parallax moire effect". The same parallax moire effect can be also achieved by embodying the revealing layer within the compound layer as a microlens array (either a 2D microlens array or a 1D microlens array, depending on the case); the focal distance of the 2D or 1D microlens array corresponds to the gap between the two layers, allowing it to focus precisely on the base layer.

A more detailed theoretic explanation of the parallax moire effect can be found in the literature, for example in the paper "Moire patterns and the illusion of depth" by J. Huck, Proc. of the fifth Interdisciplinary Conf. of the International Soc. of the Arts, Mathematics and Architecture (ISAMA 2004), Chicago, June 2004 (hereinafter, [Huck04]), or in the paper "Theory of parallax barriers" by S. H. Kaplan, Journal of the SMPTE, Vol. 59, No. 7, 1952, pp. 11-21. This well known explanation of the parallax moire effect relies on the fact that the two involved layers are repetitive. However, surprisingly, it has been now discovered by the present inventors that parallax moire effects also occur when the two involved layers consist of s-randomly located elements, if the s-random element locations in the two layers are correlated. This surprising result seems at first to contradict the fundamental theoretic considerations which govern the generation of the parallax moire effect. But in fact, this surprising result does not contradict the established theory, but simply extends it to new cases which were until now beyond its scope, and thus, excluded from practical use.

The explanation of this surprising result is that the parallax moire effect occurs, in fact, thanks to the correlation in the element locations between the two layers of the compound layer. It should be noted that in the previously known case in which the two layers are repetitive this condition is automatically satisfied; this particular case is, indeed, covered by the classical explanation of the parallax moire effect as it appears in the existing literature, and which relies on the repetitive nature of the two layers involved. But our discovery that the parallax moire effect also works in the case of correlated random layers now opens the way to the introduction of new powerful authentication and anticounterfeiting methods and devices which are disclosed for the first time in the present invention.

It is therefore an aim of the present invention to show how we can advantageously use for the authentication of documents and valuable products parallax moire effects which occur in a compound layer consisting of two correlated 2D or 1D random layers (a base layer and a revealing layer) that are fixed together with a certain small distance (gap).

Because the parallax moire effects that occur in the repetitive case and in the random case are, as we have just seen, one and the same, their dynamic behaviour is exactly the same. And indeed, in both cases the parallax moire effects behave in the same way as the moire effect that is generated between the same two layers when they are superposed in contact, but with an additional optical illusion of depth—meaning that the parallax moire effect may seem to the observer to be floating behind or in front of the two superposed layers, depending on the case (as explained in [Huck04] for the repetitive case). The difference between the repetitive case and the random case is that in the repetitive case the dynamic parallax moire effect that is obtained is repetitive, while in the random case the dynamic parallax moire effect consists of only one instance of the repetitive effect that is obtained in the repetitive case. In the 2D cases (between dot screens) the parallax moire effect may yield movements in two different directions, while in the 1D cases (between basebands and line gratings) it only has a single degree of freedom, i.e. each moire element moves only along a single trajectory. However, by creating a compound layer with several partly superposed 1D base and revealing layers, one can create moire elements moving along different trajectories (see Example 7).

A few possible examples of the dynamic evolution of a parallax moire effect according to the present disclosure are schematically illustrated in FIGS. 8-14, each of which shows three consecutive views from the dynamic evolution that can be observed when changing the observation angle. It should be noted that the dynamic evolution of the parallax moire effect is usually continuous and not broken by pauses or jumps, so that the three views provided in each of the figures may be understood as parts of a continuous evolution. Thus, the dynamic evolution undergone by the parallax moire effect according to the present disclosure may include evolution of its shape, scalings, rotations, shearings and/or movements along a trajectory determined by the base layer and the revealing layer layout parameters.

Finally, it should be stressed that the present invention completely differs from the above mentioned technique of phase modulation based on random dot screens (U.S. Pat. No. 5,396,559 (McGrew)), since in the present invention no phase modulation is used, and furthermore, no latent image is present on the document. On the contrary, all the spatial information which is made visible by the moire intensity profile according to the present invention is encoded in the specially designed forms of the individual elements (dots or lines) which constitute the random layers. Moreover, unlike in that technique, in the present invention the moire patterns resulting from the superposition of a base layer and a revealing layer are highly dynamic, and tilting the superposed layers yields a clearly visible displacement of the moire patterns.

Encryption as Built-in Feature of 2D or 1D S-Random Moire

One possible way to obtain a random (or pseudo-random) dot screen, base band grating or revealing line grating is by using a random number generator, as widely known in the art. The random numbers obtained by the random number generator can be optionally scaled by an appropriate fixed scaling factor, and then they can be used either directly as the coordinates of the individual element in question (dot, base band line or revealing grating line), or indirectly as random increments with respect to the original location of the same element in an original repetitive layer (that is produced as already explained in our previous disclosures on 2D and 1D repetitive moires, for example in U.S. Pat. Nos. 5,995,638 and 6,819,775 (Amidror and Hersch) for the 2D repetitive case and U.S. patent application Ser. No. 11/349,992 (Hersch et al.) for the 1D repetitive case).

A major advantage of the 2D or 1D s-random moire methods used in the present invention is in their intrinsically incorporated encryption system due to the arbitrary choice of the s-random number sequences for the generation of the specially designed s-random dot screens, base band grating, or revealing line grating that are used in this invention. In order that the superposition of an s-random base layer and an s-random revealing layer yields a moire intensity profile, it is required that the random locations of base and revealing layer elements be derived from one another (and possibly slightly scaled or transformed) in order to guarantee a high correlation between the two s-random layers. Thus, if the s-random number sequence being used to derive the coordinates of each base layer and revealing layer element is the same in both layers, the superposition of the two layers will give a clearly visible moire intensity profile. But if the base layer and revealing layer element locations in the superposed random layers are not generated with the same random number sequence (for example: if they are generated by different random number generators or with different seeds), the superposition of both random layers will not give rise to any recognizable moire intensity profile shapes.

As a consequence, it is clear that given an s-random base layer, the re-generation or inverse engineering of a corresponding s-random revealing layer that will be able to reveal the moire intensity profile is only possible if the s-random number sequence being used for the generation of the s-random base layer is known. Similarly, given an s-random revealing layer, the re-generation or inverse engineering of a corresponding s-random base layer that will provide a moire intensity profile is only possible if the s-random number sequence being used for the generation of the s-random revealing layer is known. This provides the present invention with a built-in encryption system due to the choice of the s-random number sequences. For example, the s-random base layer and the s-random revealing layer may be generated using an s-random number sequence that is kept secret, thus preventing unauthorized production of an s-random revealing layer that can reveal the moire intensity profile. As a further example, if the s-random number sequence depends on the serial number of the document, or on any other parameter of the document (or series of documents), it becomes impossible for a potential counterfeiter to generate an appropriate revealing layer that will be able to reveal the moire intensity profile. This encryption may be further coupled with different covert variants of the base layer, for example, variants where the base layer is a masked basic screen, thereby offering a covert means of authentication and making the re-engineering of the basic screen of the document extremely difficult, as explained by Amidror and Hersch in U.S. Pat. No. 5,995,638.

These advantages will be further elucidated in the following sub-section, which describes, in nonexclusive and nonlimiting manner, a possible application for personalization or individualization of pairs of s-random base and revealing layers.

Personalization/Individualization of Pairs of S-Random Base and Revealing Layers Digital print technologies allow to create different printed image variants on each document, thereby allowing to personalize or individualize the base layer (for example, by printing it using an s-random number sequence that depends on the serial number of the document, etc.).

Furthermore, novel technologies such as ink jet of plastic material allow to deposit on the fly 2D microlense arrays or 1D microlense arrays, thereby allowing to deposit a fixed personalized revealing layer on top of the base layer, thus generating on the document a personalized compound layer.

By choosing different s-random locations for the individual elements of the layers, while keeping the correlation between the two layers, one may completely personalize or individualize pairs of base and revealing layers.

In one possible variant, the base layer and the revealing layer can be deposited on the document successively or simultaneously by the entity (official government office, credit card company, etc.) which issues the personalized document (passport, identity card, driving license, credit card, etc.).

In a second possible variant, the base layer is pre-printed (or pre-deposited) by a centralized office or printing facility on the paper (or substrate) that will be used later to produce the individual documents, and the revealing layer is affixed or deposited on top of it only later, for example in one of several local offices that issue the final documents to the public. As explained in detail above, the two layers must be produced using the same sequence of s-random numbers, thus making it impossible to counterfeit the revealing layer even on an authentic official pre-printed paper that has been obtained illicitly.

Similarly, in a third possible variant the revealing layer is pre-deposited (engraved, etched, embossed, etc.) on one face of the substrate by the manufacturer of the substrate (plastic card, etc.), and the base layer is later printed or deposited on the opposite face of the substrate, for example in one of several offices that issue the final product to the public. Here, too, the two layers must be produced using the same sequence of s-random numbers, thus making it impossible to counterfeit the base layer even on an authentic official pre-fabricated substrate that has been obtained illicitly.

Figure 5B:
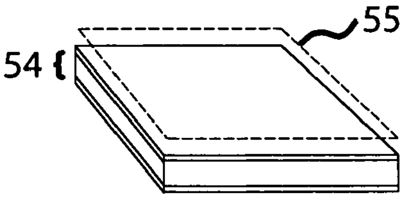
FIG. 5B shows the compound layer of FIG. 5A (54), with an additional authenticating revealing layer (55) superposed on top of it.

Note that the specific layout of the element locations within the base or revealing layer may be made apparent by superposing a third, authenticating layer on the base or revealing layer in question. For example, as shown in FIG. 5B, an additional authenticating revealing layer 55, having the same layout as the revealing layer, may be placed in superposition with the base or the revealing layer. The presence of the correct s-random revealed moire shape enables verifying the authenticity of a suspected compound layer on a document, in order to determine if it has been produced using the authentic sequence of s-random numbers.

Geometric Layer Transformations

In order to add further protection and to make counterfeiting even more difficult, it is also possible to apply to one or both of the layers being used some specially designed geometric transformations. As already explained for the 2D case in U.S. Pat. No. 6,819,775 (Amidror and Hersch) and U.S. Pat. No. 7,058,202 (Amidror) and for the 1D case in U.S. patent application Ser. No. 11/349,992 and in U.S. Pat. No. 7,295,717 (Hersch et al.), it is possible by using certain mathematical rules to synthesize geometrically transformed base and/or revealing layers which in spite of being distorted in themselves, still generate, when they are superposed on top of one another, moire intensity profiles with undistorted elements, just like in the untransformed cases. Furthermore, it is shown in these disclosures that even cases which yield distorted moires can still be advantageously used for anti-counterfeiting and authentication of documents and valuable products. In all of these cases, each of the two superposed layers is characterized by an additional set of parameters defining the geometric transformation which has been applied to it.

Because in the 2D and 1D random cases the resulting moire effect is the same as in the 2D or 1D repetitive case, respectively, and only contains a single instance of the corresponding repetitive moire, the mathematical models for the generation of the layer transformations remain in the random cases (either 2D or 1D) precisely the same as in the respective 2D or 1D repetitive cases. These mathematical models have already been explained and illustrated at length in U.S. Pat. No. 6,819,775 (Amidror and Hersch), U.S. Pat. No. 7,058,202 (Amidror) and U.S. patent application Ser. No. 11/349,992 (Hersch et al.). These mathematical models allow to predict the transformation undergone by the resulting moire from the transformations undergone by the two layers, or, even more interestingly, they allow to compute from the transformation of one of the two layers and from the desired moire transformation the transformation of the other layer that will produce it.

As already shown in the above mentioned disclosures, there exist many different variants based on layer transformations, for example:

(a) A linearly transformed base layer and a non-transformed revealing layer (or vice versa); such cases generate linearly transformed moires (and moire movements).
(b) A linearly transformed base layer and a linearly transformed revealing layer; such cases, too, generate linearly transformed moires (and moire movements).
(c) Non-linearly transformed layers that generate a predefined linearly transformed moire (and moire movement).
(d) Non-linearly transformed layers that generate a predefined non-linearly transformed moire (and moire movement).

The use of geometric transformations in our present invention can be elucidated by means of the examples below, which are provided in an illustrative and non-limiting manner.

EXAMPLE 1

2D Random Parallax Moire with Linear Transformations

Figure 3A:
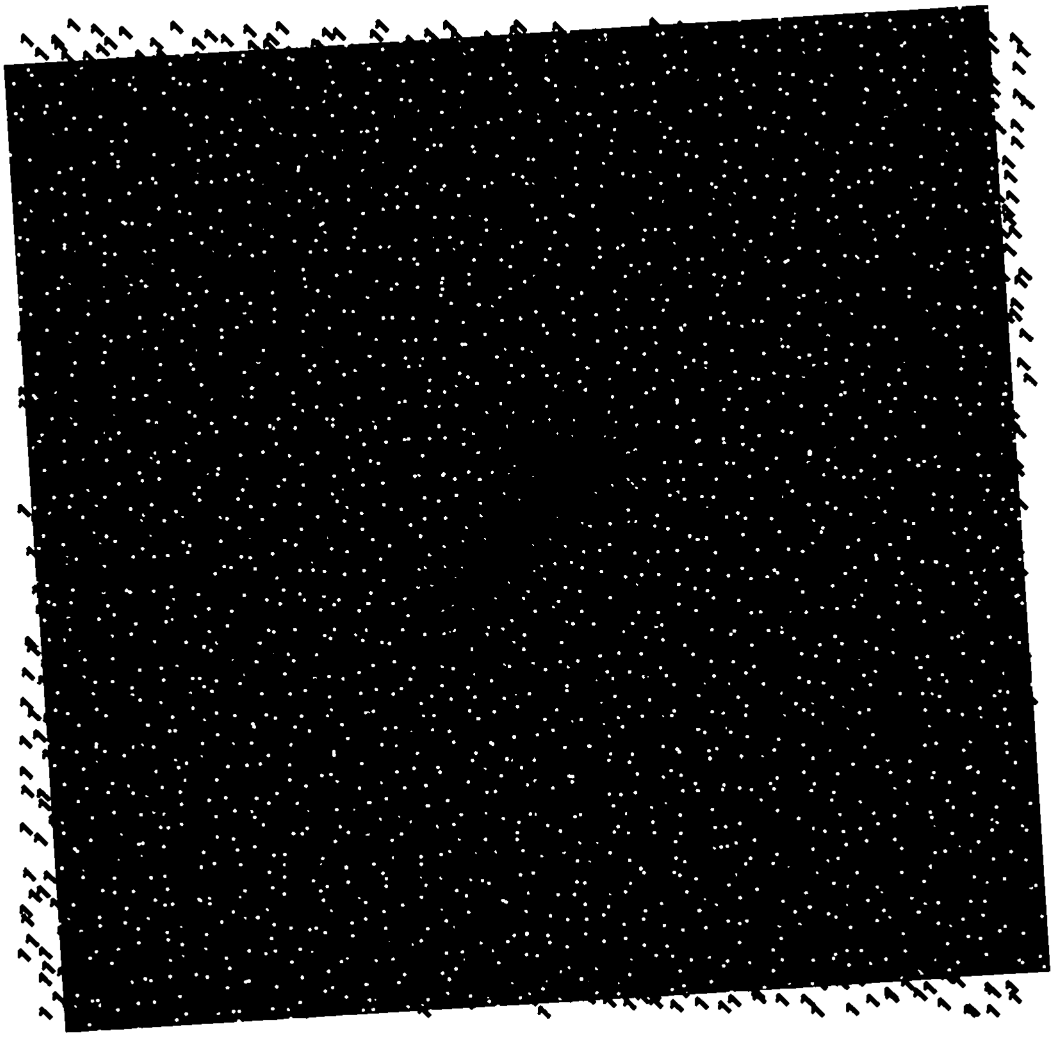
FIG. 3A (prior art) shows a simple example of a moire based method belonging to the category of 2D random moire methods.
Figure 3B:
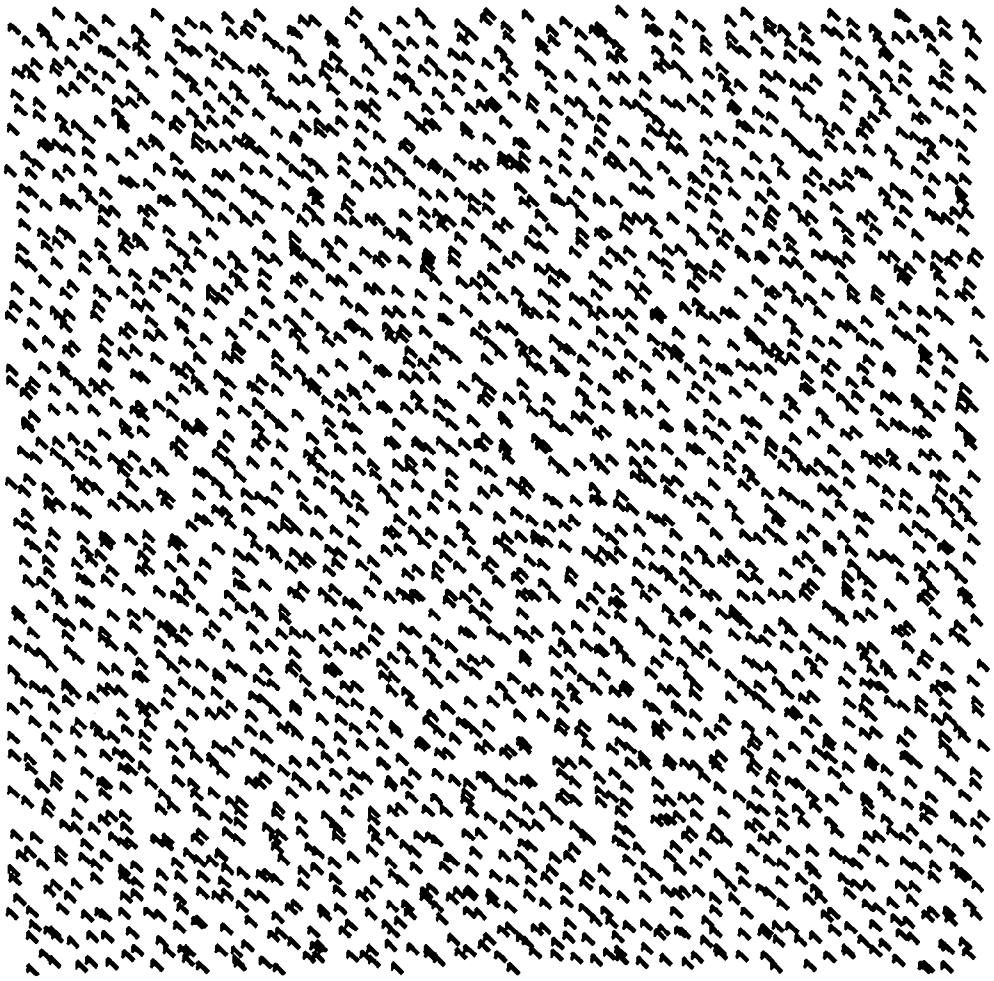
FIG. 3B (prior art) shows the 2D random basic dot screen used in the superposition shown in FIG. 3A.
Figure 3D:
FIGS. 3D and 3E show a magnified view of a small portion of FIGS. 3B and 3C, respectively.
Figure 3C:
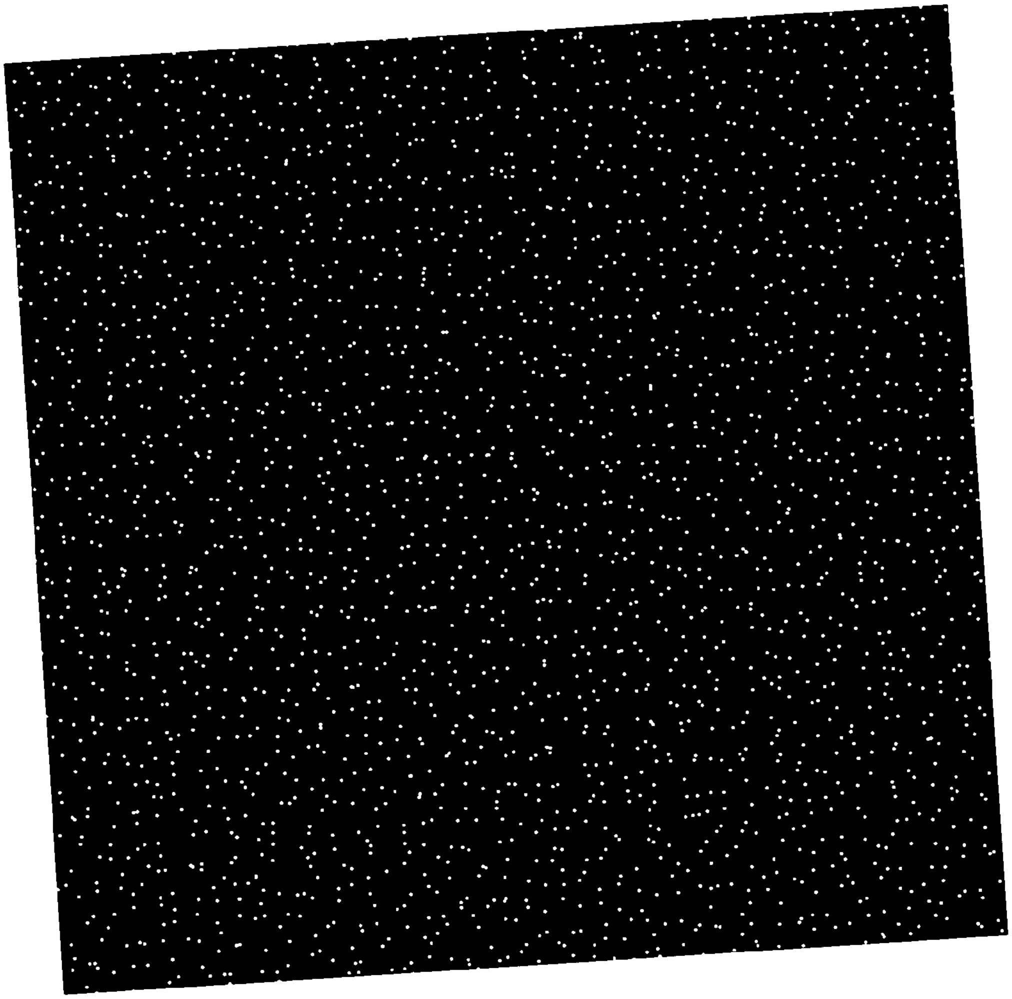
FIG. 3C (prior art) shows the 2D random master dot screen (revealing layer) used in the superposition shown in FIG. 3A.
Figure 3E:
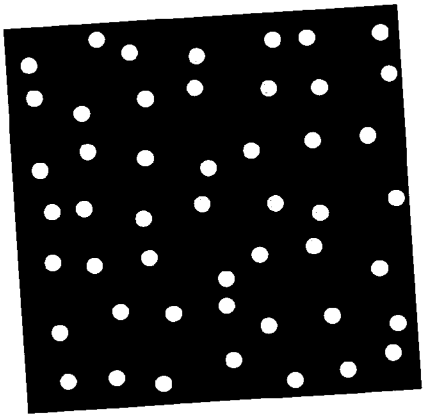
Figure 4A:
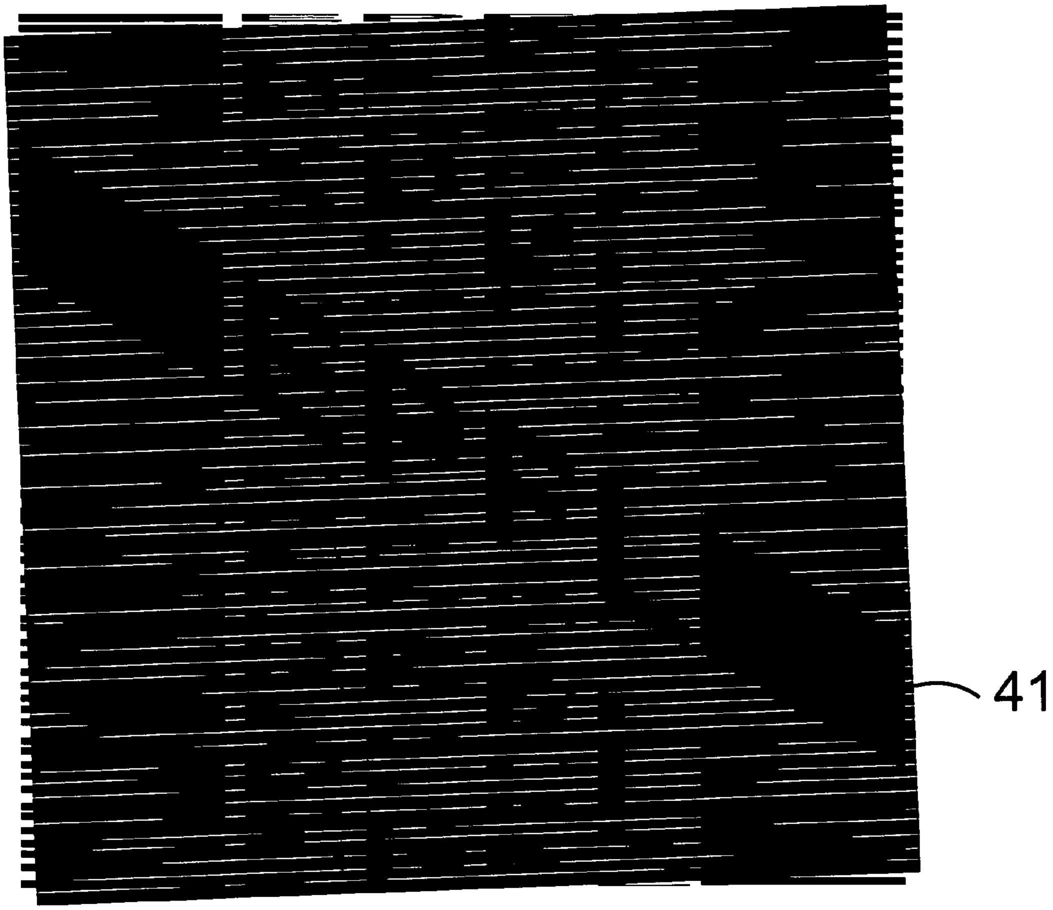
FIG. 4A shows a simple example of a moire based method belonging to the category of 1D random moire methods.
Figure 4B:
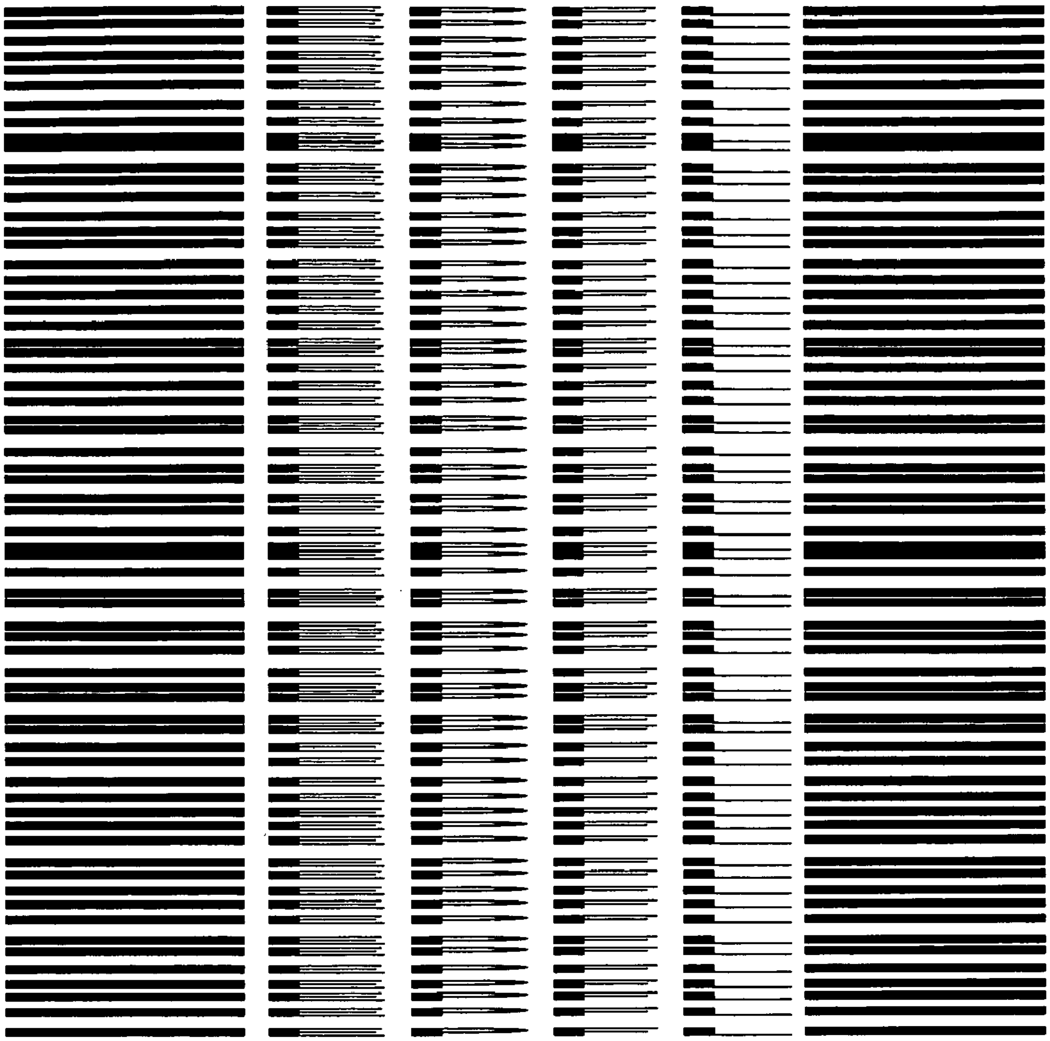
FIG. 4B shows the 1D random base band grating used in the superposition shown in FIG. 4A.
Figure 4D:
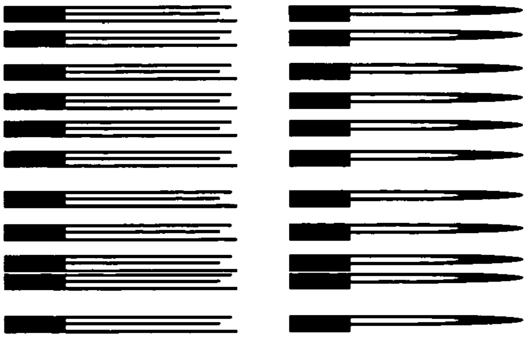
FIGS. 4D and 4E show a magnified view of a small portion of FIGS. 4B and 4C, respectively.
Figure 4C:
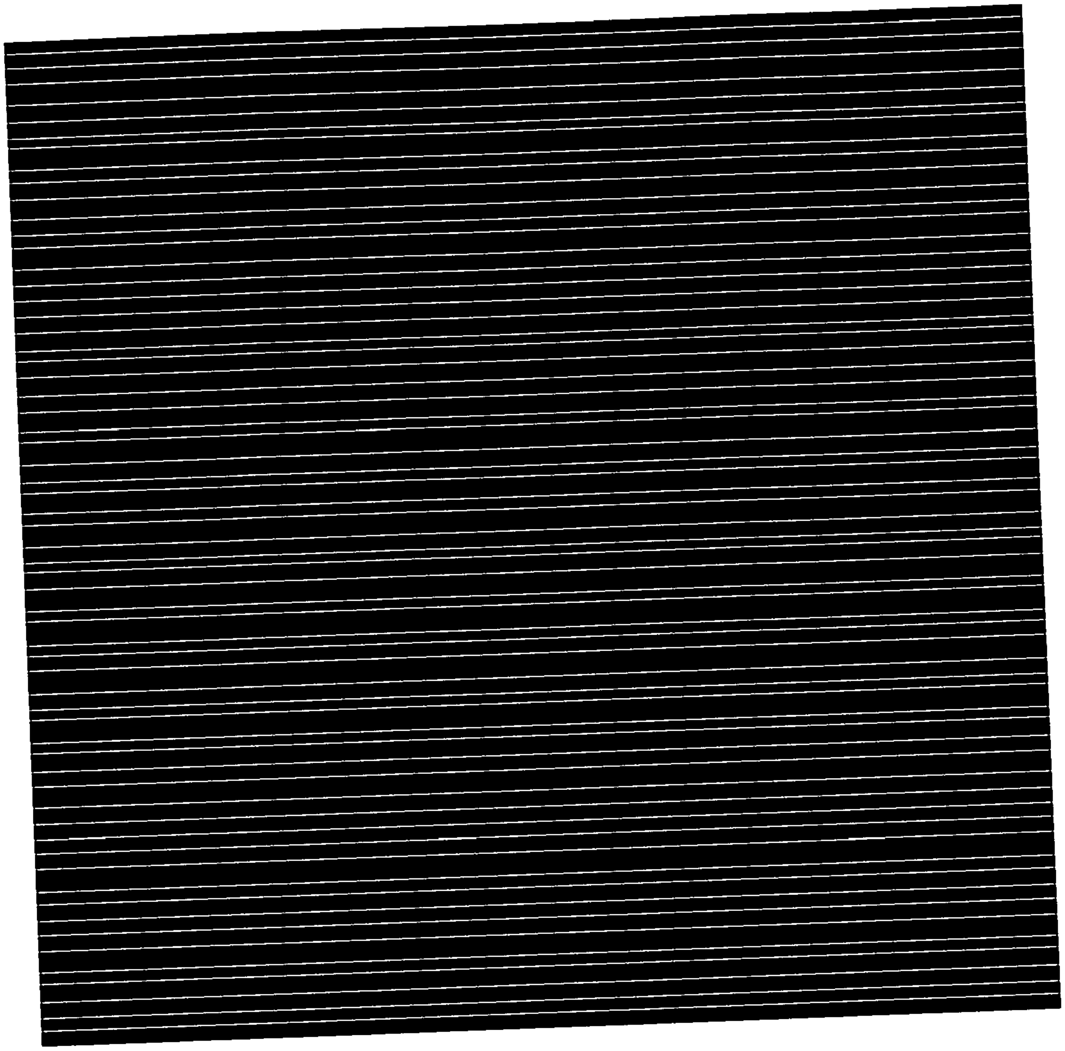
FIG. 4C shows the 1D random line grating (revealing layer) used in the superposition shown in FIG. 4A.
Figure 4E:
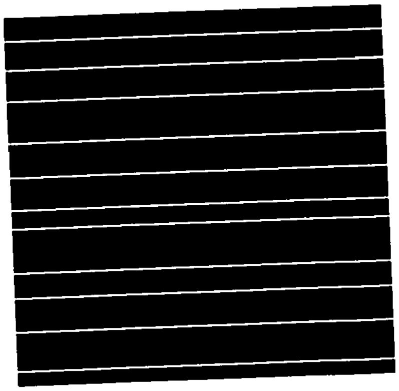

In this example, the base layer consists of randomly located "1"-shaped dots, as shown in FIG. 3B, and the revealing layer consists of tiny pinholes (or microlens lenslets) that are located in the same random locations as in the base layer (see FIG. 3C). Obviously, if the two layers are superposed on top of each other precisely dot on dot no moire effect will be generated in the superposition (in fact, this is a singular moire situation in which the moire effect is infinitely big and therefore invisible). But if we apply to the revealing layer a small rotation (which is a linear transformation) before it is fixed on the base layer, a "1"-shaped moire effect will become visible as shown in FIG. 3A.

Now, thanks to the "basic rule of the parallax moire effect" (see above), the dynamic evolution of a parallax moire effect when tilting the compound layer (or moving the eyes) horizontally (or respectively, vertically) is the same as the dynamic evolution of the same moire effect when the two layers are superposed in contact, and one of the layers is shifted on top of the other horizontally (or respectively, vertically). Therefore, the dynamic behaviour of the parallax moire in the present example is the same as illustrated and mathematically explained in the paper "Unified approach for the explanation of stochastic and periodic moires" by I. Amidror, Journal of Electronic Imaging, Vol. 12, No. 4, 2003, pp. 669-681, or in [Amidror07 pp. 54-59]: when the compound layer is tilted horizontally the parallax moire effect moves vertically (as in FIG. 9), and when the compound layer is tilted vertically the parallax moire effect moves horizontally (as in FIG. 8). This phenomenon is, indeed, the random counterpart of the well-known perpendicular movement of the moire effects in the corresponding repetitive case (see ibid.), which has been called by Steenblik et al. in U.S. Pat. No. 7,333,268 "orthoparallax" to stress its counter-intuitive nature.

EXAMPLE 2

Another 2D Random Parallax Moire with Linear Transformations

Figure 9:
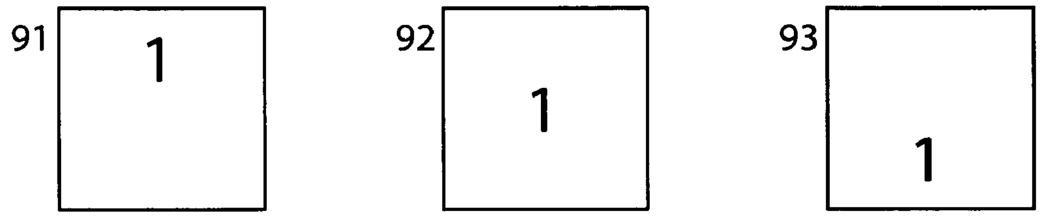
FIG. 9 schematically shows a possible dynamic evolution of a "1"-like parallax moire effect that can be observed as shown in FIG. 6 or 7A-7B, where said dynamic evolution consists of vertical scrolling, as illustrated in the views 91-93.
Figure 10:
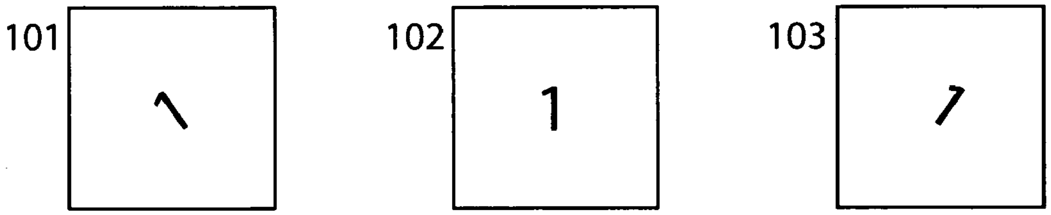
FIG. 10 schematically shows a possible dynamic evolution of a "1"-like parallax moire effect that can be observed as shown in FIG. 6 or 7A-7B, where said dynamic evolution consists of rotation, as illustrated in the views 101-103.
Figure 11:
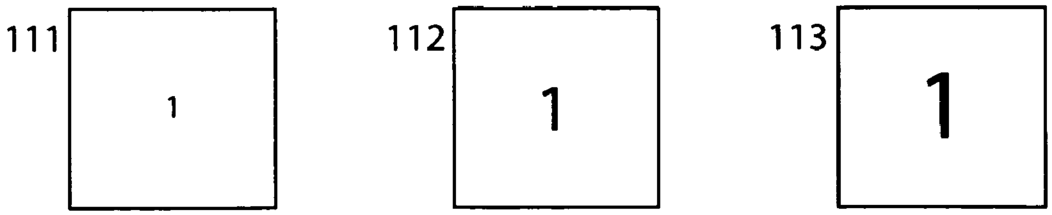
FIG. 11 schematically shows a possible dynamic evolution of a "1"-like parallax moire effect that can be observed as shown in FIG. 6 or 7A-7B, where said dynamic evolution consists of scaling, as illustrated in the views 111-113.
Figure 12:
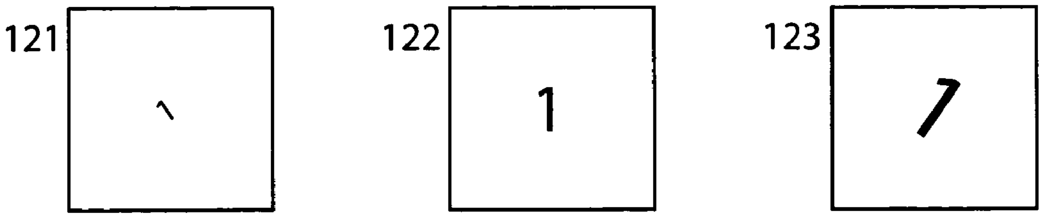
FIG. 12 schematically shows a possible dynamic evolution of a "1"-like parallax moire effect that can be observed as shown in FIG. 6 or 7A-7B, where said dynamic evolution consists of a combination of scaling and rotation, as illustrated in the views 121-123.

If, instead of applying a rotation to one of the two layers as in the previous example we apply a scaling transformation, the resulting dynamic parallax moire effect is not an "orthoparallax" effect but rather an "intuitive" parallax effect, namely, when the compound layer is tilted horizontally the parallax moire effect moves horizontally (as in FIG. 8), and when the compound layer is tilted vertically the parallax moire effect moves vertically (as in FIG. 9).

EXAMPLE 3

2D Random Parallax Moire with Non-Linear Transformations

Figure 13:
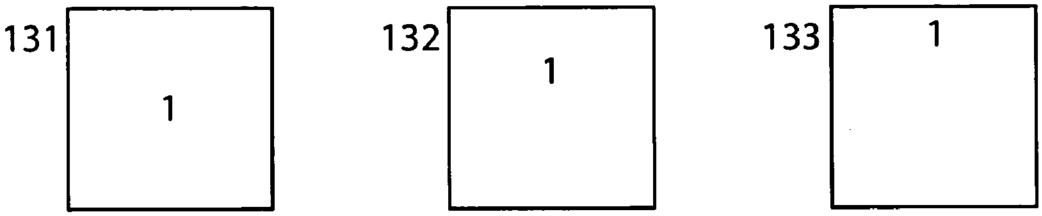
FIG. 13 schematically shows a possible dynamic evolution of a "1"-like parallax moire effect that can be observed as shown in FIG. 6 or 7A-7B, where said dynamic evolution consists of radial motion, as illustrated in the views 131-133.
Figure 14:
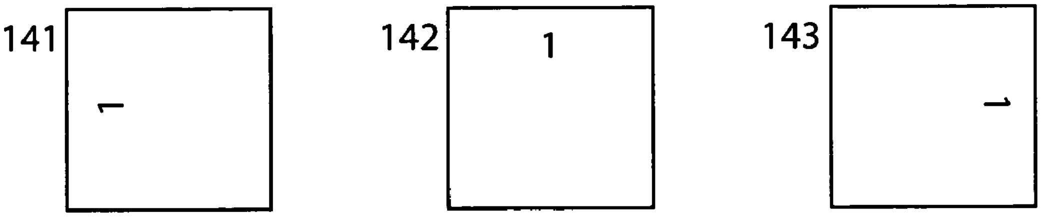
FIG. 14 schematically shows a possible dynamic evolution of a "1"-like parallax moire effect that can be observed as shown in FIG. 6 or 7A-7B, where said dynamic evolution consists of circular rotation, as illustrated in the views 141-143.
Figure 15:
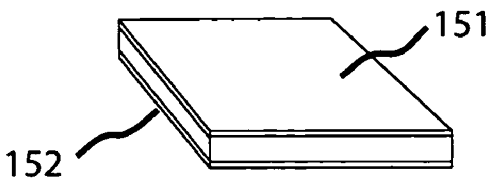
FIG. 15 schematically shows a possible embodiment of the compound layer of FIG. 5 in which when looking from the back side a halftone image (152) is visible, and when looking from the front side a moire shape (151) is visible.

This example shows a strongly non-linear case, in which a horizontal tilt of the compound layer gives a circular rotation of the moire (as shown in FIG. 14), while a vertical tilt gives a radial motion of the moire (as shown in FIG. 13).

In order to obtain this moire effect we start with two original random dot screens having identical dot locations, one of which consists of dots having the shape of tiny "1"s, as shown in FIG. 3B, while the other consists of tiny pinholes on a black background (or an equivalent microlens array) as shown in FIG. 3C. In order to obtain the desired moire effect, we may define the moire transformation $g_M(x,y)$ using the well known log-polar transformation as follows:

$$g_M\begin{pmatrix} x \\ y \end{pmatrix} = \begin{pmatrix} \varepsilon\log\left(\sqrt{x^2+y^2}\right) \\ \varepsilon\arctan(y/x) \end{pmatrix} \tag{1}$$

where $\epsilon$ is a small positive constant. Note that by using here the logarithm of the radius rather than the radius itself we obtain gradually increasing elements along the radial direction, which is more visually pleasing than keeping fixed sized elements along the radial direction. Now, according to the mathematical theory disclosed in our previous disclosures (see for example U.S. Pat. No. 6,819,775 (Amidror and Hersch) and U.S. Pat. No. 7,058,202 (Amidror)), all that we need to do is to apply to our two layers two transformations $g_B(x,y)$ and $g_R(x,y)$ such that $g_B(x,y)-g_R(x,y)=g_M(x,y)$. For example, we may choose to leave the revealing layer untransformed, meaning that $g_R(x,y)=(x,y)$, and apply to the base layer the geometric transformation $g_B(x,y)=g_M(x,y)+g_R(x,y)$, namely:

$$g_B\begin{pmatrix} x \\ y \end{pmatrix} = \begin{pmatrix} \varepsilon\log\left(\sqrt{x^2+y^2}\right) \\ \varepsilon\arctan(y/x) \end{pmatrix} + \begin{pmatrix} x \\ y \end{pmatrix} \tag{2}$$

In a similar way one can also design 1D random parallax moire effects using the mathematical theory originally disclosed in U.S. patent application Ser. No. 11/349,992 (Hersch et al.) for the 1D repetitive case. For example, 1D random parallax moire effects with linearly transformed base and/or revealing layer may give moire shapes that move horizontally when the compound layer is tilted horizontally, moire shapes that move vertically when the compound layer is tilted vertically, moire shapes that move horizontally when the compound layer is tilted vertically, or moire shapes that move vertically when the compound layer is tilted horizontally. Furthermore, using the same mathematical theory, 1D random parallax moire effects with non-linearly transformed base and/or revealing layer may give even more spectacular results under horizontal or vertical tilts of the compound layer, for example a radial displacement of the moire shape, a circular displacement of the moire shape, a spiral like displacement of the moire shape, etc. As already mentioned above, in all such 1D random examples the mathematical calculations used are the same as in the corresponding 1D repetitive examples (that are largely illustrated in U.S. patent application Ser. No. 11/349,992 (Hersch et al.)), but the resulting moire effect in the random case consists of a single instance of the corresponding repetitive moire effect. Examples of 1D parallax moire shapes are given in the next sections.

Finally, thanks to the availability of a large number of geometric transformations and transformation variants (i.e. different values for the transformation constants), one may create, for additional protection, documents having their own individualized moire layout. This can be done, for example, by using a different geometric transformation for each class of documents, or as a function of the serial number of the document, etc.

Synthesis of a Desired Parallax Moire Shape Layout and Movement

The synthesis of a parallax moire shape layout is generally carried out in two successive coarse steps: first a rectilinear parallax moire is specified, together with its moire shape movement, and then an additional generally non-linear geometric transformation may be specified, which bends the linear moire shape movement into a non linear moire shape movement. Hereinafter, we show in detail possible embodiments of the method to generate parallax moire shape layouts. Other embodiments and variations are possible. Since the 1D parallax moire uses the same underlying layout rules as the 1D repetitive moire described by Hersch and Chosson in U.S. patent application Ser. No. 11/349,992, the cited formulas are similar or identical to thoses in that patent application.

a) Synthesis of 1D Rectilinear Parallax Moire Shapes

Figure 16:
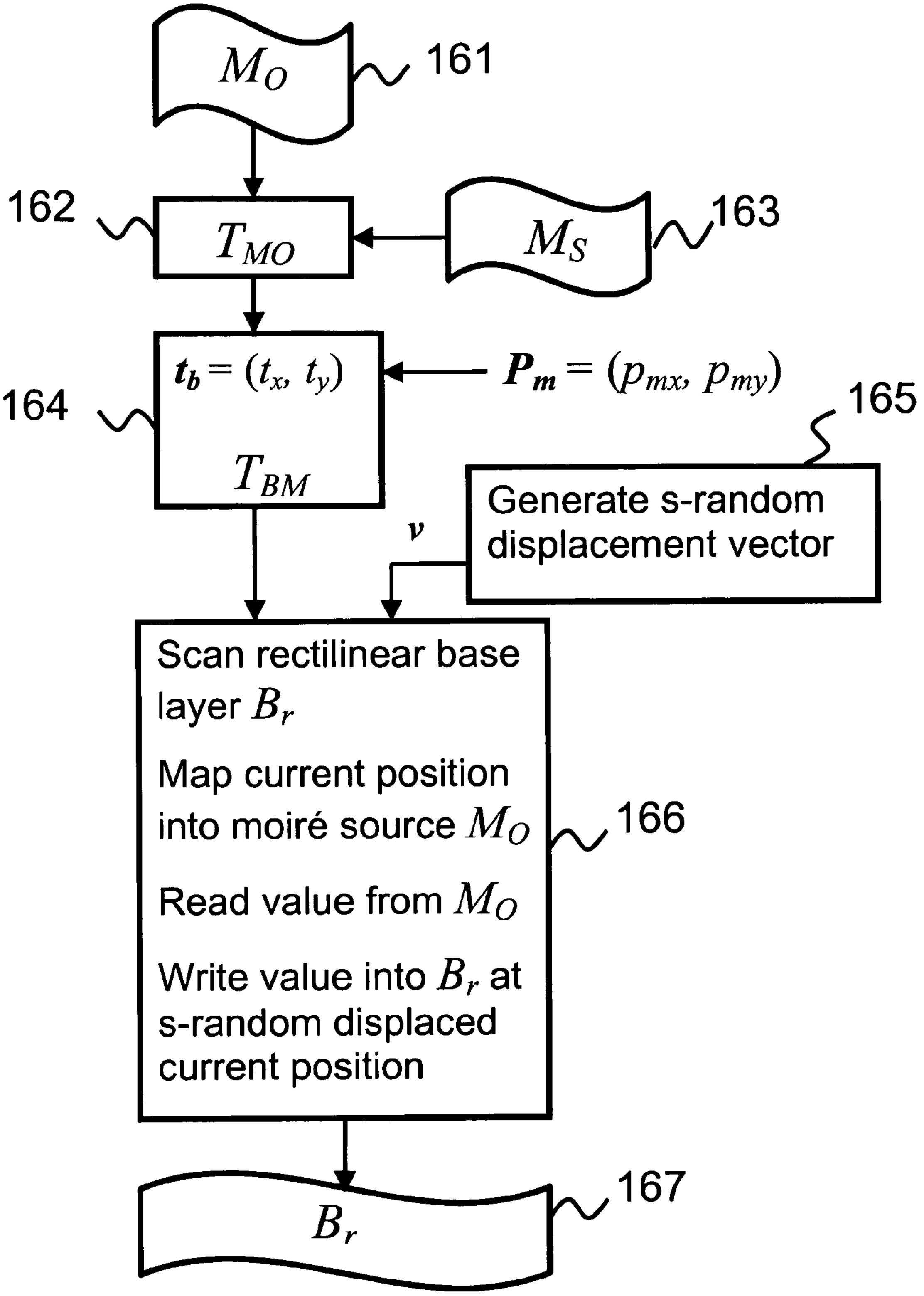
FIG. 16 shows possible steps for generating an s-random rectilinear base layer $B_r$, starting from an original moire source image (161)
Figure 17A:
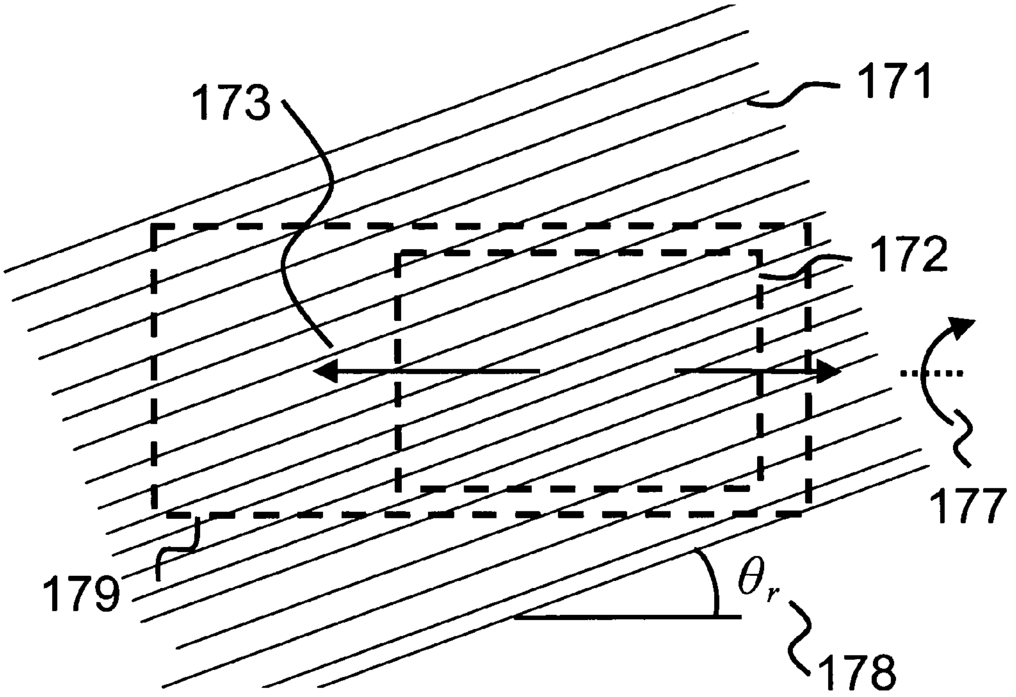
FIG. 17A schematically shows a moire shape 172 with oblique revealing layer lines 171 at orientation $\theta_r$ (178) moving horizontally when tilting the compound layer vertically (177)
Figure 17B:
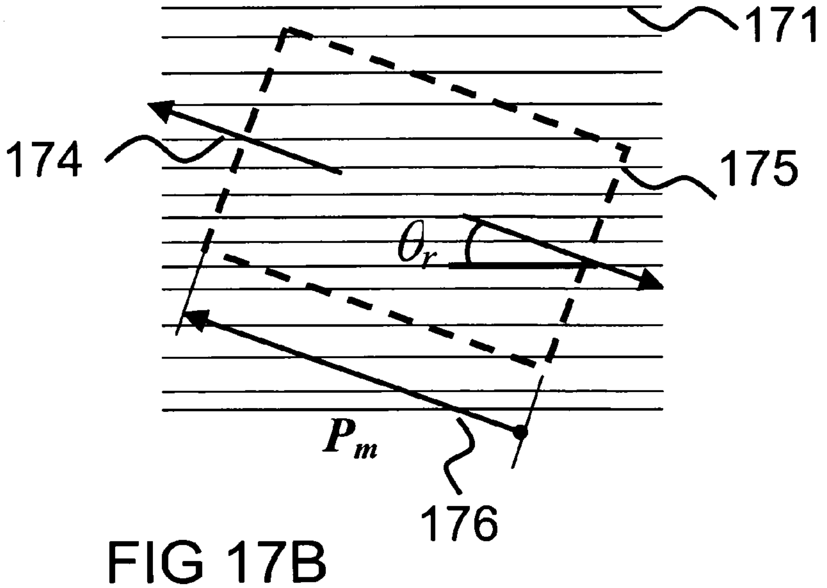
FIG. 17B schematically shows the same moire shape as in FIG. 17A, but before rotation of the compound layer, i.e. with horizontal revealing layer lines 171 and an oblique moire movement 174 along orientation $\theta_r$.

In a possible embodiment the following steps allow generating 1D rectilinear parallax moire shape, see FIGS. 16, 17A and 17B. As an example, FIG. 17A shows the final layout of the compound layer, which upon vertical tilt 177 induces a horizontal moire movement 173. FIG. 17B shows as intermediate step the same moire as in FIG. 17A, but before rotating the compound layer by $\theta_r$, i.e. with horizontal revealing layer lines.

Generate an s-random displacement vector $v=[r_1, r_2, r_3, \ldots]$ comprising one displacement value $r_i$ per base band (FIG. 16, 165).

Select an original moire source image $M_O$ 161.

Select the orientation $\theta_r$ (e.g. FIG. 17A, 178, see Example 5) and underlying period $T_r$ of the revealing layer and define accordingly the size, layout (e.g. FIG. 17B, 175, see Example 5) and moire shape movement direction (174) of the target moire shape layout $M_S$ in respect to the horizontally laid out revealing layer.

Define the number of underlying moire shape bands $N_m$, generally between 0.7 and 4. This number gives the size of the space, in terms of underlying moire periods, within which the moire shape may move. The term "underlying moire shape bands" refers to the moire shape bands in the corresponding repetitive moire.

If the original moire shape source image $M_O$ and the target moire shape $M_S$ have different layouts, create a linear transformation $T_{MO}$ between the layout of the moire shape $M_S$ and the original moire shape source image $M_O$ (FIG. 16, 162).

According to the moire shape movement direction 174 and to the moire shape layout 175, define the moire displacement vector $P_m=(p_{mx}, p_{my})$, see FIG. 17B, 176).

According to the moire displacement vector $P_m$, define 164 the underlying base band replication vector $t_b=(t_x, t_y)$ $$t_y = \frac{p_{my} \cdot T_r}{p_{my} + T_r} \text{ and } t_x = \frac{p_{mx}}{1 + t_y / (T_r - t_y)} \tag{3}$$

The formula expressing the linear transformation $T_{BM}$ (FIG. 16, 164) between base layer space $(x_b, y_b)$ and moire space $(x_m, y_m)$, for 1D moires is (see patent application Ser. No. 11/389,992 to Hersch and Chosson):

$$\begin{bmatrix} x_m \\ y_m \end{bmatrix} = \begin{bmatrix} 1 & \frac{t_x}{T_r - t_y} \\ 0 & \frac{T_r}{T_r - t_y} \end{bmatrix} \cdot \begin{bmatrix} x_b \\ y_b \end{bmatrix} \tag{4}$$

Its inverse transformation $T_{BM}^{-1}$ defines the size of a single base band from the size of the moire shape $M_S$.

Scan the base layer $B_r$, pixel by pixel and scanline by scanline, map with transformation $T_{BM}$ each base layer pixel coordinate $(x_b, y_b)$ to the corresponding moire shape coordinate $(x_m, y_m)$, map that moire shape coordinate into the original moire source image $M_O$ by applying the linear transformation $T_{MO}$, read the corresponding moire source image value, by reading or possibly resampling the corresponding intensity (respectively color) and write it into the base layer $B_r$ at the current s-random displaced pixel coordinate $(x_b, y_b+v[y_b \text{ div } t_y])$, see FIG. 16, 166 and 167. The s-random displacement $v[y_b \text{ div } t_y]$ added to the current pixel ordinate $y_b$ is obtained by calculating the current base band number $(y_b \text{ div } t_y)$ and using it as index into the s-random displacement vector v. This step reproduces the base layer element shape, here the base band content, within each base band.

Figure 18:
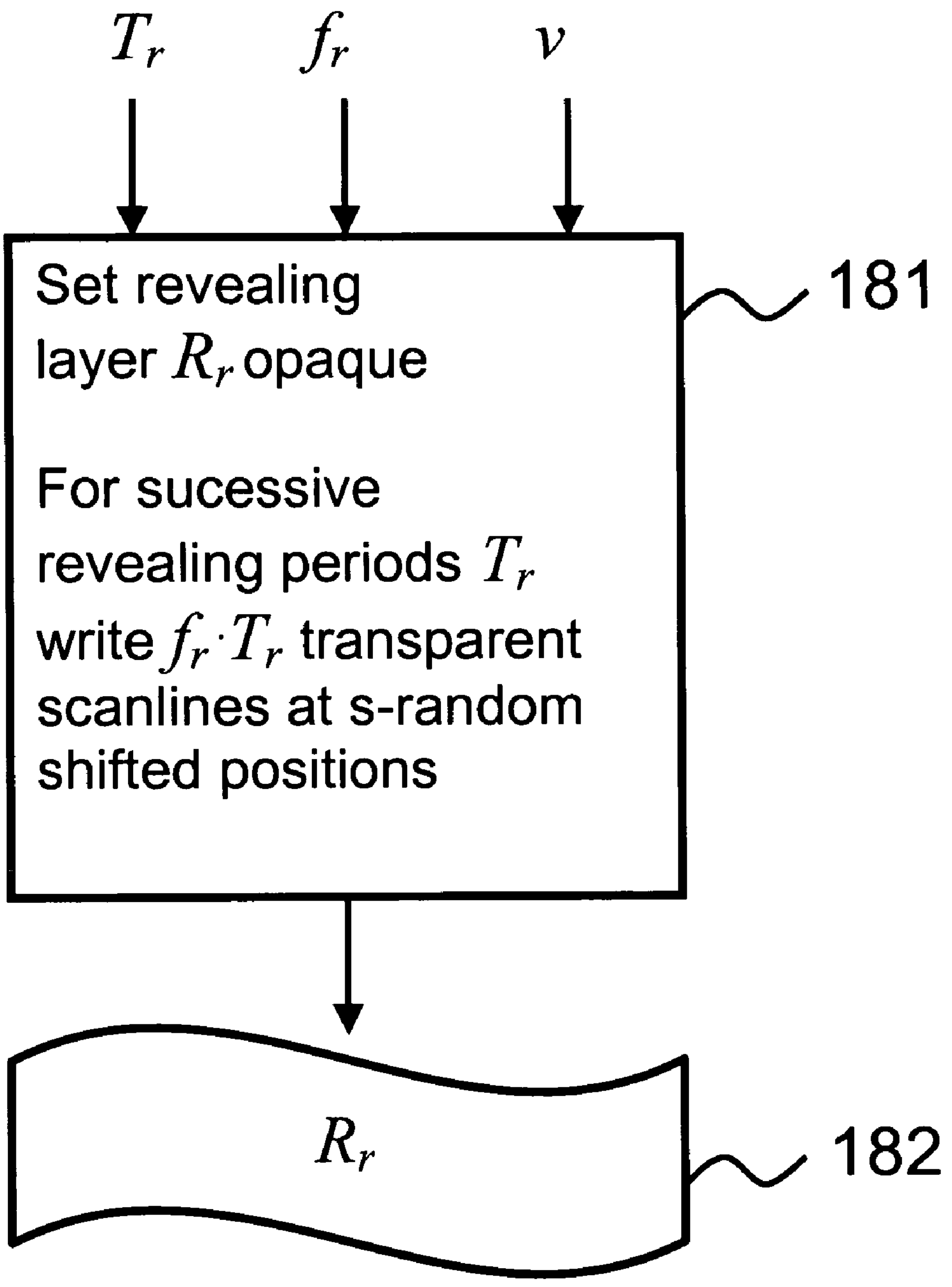
FIG. 18 shows possible steps 181 for generating an s-random rectilinear revealing layer $R_r$, starting from the parameters $T_r$ (revealing layer period), $f_r$ (fraction of revealing layer period aperture) and v (s-random displacement vector)

Define a revealing layer size, generally equal to the base layer size, initialize the corresponding revealing layer as opaque and for each successive set $s_i$ of scanlines forming the underlying revealing layer period $T_r$, write into the rectilinear revealing layer $R_r$ (FIG. 18, 182) a subset $f_r \cdot T_r$ of transparent scanlines, corresponding to the ratio $f_r$ of the revealing layer aperture. This subset of transparent scanlines forms one revealing layer sampling element. They are written at the s-random displaced ordinate $y_r+v[s_i] \cdot T_r/t_y$, where $y_r$ is the current underlying scanline ordinate. The added s-random displacement $v[s_i]$ is scaled by $T_r/t_y$ since the revealing layer period $T_r$ is scaled by the factor $T_r/t_y$ in respect to the vertical base layer period $t_y$.

In case the revealing layer is embodied by a 1D microlens array, the focus lines of the cylindrical lenses in the microlens array are laid out to follow the transparent aperture of the revealing layer.

The superposition of the base and revealing layer, with a small gap between them, preferably similar to the size of the underlying base layer period, allows to create the planned dynamic moire shape movement, by tilting the compound base and revealing layers.

b) Synthesis of Geometrically Transformed 1D Parallax Moire Shapes

One chooses for the curvilinear moire a preferably non-linear geometric transformation and its geometric transformation parameters according to a desired moire shape movement. Preferred geometric transformations are the transformations described by Hersch and Chosson in U.S. patent application Ser. No. 11/349,992, but instead of having repetitive, dynamically moving moire shape bands, we only have here a single moire shape band moving dynamically when tilting the compound transformed base and revealing layers horizontally, vertically or diagonally In the following formula, the geometric transformations are expressed as transformations from transformed space $(x_t, y_t)$ back to rectilinear space $(x_m, y_m)$. The general equation (5), which enables calculating a transformed base layer from a desired geometrically transformed moire layer described by its transformation $x_m=m_x(x_t, y_t)$ and $y_r=m_y(x_t, y_t)$ and a possibly transformed revealing layer described by its transformation $y_r=g_y(x_t, y_t)$, is the same as in in U.S. patent application Ser. No. 11/349,992 (Hersch and Chosson):

$$h_x(x_t, y_t) = (g_y(x_t, y_t) - m_y(x_t, y_t)) \cdot \frac{t_x}{T_r} + m_x(x_t, y_t) \tag{5}$$

$$h_y(x_t, y_t) = g_y(x_t, y_t) \cdot \frac{t_y}{T_r} + m_y(x_t, y_t) \cdot \frac{T_r - t_y}{T_r}$$

If the revealing layer remains untransformed, the identity transformation $g_y(x_t, y_t)=y_t$ is inserted in Eq. (5). The resulting geometric transformation $T_{GB}$ from transformed base layer to rectilinear base layer is expressed according to Eq. (5) by $h_x(x_t, y_t)$ and by $h_y(x_t, y_t)$.

Figure 19:
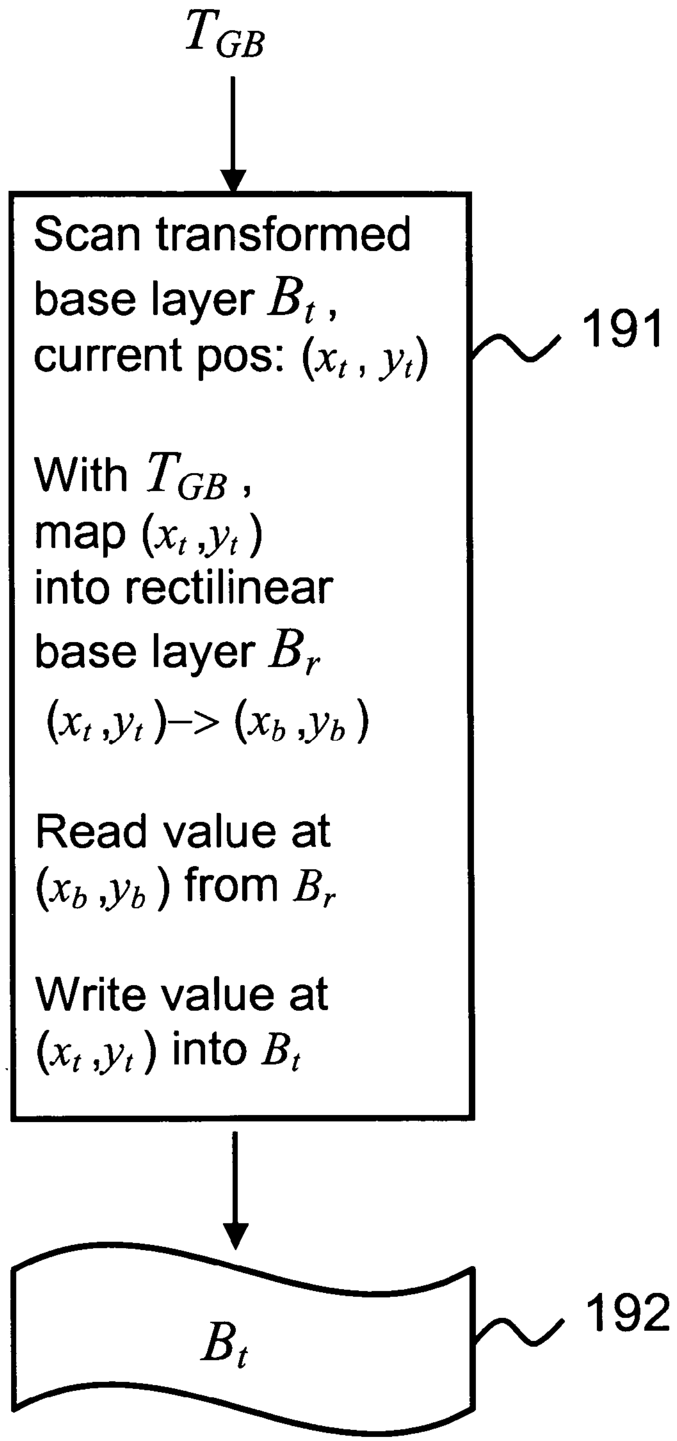
FIG. 19 shows possible steps 191 for generating an s-random geometrically transformed base layer $B_t$ (192), according to a given geometric transformation $T_{GB}$, starting from an s-random rectilinear base layer $B_r$.

The curvilinear transformed base and revealing layers are preferably generated from the corresponding rectilinear layers by the following steps:

compute the size of the transformed base layer $B_t$ according to the size of the desired transformed moire shape or by mapping the rectilinear base layer into the transformed base layer;

in order to generate the transformed base layer $B_t$ (FIG. 19, 192), scan the transformed space $(x_t, y_t)$ pixel by pixel and scanline by scanline, find according to the transformation $T_{GB}$: $x_b=h_x(x_t, y_t)$, $y_b=h_y(x_t, y_t)$ the corresponding coordinates $(x_b, y_b)$ in the rectilinear base layer space $B_r$, obtain the value at these coordinates by reading and possibly resampling the corresponding intensity (respectively color) and write it back at the current geometrically transformed space position ($x_t$, $y_t$), see FIG. 19, 191;

in order to generate the transformed revealing layer $R_t$, scan the transformed space ($x_t$, $y_t$) pixel by pixel and scanline by scanline, find according to the transformation $y_b = g_y(x_t, y_t)$ the corresponding coordinates ($x_b$, $y_b$) in the rectilinear base layer $R_r$, obtain the value at these coordinates by reading and possibly resampling the corresponding intensity (respectively color) and write it back at the current geometrically transformed space position ($x_t$, $y_t$);

in case the revealing layer is embodied by a 1D microlens array, the focus lines of the cylindrical lenses in the microlens array are laid out to follow the transparent aperture of the revealing layer.

Stacking the base and revealing layer together, with a small gap between them, enables creating the desired compound layer exhibiting the curvilinear dynamic moire shape movement upon tilting it in respect to the observation sensor (image acquisition device or human eye).

c) Synthesis of 2D Parallax Moire Shapes

The 2D parallax moire shapes are generated in a similar manner as 1D parallax moire shapes, but with the additional parameters provided by its two degrees of freedom. 2D parallax moire shapes can be generated, for example, by performing the following steps:

1. Generate the s-random base layer by placing the base layer dot elements on an underlying periodic grid, where each dot location is slightly perturbed by the s-random displacement pair ($x_i$,$y_i$), and by possibly applying a given linear or non-linear geometric transformation $g_B(x,y)$ to the resulting coordinates.
2. Generate the revealing layer by placing the revealing layer dot sampling elements using the same sequence of s-random number pairs ($x_1$,$y_1$), ($x_2$,$y_2$), . . . as in step 1 and possibly applying to the resulting coordinates a geometric transformation $g_R(x,y)=g_M(x,y)-g_B(x,y)$ where $g_M(x,y)$ is the desired geometric transformation of the resulting moire.
3. Generate the compound layer by fixing together the revealing layer and the base layer, with a certain predefined gap between them.

Possible variants comprise printing the base layer on the back of a predesigned revealing layer; depositing a microlens revealing layer on top of a preprinted base layer; and generating the base and revealing layers of the compound layer simultaneously, for example with a press printing simulatenously on both sides of the compound layer.

d) Main Steps for the Synthesis of Parallax Moire Shapes

Figure 20:
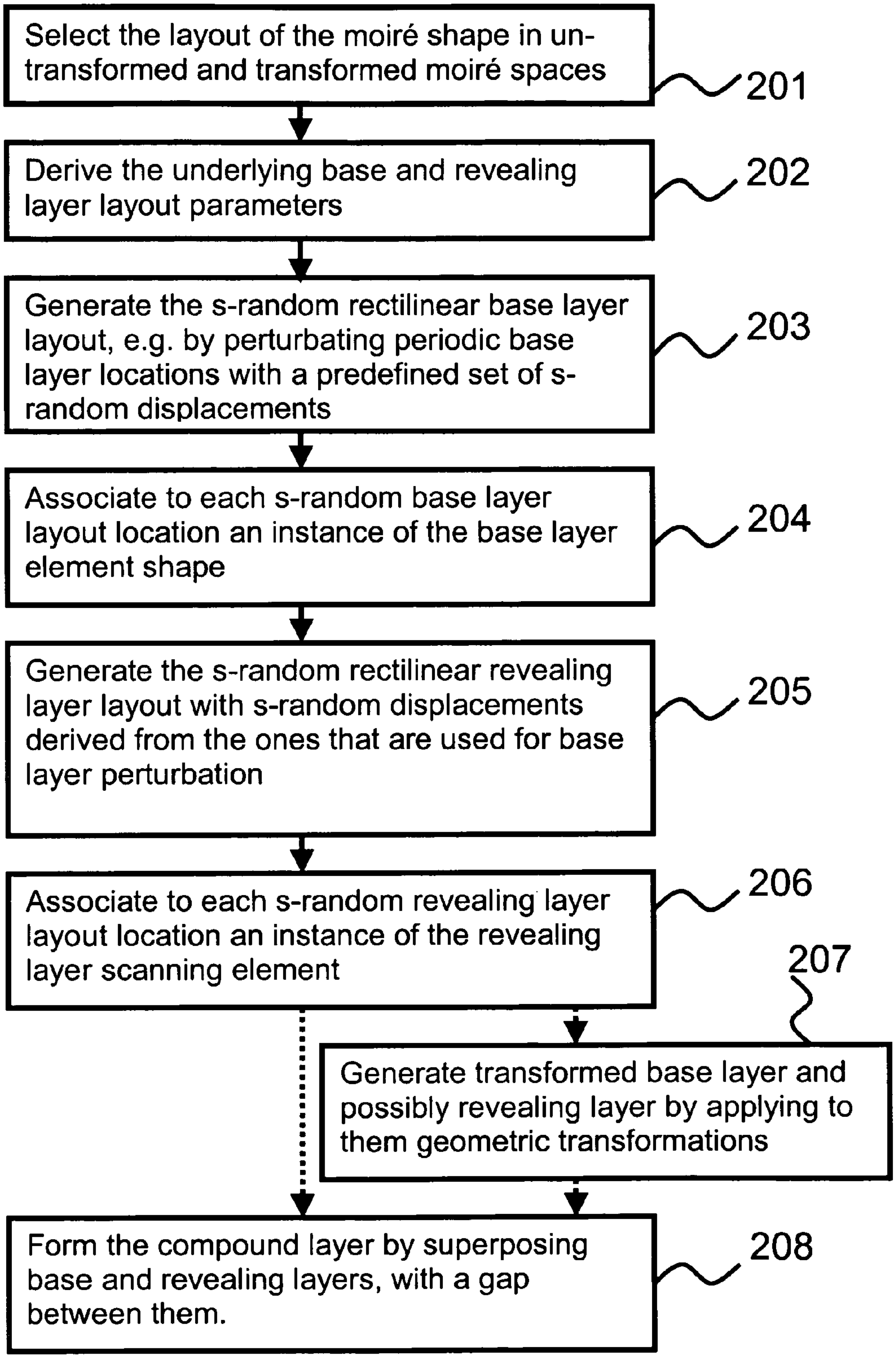
FIG. 20 shows possible main steps for synthesizing a compound layer showing dynamically moving parallax s-random moire shapes.

Possible main steps for synthesizing parallax moire shapes, both 1D and 2D, are illustrated by FIG. 20 as follows:

1. Select the layout 201 of the desired moire shape and possibly its moire displacement, within a geometrically untransformed space, and possibly within a geometrically transformed space and select the underlying layout parameters of the revealing layer (positions of the revealing layer sampling elements).
2. Derive 202 from the layout of the desired moire shape in the geometrically untransformed space the underlying layout parameters of the untransformed base layer.
3. Generate 203 the layout of the s-random untransformed base layer e.g. by perturbing the layout conceived according to the underlying layout parameters with a set of s-random displacement values.
4. Associate 204 to each s-random untransformed base layer layout position an instance of the base layer element shape, derived by a linear transformation from a corresponding moire shape.
5. Generate 205 the layout of the s-random untransformed revealing layer e.g. by perturbing the layout conceived according to its underlying layout parameters with a set of s-random displacement values which are proportional to the ones used in the set for the base layer perturbation.
6. Associate 206 to each s-random untransformed revealing layer layout position an instance of the revealing layer sampling element.
7. If desired, generate a geometrically transformed revealing layer by applying a selected geometric transformation to the untransformed revealing layer layout. In case the revealing layer remains untransformed, consider the corresponding transformation to be the identity transformation.
8. Possibly, according to the selected layout of the moire shape within a geometrically transformed space, and to the selected geometric transformation of the revealing layer, generate 207 a transformed base layer by applying a corresponding geometric transformation to the untransformed base layer layout. The respective geometric transformations defining the layouts of respectively the moire shape, the transformed s-random base layer and the transformed s-random revealing layer respect a mathematical relationship known from moire theory.
9. Form a compound layer 208 with the resulting base and revealing layers.

The resulting compound layer is to be integrated with the document or valuable article to be protected from counterfeits. For example, the compound layer may be fixed onto the valuable item or integrated within the valuable item, for example integrated within a plastic identity card.

The compound layer shows, due to the superposition of the s-random base and revealing layers, a single moire shape instance which, when tilting the compound layer in respect to the observation orientation, varies in its size or its orientation, as illustrated in FIGS. 8-14, and/or moves along a trajectory determined by the base layer and revealing layer layout parameters and by the observation angles.

The steps described above need not be carried out in the order shown above. It is also possible to "learn by experience" by producing moire shapes with different s-random base layer and revealing layer layouts and retaining the base layer and revealing layer layout parameters yielding the most convenient moire shape, i.e. an adequate shape size, an adequate moire shape movement, and possibly an adequate moire shape size modification during the movement of the moire shape. Such a "learn by experience" approach does not require steps 1 and 2 above.

Creating the perturbations in the base and revealing layers can be carried out by alternative means, for example by generating a sequence of s-random numbers which can be directly used for positioning the base layer element shapes and the revealing layer lines, respectively dot elements.

Examples of Rectilinear 1D Parallax Moire Shapes

The following embodiments illustrate s-random 1D parallax moire shapes. Many other examples can be obtained by modifying parameters and selecting other geometric transformations. An example of 1D rectilinear parallax moire shape is given in FIGS. 4A, 4B and 4C; in this case tilting the compound layer vertically creates a vertical moire displacement.

EXAMPLE 4

Rectilinear Oblique Moire Displacement Upon Vertical Tilt

Figure 21A:
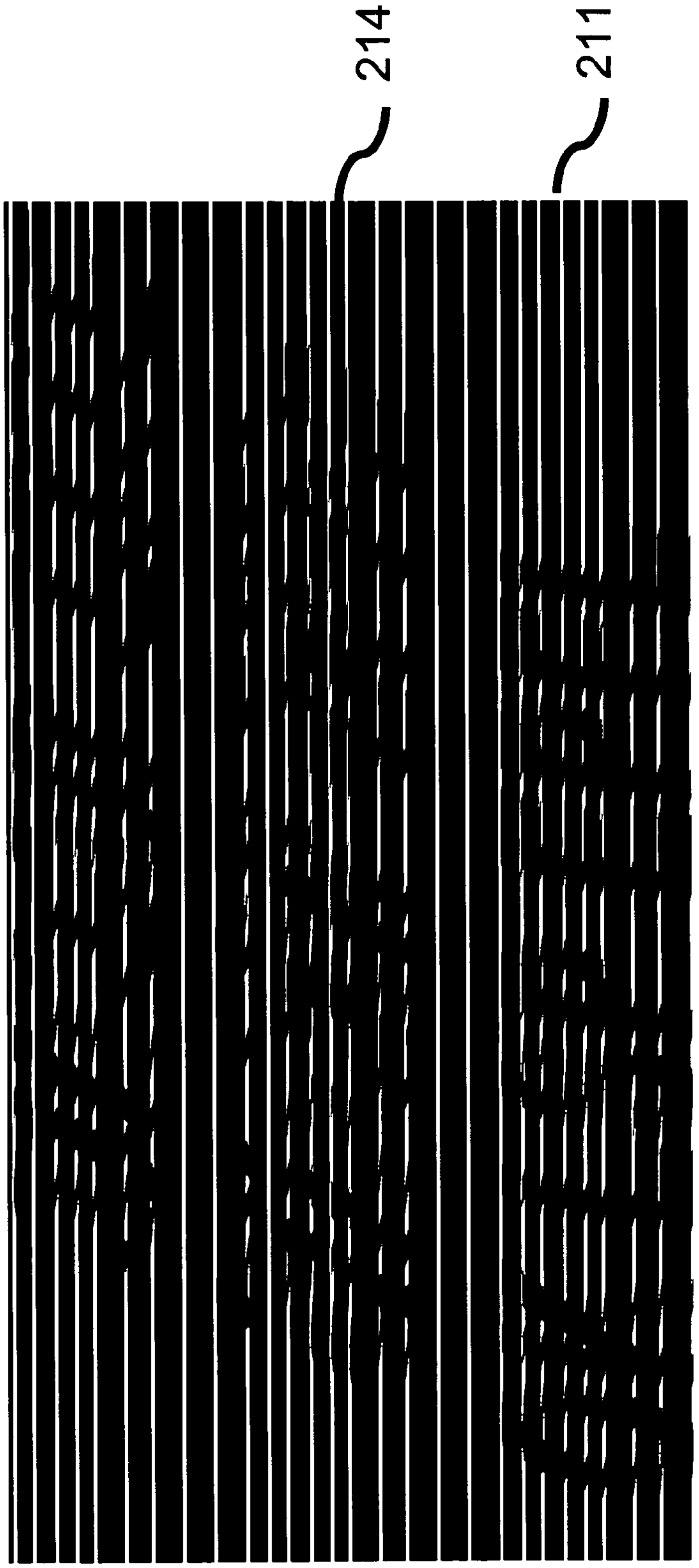
FIGS. 21A, 21B and 21C show an example of the 1D rectilinear s-random moire shape "OK LSP EPFL" moving from a bottom position 211, to a middle position 212 and then to a top position 213 when tilting the compound layer.
Figure 21B:
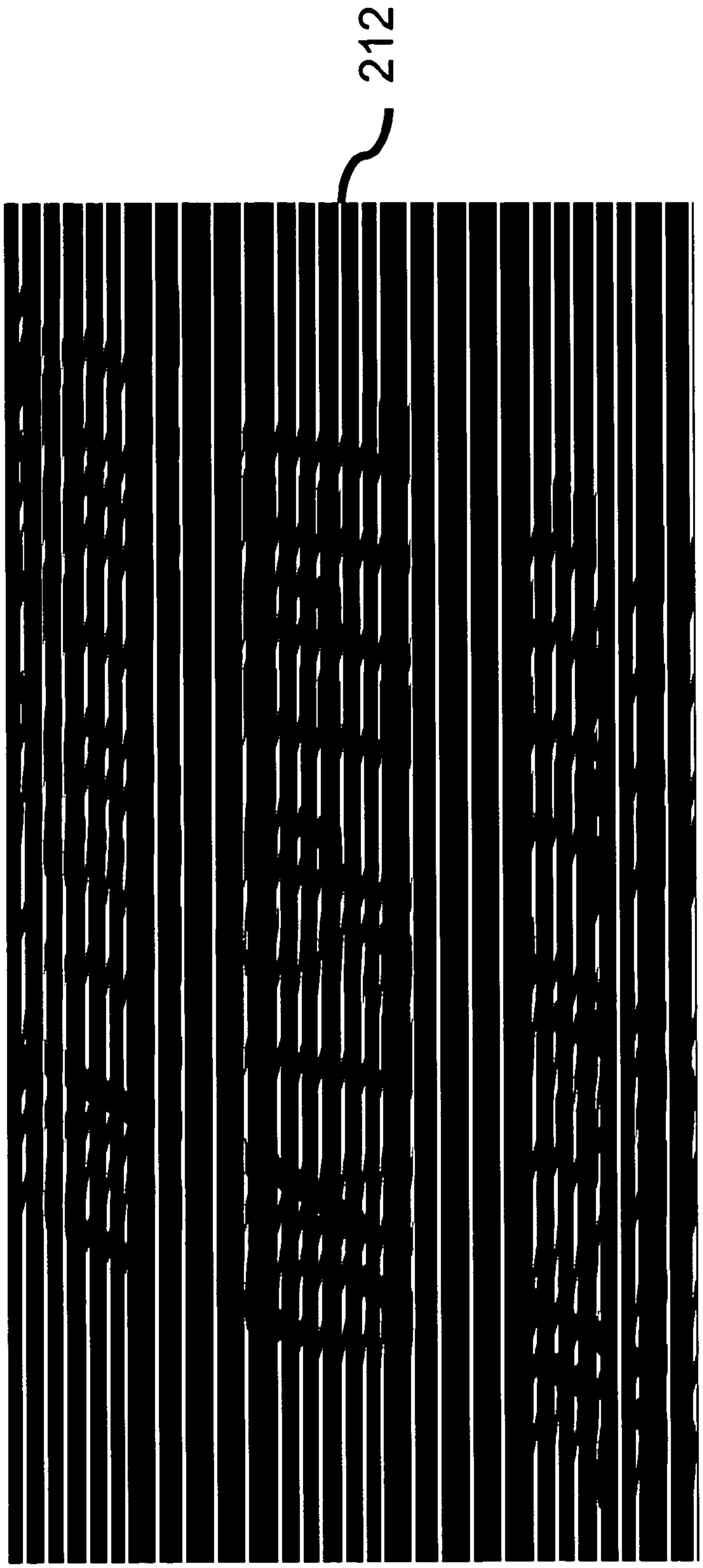
Figure 21C:
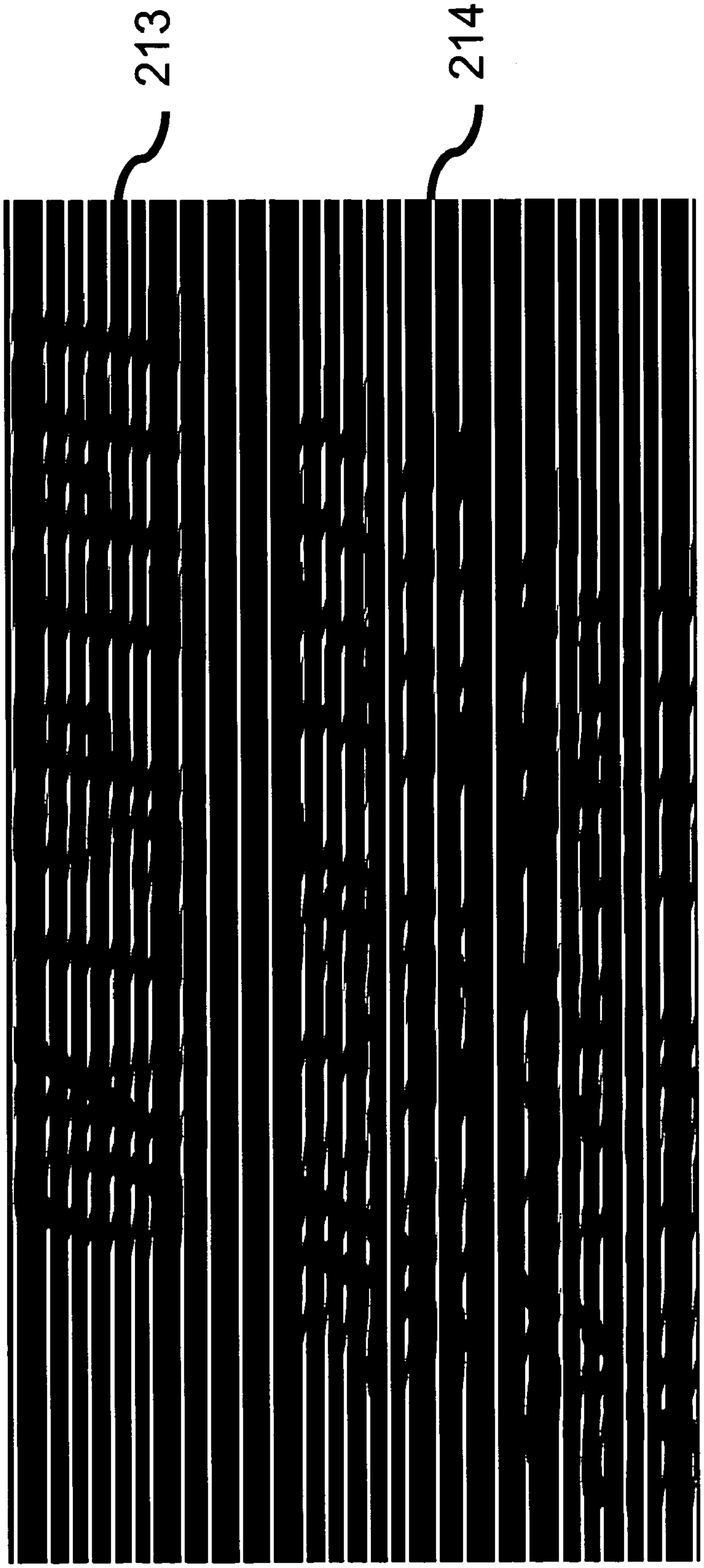

By selecting an oblique moire replication vector $P_m=(p_{mx}, p_{my})$, the moire displacement will be oblique. For example with $p_{mx}=\frac{1}{2}p_{my}$, the moire shape moves along the arctan(2)=63.4 degrees orientation (see FIGS. 21A, 21B and 21C, where upon vertical tilt, the moire moves from position 211 to positions 212 and then to 213). Clearly, only one moire shape instance (i.e. one moire band) is distinguishable at every vertical tilt orientation. The locations which are not covered by the currently visible moire shape instance appear as noisy or scrambled stroke elements 214.

EXAMPLE 5

Horizontal or Slightly Oblique Displacement Upon Vertical Tilt

A horizontal or slightly oblique moire displacement can be produced upon vertical tilt of the compound base and revealing layer. FIG. 17A shows schematically a moire shape 172 which moves horizontally 173 upon tilting vertically 177 the revealing layer. Its revealing layer lines 171 have an oblique orientation (angle $\theta_r<45°$, i.e. they have an absolute slope $|s|<1$). Such a moire is created by starting with horizontal revealing layer lines (FIG. 17B, 171), e.g. embodied by 1D microlenses and by defining an oblique moire displacement 174 along the orientation given by angle $\theta_r$. The moire replication vector $P_m$ 176 shows the movement of the moire shape 175 by one underlying moire replication period $|P_m|$. The resulting compound base and revealing layer is turned by $\theta_r$ and may be cut 179 so as to produce a rectangular compound layer, which when vertically tilted, generates a horizontal moire displacement (e.g. between one and two moire replication periods).

EXAMPLE 6

Vertical or Strongly Oblique Displacement Upon Vertical Tilt

Figure 22:
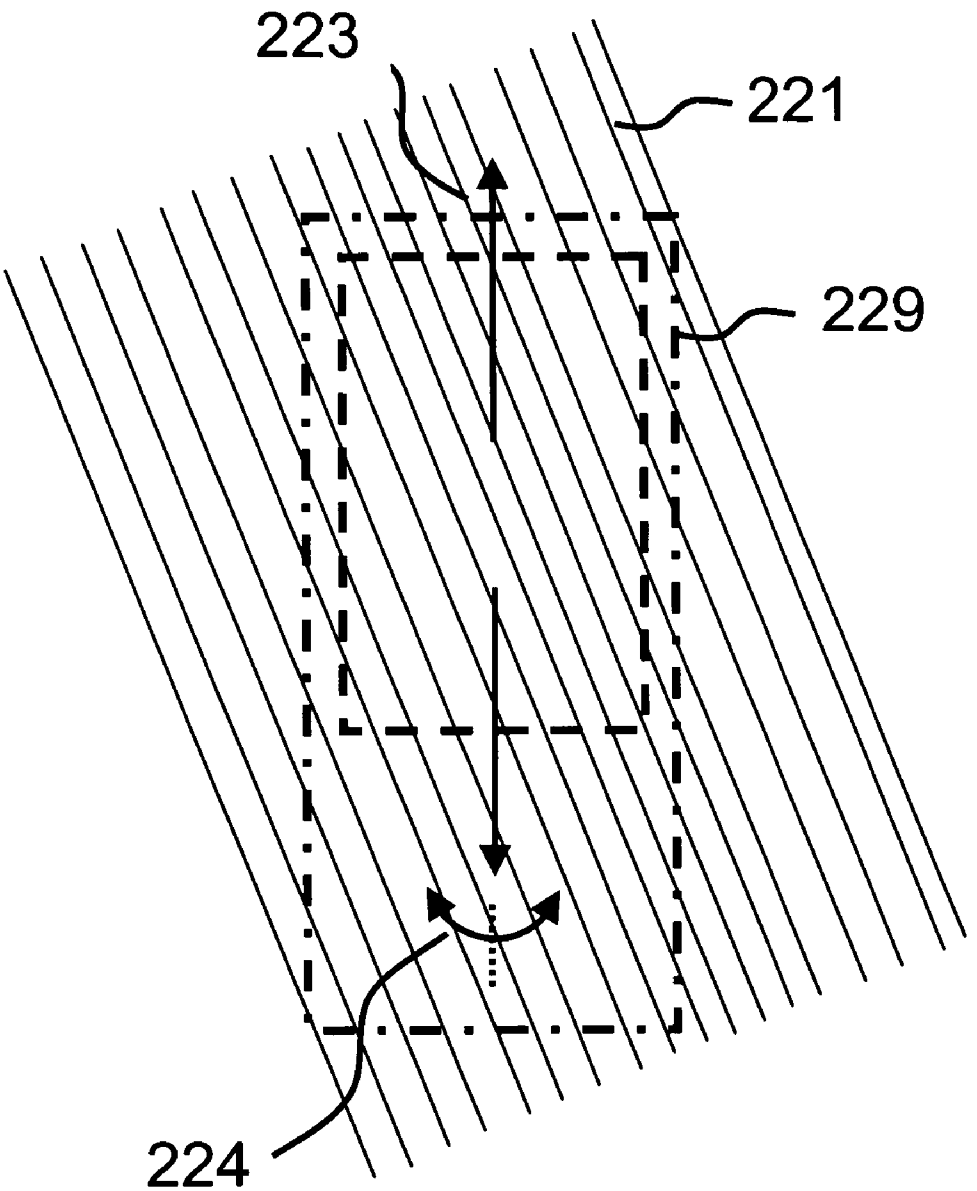
FIG. 22 shows a moire shape moving vertically 223 when tilting the compound layer horizontally 224, possibly embodied by the moire shape of FIG. 17, but rotated by 90 degrees.

This case is analogous to the previous one. One may conceive a horizontal moire movement with oblique revealing layer lines as in Example 6 and turn the compound layer by 90 degrees. This yields a compound layer (FIG. 22) with vertically oriented oblique revealing layer lines of absolute slope $|s|>1$, 221, which upon horizontally tilt 224, yield a vertical moire displacement 223.

EXAMPLE 7

Figure 23A:
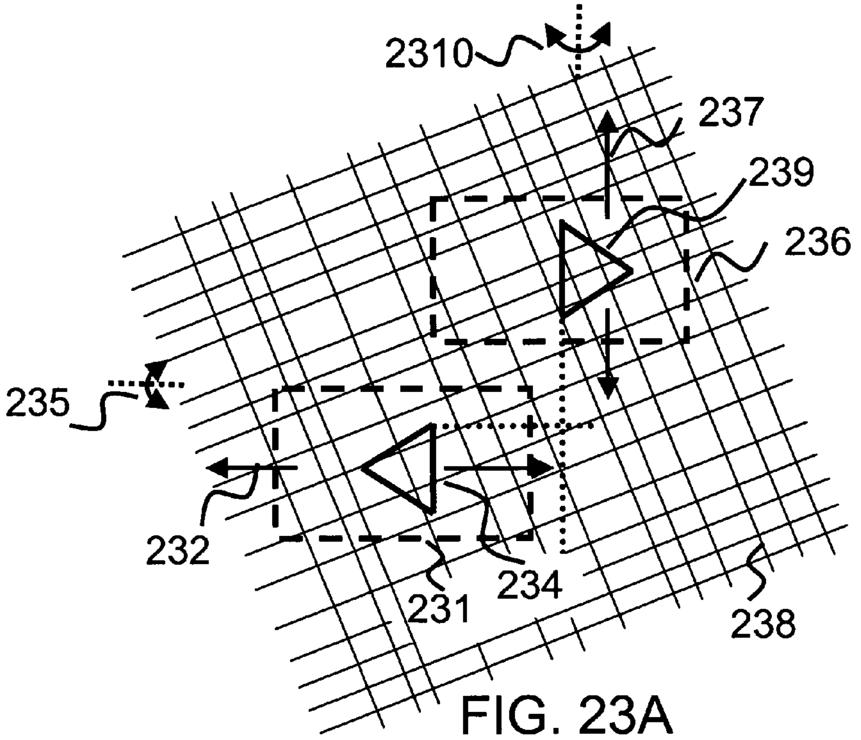
FIG. 23A shows a compound layer formed by two partially superposed pairs of s-random base and revealing layers, with the separate moire shapes 239 and 234, moving towards one another when changing the tilt orientation.

Combined Horizontal, Respectively Vertical Moire Shape Displacement Upon Vertical, Respectively Horizontal Tilt The present case is the combination of Example 5 and 6. This can be simply achieved by creating a compound layer comprising the layouts of the two corresponding base layers and of the two corresponding revealing layers. For example, one may create two substantially perpendicular sets of revealing layer lines. FIG. 23A shows such a compound layer with, upon vertical tilt 235, a horizontally 232 moving moire element 231 with the moire shape 234, and upon horizontal tilt 2310, a vertically 237 moving moire element 236 with moire shape 239. Corresponding sets of revealing lines are respectively 233 and 238. The layout of the base band layers and revealing line layers associated respectively to the moire element 231 and to the moire element 236 can be designed to yield the two moire shapes 234 and 239 to be adjacent one to another (or if desired, partly or fully superposed) when the compound layer is observed along a specific orientation, e.g. its normal (zero degree observation angle, FIG. 6, 63). Tilting the compound layer horizontally 2310 yields a vertical displacement of moire shape 239. Tilting the compound layer vertically 235 yields a vertical horizontal of moire shape 239. The coordinated movement of two moire shapes is very difficult to achieve without precise knowledge of all parameters of the base and revealing layer layouts (s-random displacement vector of each of the two pairs of the base and revealing layers, underlying replication vector of each set of base bands, underlying revealing layer period, etc.).

EXAMPLE 8

Rectilinear Moire Displacement with Cosinusoidally Transformed Revealing Layer and Corresponding Curvilinear Base Layer It is also possible to produce rectilinear moire shapes with curvilinear base and revealing layers, as described in "Example A. Rectilinear moire image and a cosinusoidal revealing layer" in U.S. patent application Ser. No. 11/349,992 (Hersch and Chosson). By applying s-random displacements to the base bands and to corresponding revealing layer lines, we generate the same moire shapes as in U.S. patent application Ser. No. 11/349,992, but with only one band of the moire shape. Cosinusoidal revealing layer lines are especially attractive, since their main orientation departs only slightly from corresponding horizontal or vertical revealing layer lines and the achievable parallax effect is therefore similar to the one achievable by horizontal, or slightly oblique revealing layer lines (slope $|s|<1$). By turning them by 90°, they may achieve parallax effects similar to ones achievable with vertical or strongly oblique revealing layer lines (of absolute slope $|s|>1$).

Examples of Curvilinear 1D Parallax Moire Shapes

The following examples show curvilinear moire shapes which move along radial, curvilinear orientation, or circular orientations, in a similar manner as their counterparts in U.S. patent application Ser. No. 11/349,992 to Hersch and Chosson. Here however, because of the s-randomness of the revealing layer lines, only one instance (band) of the curvilinear moire is visible and not several instances as in that patent application.

EXAMPLE 9

Radially Moving Circular Moire with Rectilinear Revealing Layer

The present example is similar to Example C in U.S. patent application Ser. No. 11/349,992. The desired moire is a circular moire. Here we choose a rectilinear revealing layer. The desired circular moire layout is given by the transformation mapping from transformed moire space $(x_t, y_t)$ back into the original moire space $(x_m, y_m)$, i.e.

$$x_m = m_x(x_t, y_t) = \frac{\pi - \mathrm{atan}(y_t - c_y, x_t - c_x)}{2\pi} w_x \qquad (6)$$

$$y_m = m_y(x_t, y_t) = c_m\sqrt{(x_t - c_x)^2 + (y_t - c_y)^2)}$$

where constant $c_m$ expresses a scaling factor, constants $c_x$ and $c_y$ give the center of the circular moire image layout in the transformed moire space, $w_x$ expresses the width of the original rectilinear reference band moire image and the function atan(y,x) returns the angle α of a radial line of slope y/x, with the returned angle α in the range ($-\pi<=\alpha<=\pi$). We take as revealing layer a rectilinear layout identical to the original rectilinear revealing layer, i.e. $g_y(x_t,y_t)=y_t$. By inserting the curvilinear moire layout equations and the curvilinear revealing layer layout equation $g_y(x_t,y_t)=y_t$ into the band moire layout model equations (5), one obtains the derived curvilinear base layer layout equations $$h_x(x_t, y_t) = \qquad (7)$$

$$\left(y_t - c_m\sqrt{(x_t - c_x)^2 + (y_t - c_y)^2)}\right) \cdot \frac{t_x}{T_r} \cdot \frac{\pi - \mathrm{atan}(y_t - c_y, x_t - c_x)}{2\pi} w_x$$

$$h_y(x_t, y_t) = c_m\sqrt{(x_t - c_x)^2 + (y_t - c_y)^2)} \cdot \frac{T_r - t_y}{T_r} + y_t \cdot \frac{t_y}{T_r}$$

Figure 24A:
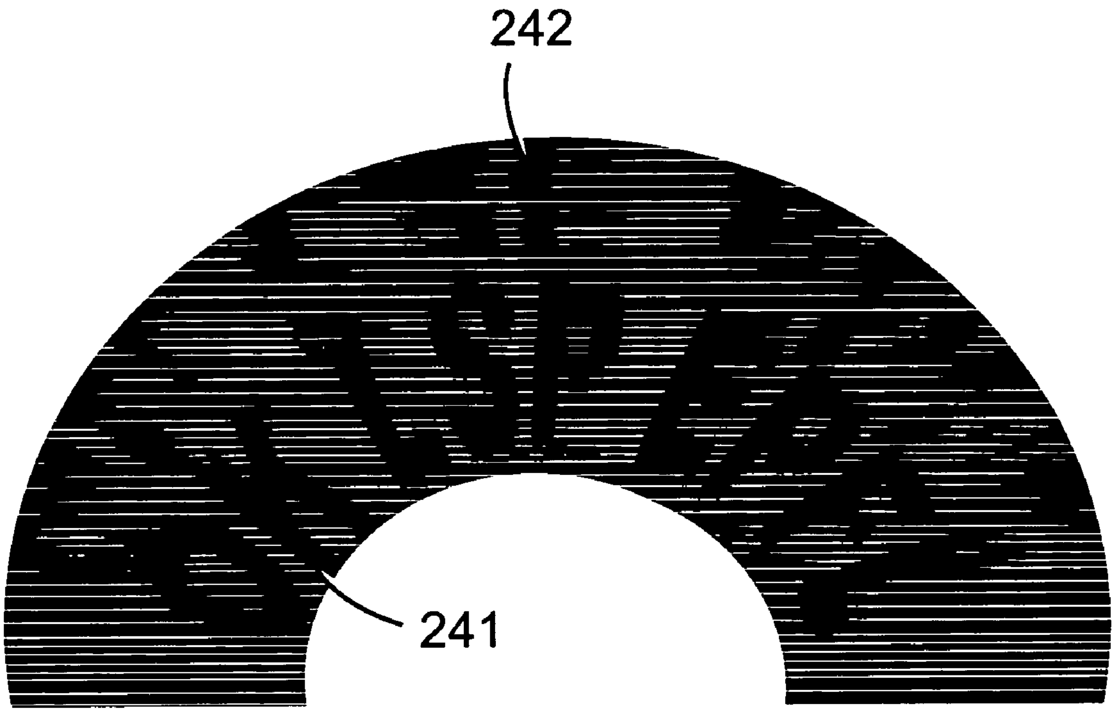
FIGS. 24A and 24B show a circularly laid out moire shape moving radially when tilting the compound layer vertically.
Figure 24B:
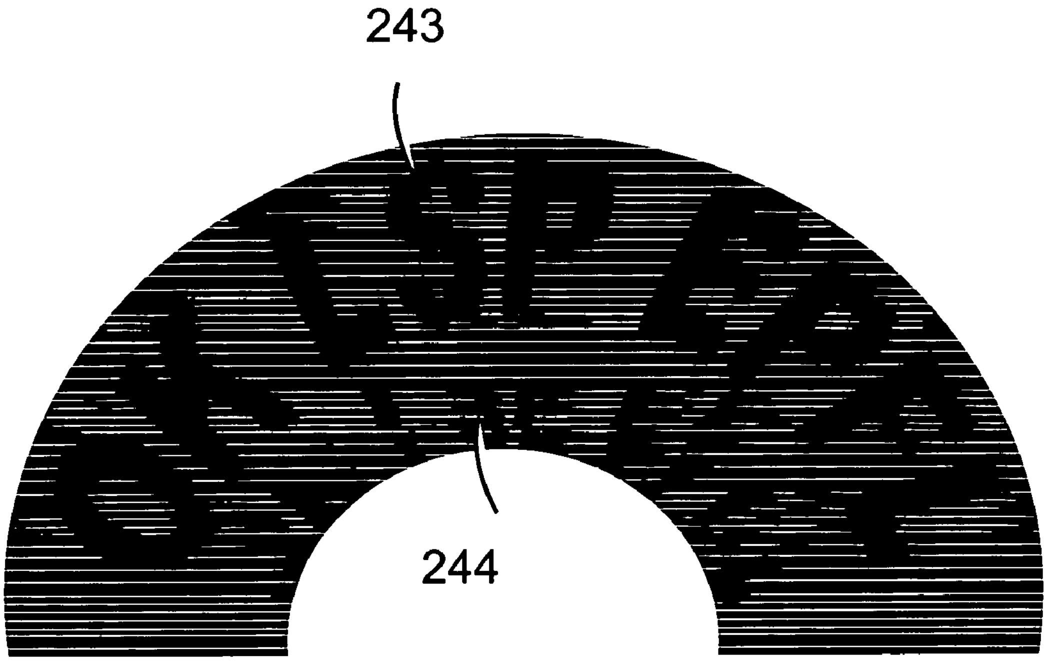
Figure 25A:
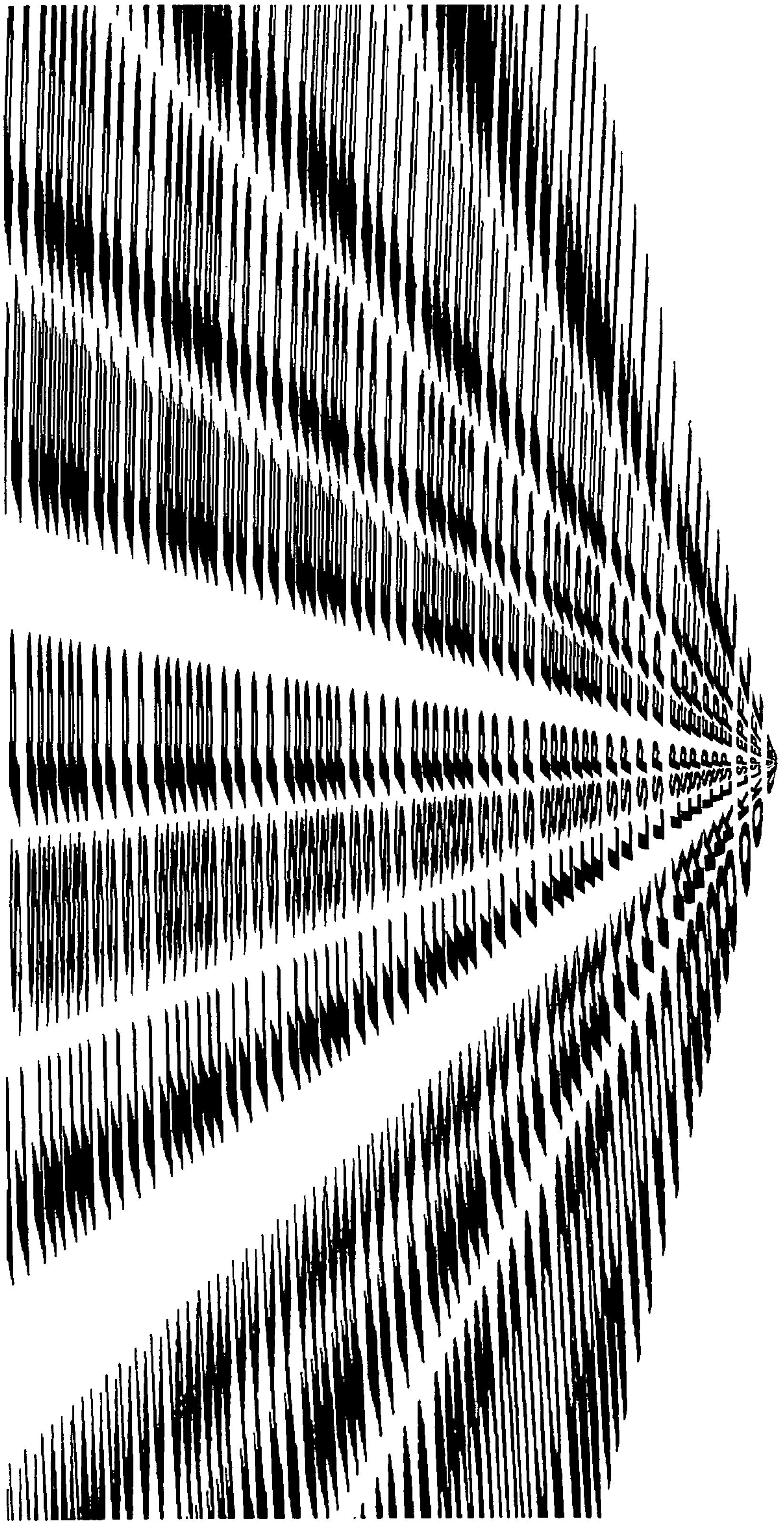
FIGS. 25A and 25B are respectively the 1D s-random geometrically transformed base layer and the corresponding s-random revealing layer with its s-random revealing layer lines, which when superposed with a gap between them, yield the compound layer producing the moire shapes of FIGS. 24A and 24B.

These curvilinear base layer layout equations express the geometric transformation from transformed base layer space to the original base layer space. The corresponding curvilinear base layer in the transformed space is shown in FIG. 25A, the revealing layer in FIG. 25B and the moire shapes resulting from the observation of base and revealing layer separated by a gap in a compound layer are shown in FIGS. 24A and 24B. In FIGS. 24A and 24B, for design purposes, a portion of the compound layer has been cut out. FIG. 24A shows the curvilinear moire 241 consisting of the text "OK LSP EPFL" at one compound layer tilt orientation and FIG. 24B shows the same moire shapes 243 at another compound layer tilt orientation. In these examples, when tilting the compound layer vertically, the moire shapes move radially. The locations 242 and 244 where the moire shapes are not visible at the current tilt orientation show scrambled stroke elements.

Figure 25B:
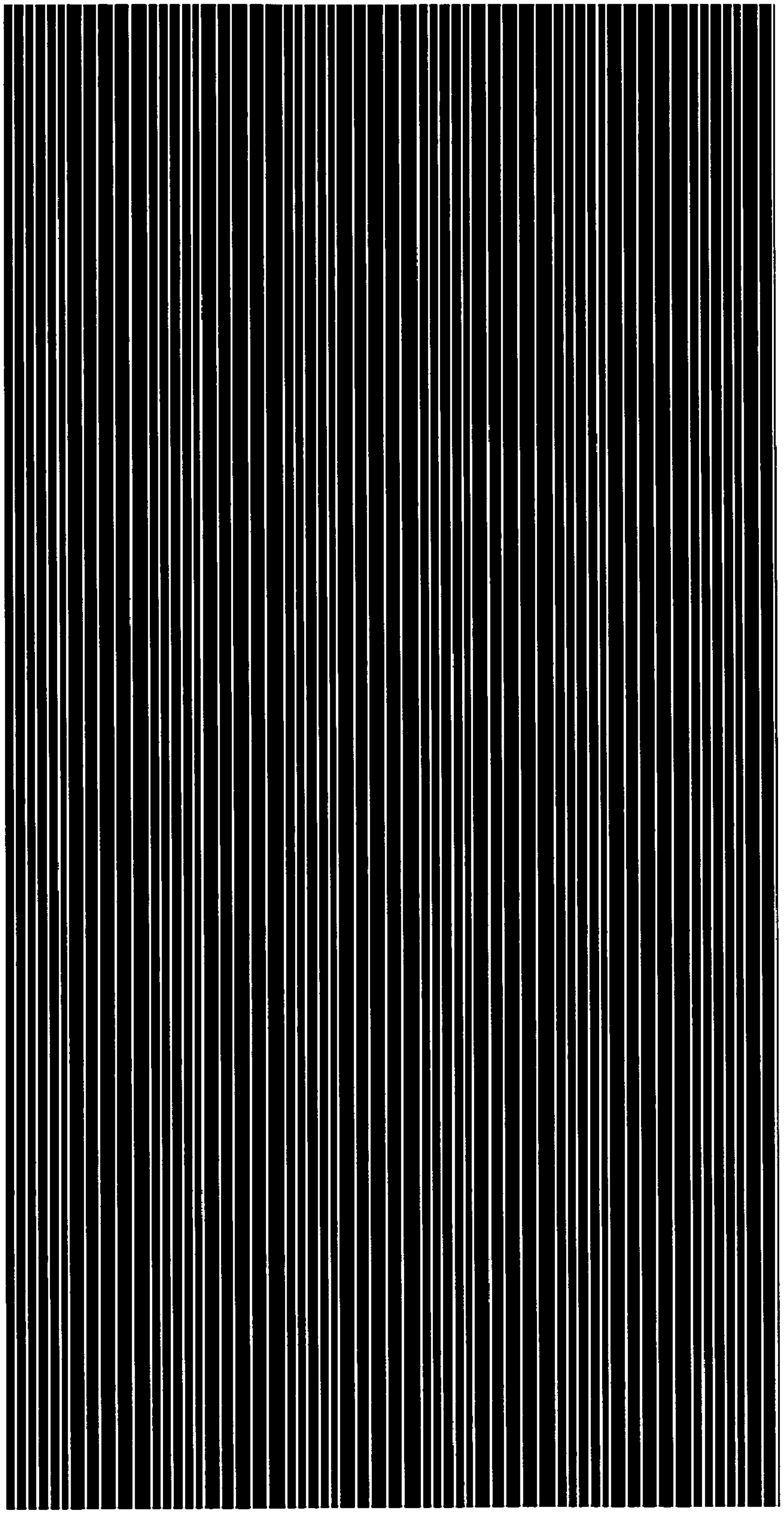
Figure 26A:
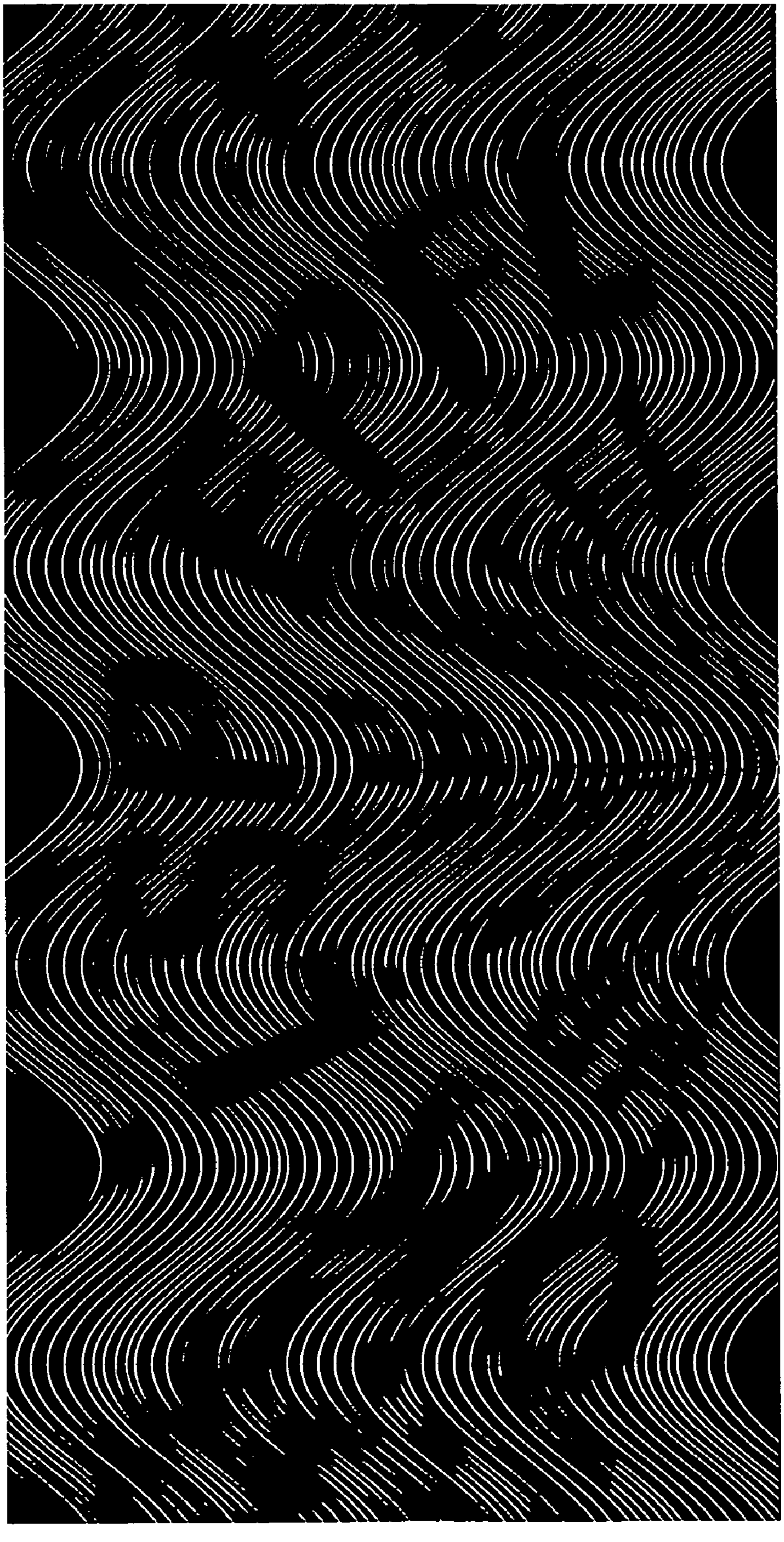
FIG. 26A shows a circular moire shape moving radially, similar to the moire shape of FIGS. 24A and 24B, but with the cosinusoidally transformed revealing layer shown in FIG. 26C, and with the correspondingly geometrically transformed base layer of FIG. 26B.
Figure 26B:
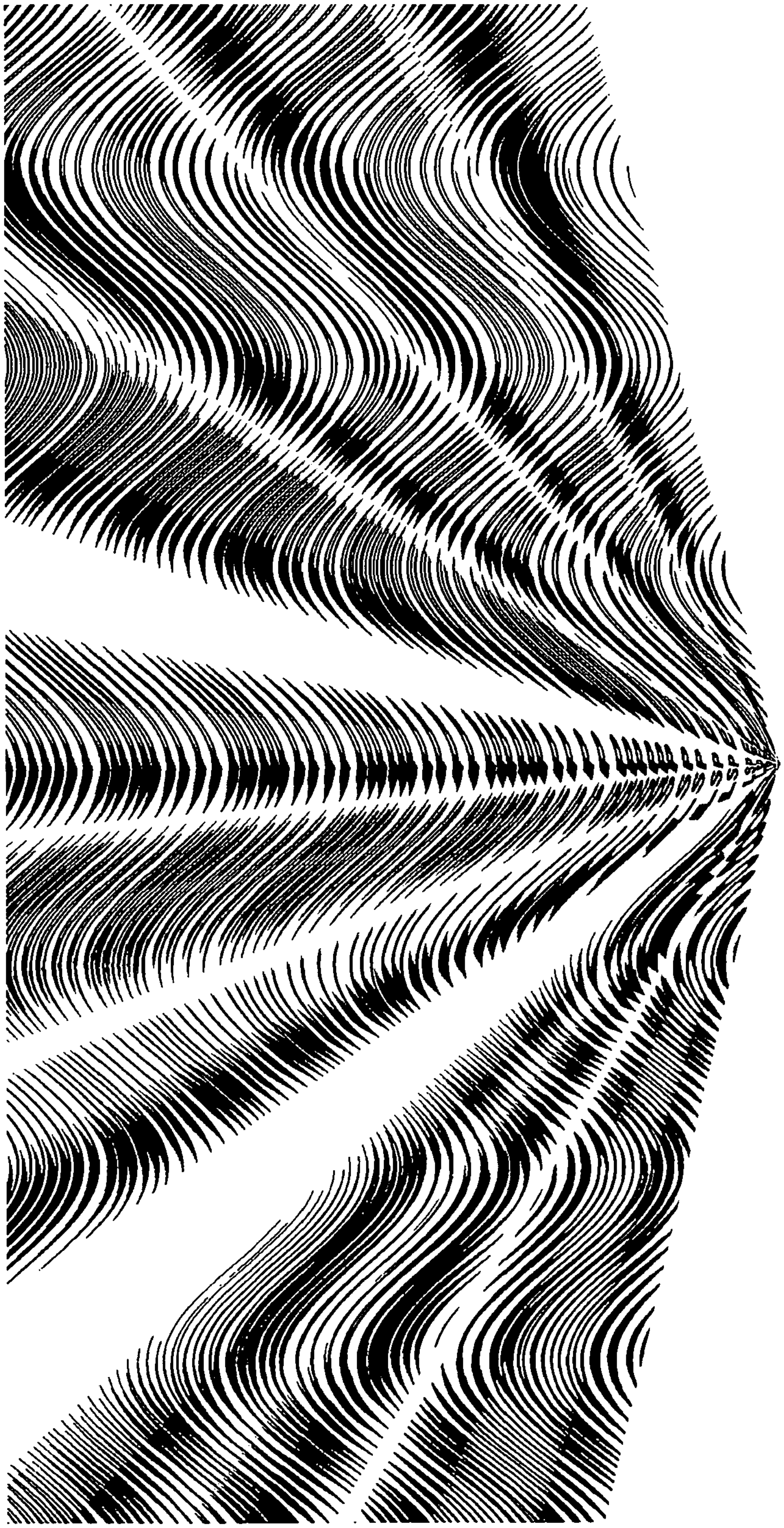
Figure 26C:
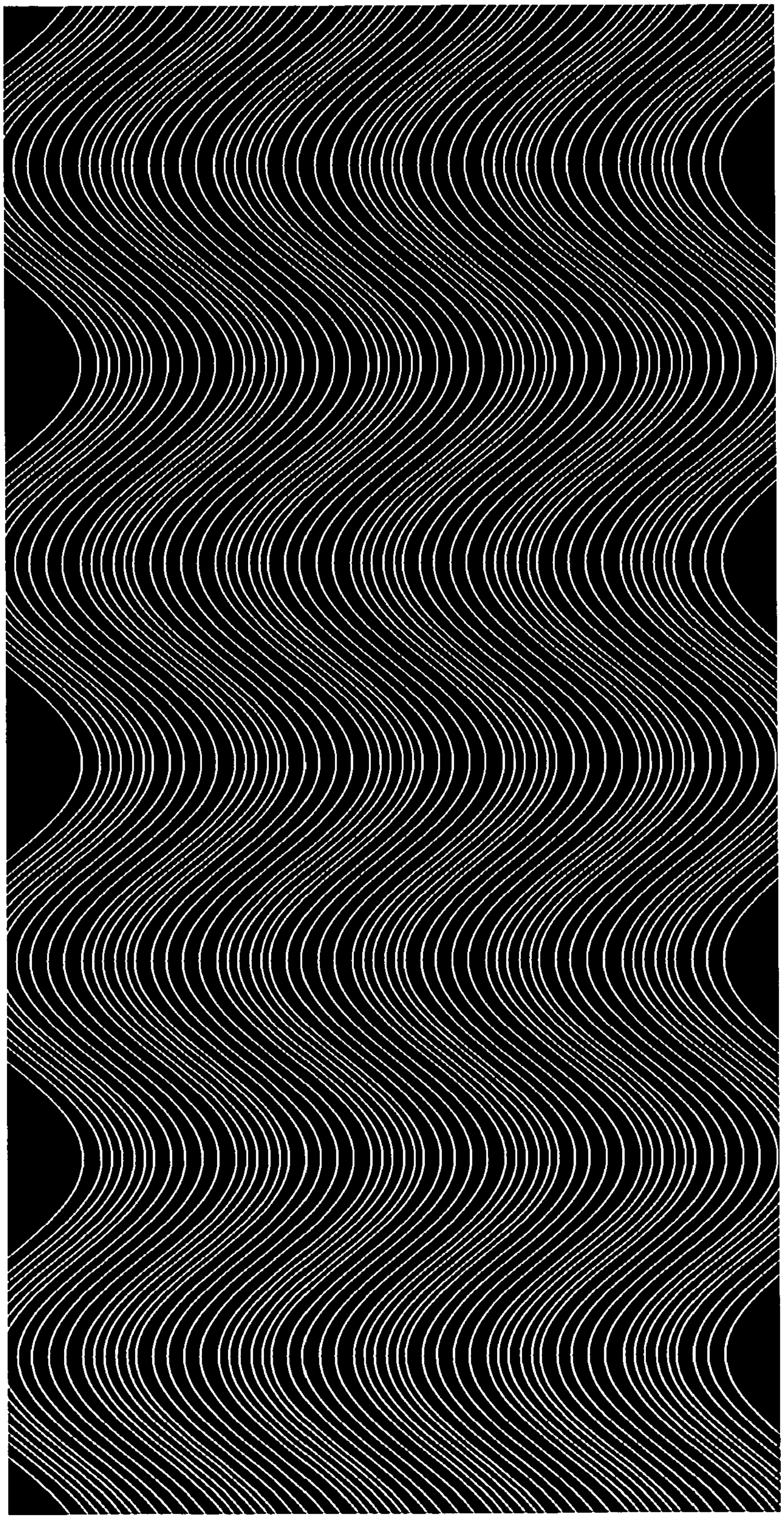

Instead of a rectilinear revealing layer, one could choose a cosinusoidally transformed revealing layer (FIG. 26C) obtained by transforming a rectilinear revealing layer (e.g. FIG. 25B). One may then compute the geometrically transformed base layer by inserting into Eq. (5) for $g_y(x_t,y_t)$ the cosinusoidal geometrical transformation equation $g_y(x_t,y_t)=y_t+c_1 \cos(2\pi(x_t+c_3)/C_2)$, where $c_1$, $c_2$ and $c_3$ represent constants defining the amplitude, period and phase of the resulting cosinusoidal lines. The resulting geometrically transformed base layer is shown in FIG. 26B. One can verify that the resulting moire shape (FIG. 26A) has a circular layout and moves radially, in the same manner as in FIGS. 24A and 24B. U.S. patent application Ser. No. 11/349,992 (Hersch and Chosson) teaches how to extend the curvilinear base layer layout equations in order to produce an ellipsoidal layout. This is carried out by inserting into formula (7) instead of a radial distance from a point $(x_t,y_t)$ to the center of a circle $\sqrt{(x_t-c_x)^2+(y_t-c_y)^2)}$ the corresponding distance from a point $(x_t,y_t)$ to the center of an ellipse $\sqrt{((x_t-c_x)/a)^2+((y_t-c_y)/b)^2)}$, where a and b are freely chosen constants. This enables extending the previously considered concentric circular moire layout to a concentric elliptic moire layout. We therefore call "concentric layouts" both the circular and the elliptic layouts.

EXAMPLE 10

Circularly Laid Out Moire Moving Along a Spiral

Figure 27A:
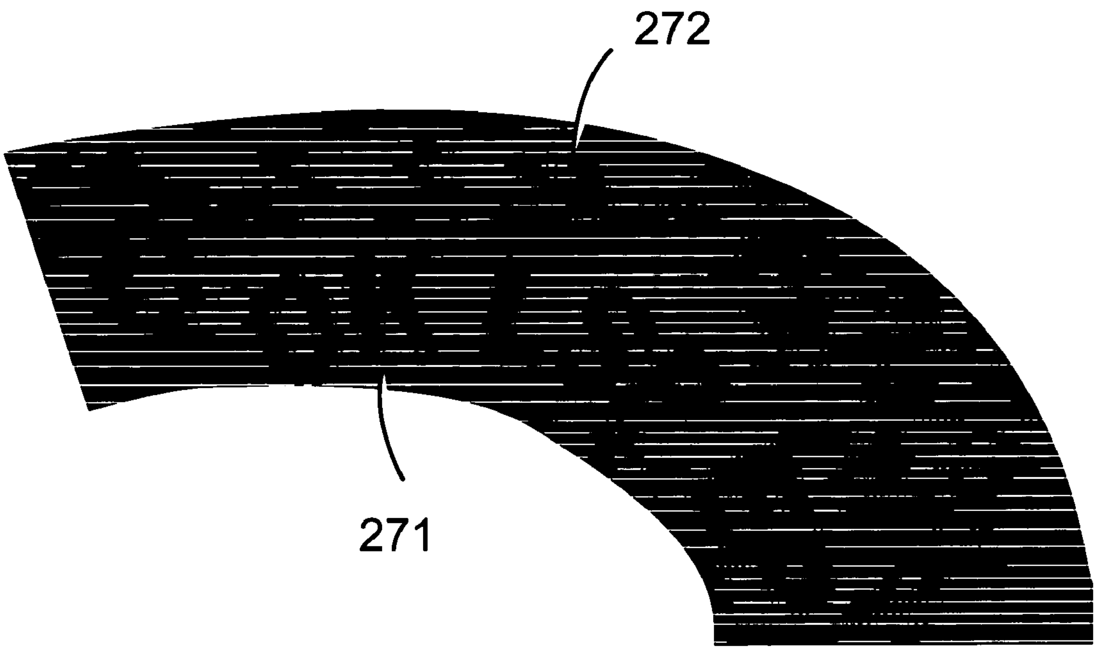
FIGS. 27A and 27B show instances of the circularly laid out moire shape moving along a spiral trajectory when tilting vertically the compound layer from one tilt orientation to a second tilt orientation.
Figure 27B:
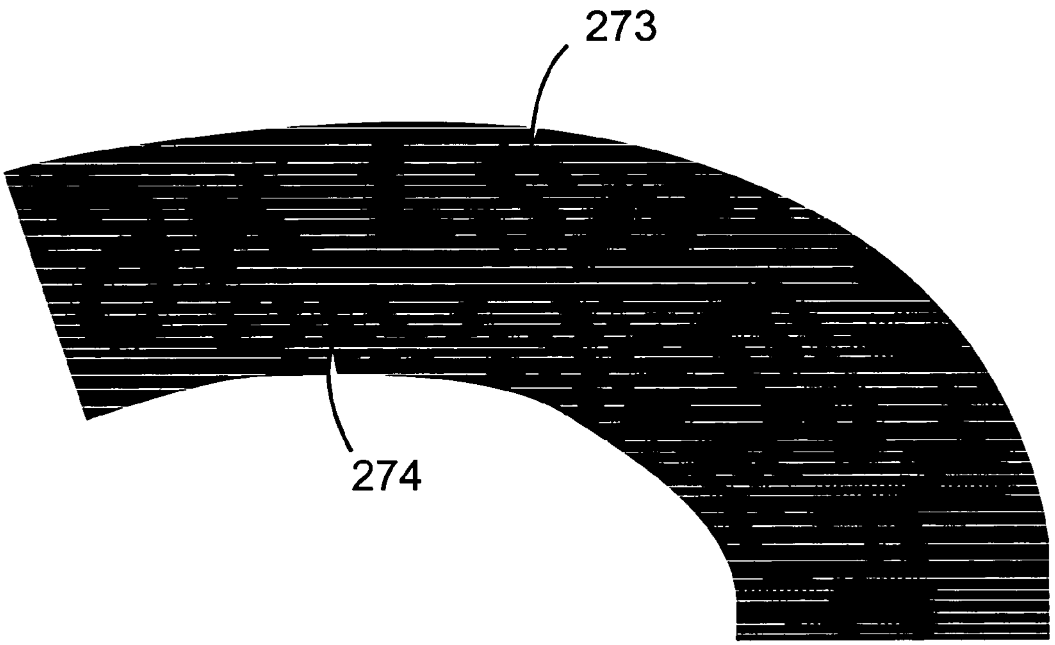

The example shown in FIGS. 27A and 27B is similar to the preceding one, with the difference that here the non-transformed rectilinear base layer is laid out so as to produce a 135 degrees moire displacement, by choosing an oblique moire replication vector $P_m=(p_{mx}, p_{my})$, here with $p_{mx}=-p_{my}$. The rectilinear base layer is first generated. Then the corresponding curvilinear base layer is generated, by making use of the transformation expressed by Eqs. (7). Due to the oblique moire replication vector, when tilting the compound layer vertically, the moire shapes move along a spiral. A more oblique (i.e. more horizontal) moire replication vector yields a spiral having a higher curvature profile. FIGS. 27A and 27B show two snapshots 271 and 273 of the movement of the moire shapes along a spiral. Here, too, the locations 272 and 274 where the moire shapes are not visible at the current tilt orientation show noisy and scrambled stroke elements.

As shown in the examples given above, both in the 1D and in the 2D cases the moire shapes are surrounded by a noisy, random background. Depending on the layout and the s-random parameters of the base and revealing layers, more or less visible noise can be introduced. This can be advantageously used in yet another important embodiment of the present invention, in which the moire shape is buried and hidden within background random noise, so that it is not visible when the compound layer is not tilted, and it only appears and becomes visible upon tilting movement of the compound layer (or when the observer is moving). This happens because upon such movements the random background noise randomly varies, and only the parallax moire shape itself is not varied randomly but rather evolves continuously, and thus it remains clearly visible against the randomly varying background noise. This further improves the protection provided by the compound layer, since it prevents the appearance of the moire shape in counterfeits made by simple image acquisition (e.g. in a photocopy).

In addition, it is also possible to mask the base layer, for example by superposing on it masking patterns as described by Amidror and Hersch in U.S. Pat. No. 5,995,638. In this case the s-random base layer is masked by tiny patterns, hiding the moire shape instance when the compound layer does not move, and showing the moire shape instance dynamically evolving and moving along its trajectory when the compound layer is tilted. This can completely prevent the appearance of the moire shape when the compound layer does not move and make it appear only upon tilting of the compound layer (or movements of the observer).

In the case where the base layer is embodied by a diffractive device creating interference colors (rainbow colors), the background random noise shows scrambled rainbow color elements. When tilting the compound layer, a clearly appearing moire shape instance is formed by rainbow colors which dynamically evolve and/or move along a trajectory.

In the case where the base layer is embodied by an optically variable device (OVD) creating different light intensities, the background random noise shows scrambled intensity variations. When tilting the compound layer, a clearly visible moire shape instance is formed by light intensities which dynamically evolve and/or move along a trajectory.

The base layer may also be embodied by juxtaposed color elements (see section "the multichromatic case"). In such a case, the background random noise shows scrambled color elements, such as small color strokes or stains, giving the impression of an artistic creation. When tilting the compound layer, a clearly appearing moire shape instance is formed by color shapes which dynamically evolve and possibly move along a trajectory.

Figure 23B:
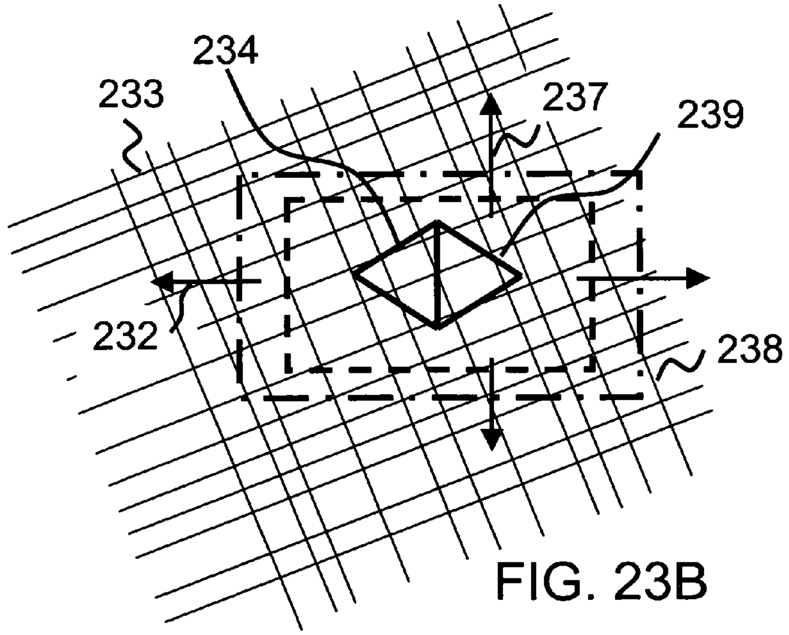
FIG. 23B shows the same compound layer as in FIG. 23A at the tilt angle where the two moire shapes 234 and 239 become adjacent and merge into a composed moire shape.

Aggregation of Several Different Sets of Base Layers and Revealing Layers by Superposition or Juxtaposition As shown in Example 7, it is possible to aggregate within a base layer, respectively revealing layer, several sets of base bands, respectively sets of revealing lines, by complete superposition, partial superposition or juxtaposition. In the corresponding compound layer, each set of base bands and set of revealing lines produces its own moire element, defined by its shape, its layout and the way it moves when tilting the compound layer. The different moire shape movements of the layer composition (aggregation) may be coordinated as in Example 7 (FIGS. 23A and 23B) or they may be independent of one another. In the case they are independent of one another, each of the partially overlapping sub-domains may generate its respective moire shape and moire movement.

Figure 28:
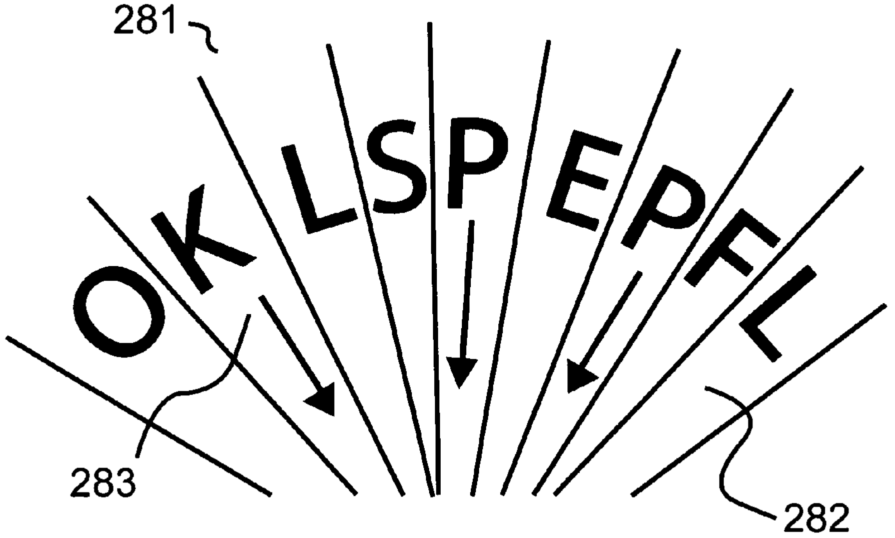
FIG. 28 shows schematically a moire shape 283 formed by small juxtaposed sub-domains 282 having different s-random base and revealing layer layout properties, with the moire shapes moving in a coordinated manner when tilting the compound layer.

A strong means of individualizing and increasing the protection of a document against counterfeits consists in dividing the domain (FIG. 28, 281) where the moire shape appears into small juxtaposed sub-domains 282, with each sub-domain having its own layout properties: s-random displacement vector, underlying vertical base layer period $t_y$, underlying revealing layer period $T_r$, rectilinear, or geometrically transformed base and/or revealing layer, selected geometric transformation and corresponding geometric transformation parameters. The sub-domains contribute to the formation of a single dynamic target moire shape (e.g. in FIG. 28, "OK LSP EPFL", 283) moving together in a coordinated manner when tilting the compound layer with the aggregated sets of base bands and revealing lines.

A similar aggregation of the base and revealing layers can be also done in the 2D case.

Such an aggregation of sub-domains may be created by the software that creates the base and revealing layers, by creating many different variants for the base and revealing layers. These variants are created by varying layout properties while keeping the same target moire properties (moire height, moire displacement, geometric transformation from curvilinear moire to rectilinear moire). Layout properties that can vary are, for example: the geometric transformation and its transformation parameters applied to the set of revealing elements (1D: revealing lines; 2D: revealing dots) as well as the s-random displacement values (s-random displacement vector comprising one (1D) or a pair of displacement values per entry (2D)). The different variants generate the same moire, and the same moire displacement. Then, sub-domains can be cut out in each of the variants and assembled together to form the aggregated base and revealing layers of the compound layer. In addition, the resulting aggregated revealing layer, formed by the assembly of the different sub-domains, can be stored in digital form on a computer server in order to serve as an authenticating revealing layer (see next section).

Authenticating of a Compound Layer by an Authenticating Revealing Layer

The authenticity of a compound layer (possibly made of a base layer and a revealing layer with partially superposed or with juxtaposed sub-domains, as explained in the previous section) can be verified by superposing on the compound layer (e.g. FIG. 5B, 54) an additional authenticating revealing layer (e.g. FIG. 5B, 55) with layout parameters, and s-random displacement values known to be authentic. If the exact superposition of the authenticating revealing layer with the compound layer allows to reveal the correct moire shape(s), then that compound layer is authentic. Such an authenticating revealing layer may be made of transparent elements (in the 1D case: transparent lines; in the 2D case: transparent dots) on an opaque layer, e.g. a printed transparency, a film, or a computer driven translucid display. Alternatively, microlenses may be used (in the 1D case: 1D microlenses; in the 2D case: 2D microlenses) as authenticating revealing layer.

Since the authenticating revealing layer is available only to authorized persons, and since it may be very hard to deduce from a compound layer (e.g. with a revealing layer produced with 1D microlenses having an underlying period lower than 100 microns), this compound layer authentication procedure is robust. The authenticating revealing layer may be also made available to authorized persons by a Web server (digital files to be printed on film, on transparencies or by an device capable of printing or depositing lenses), upon secure login and identification of the authorized person.

Authenticating of a Compound Layer by an Image Acquisition Device Hooked onto a Computing Device A compound layer, possibly made of aggregated sets of base layers and of revealing layers, may also be authenticated by image acquisition and by processing the acquired moire image with an authentication software. The authentication software may verify the presence of the moire shapes, for example with template matching techniques well known in the art, and/or verify that the revealing layers on the compound layer are those of the authentic document.

Figure 29:
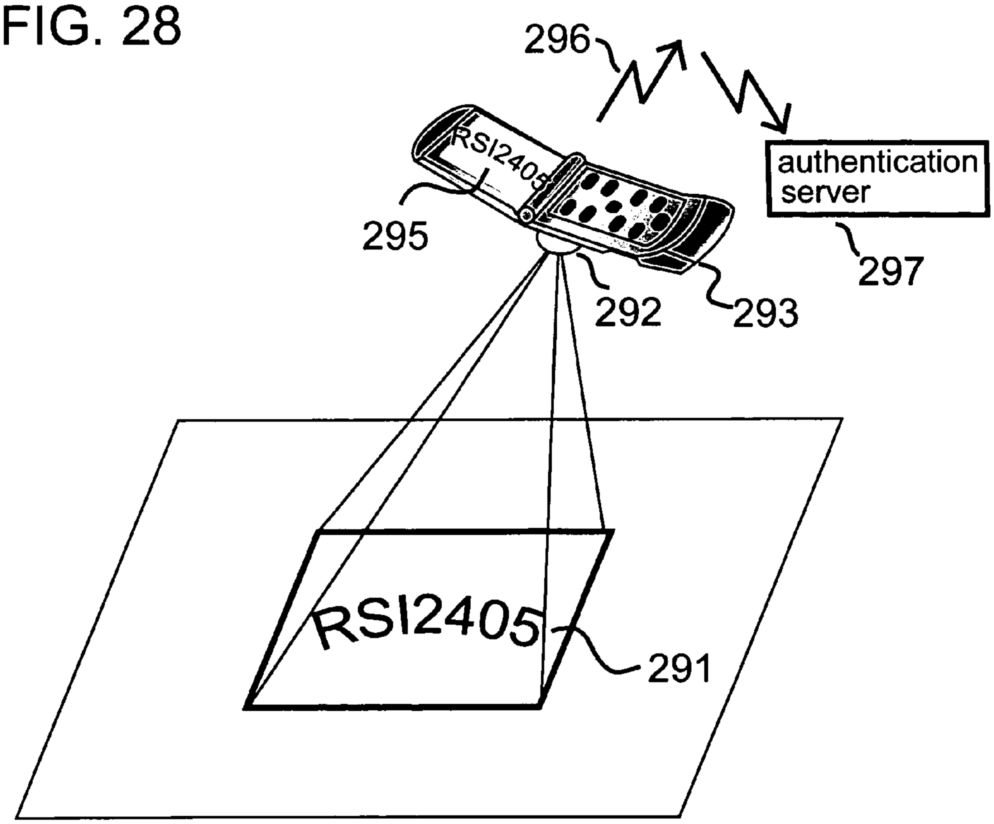
FIG. 29 shows an example of a computing device connected to an image acquisition device, embodied by a cellular phone with integrated camera, for authenticating a compound layer.

In an additional embodiment, the digital authenticating revealing layer is made available to the authenticating software in digital form, e.g. by secure transfer from a Web server. The moire shape image (e.g. FIG. 29, 291) produced by the compound layer, either in reflectance mode or in transmittance mode, is digitized by an image acquisition device (e.g. a scanner, digital camera or a cellular phone with a digital camera, see FIG. 29, respectively 293 and 292).

Figure 30:
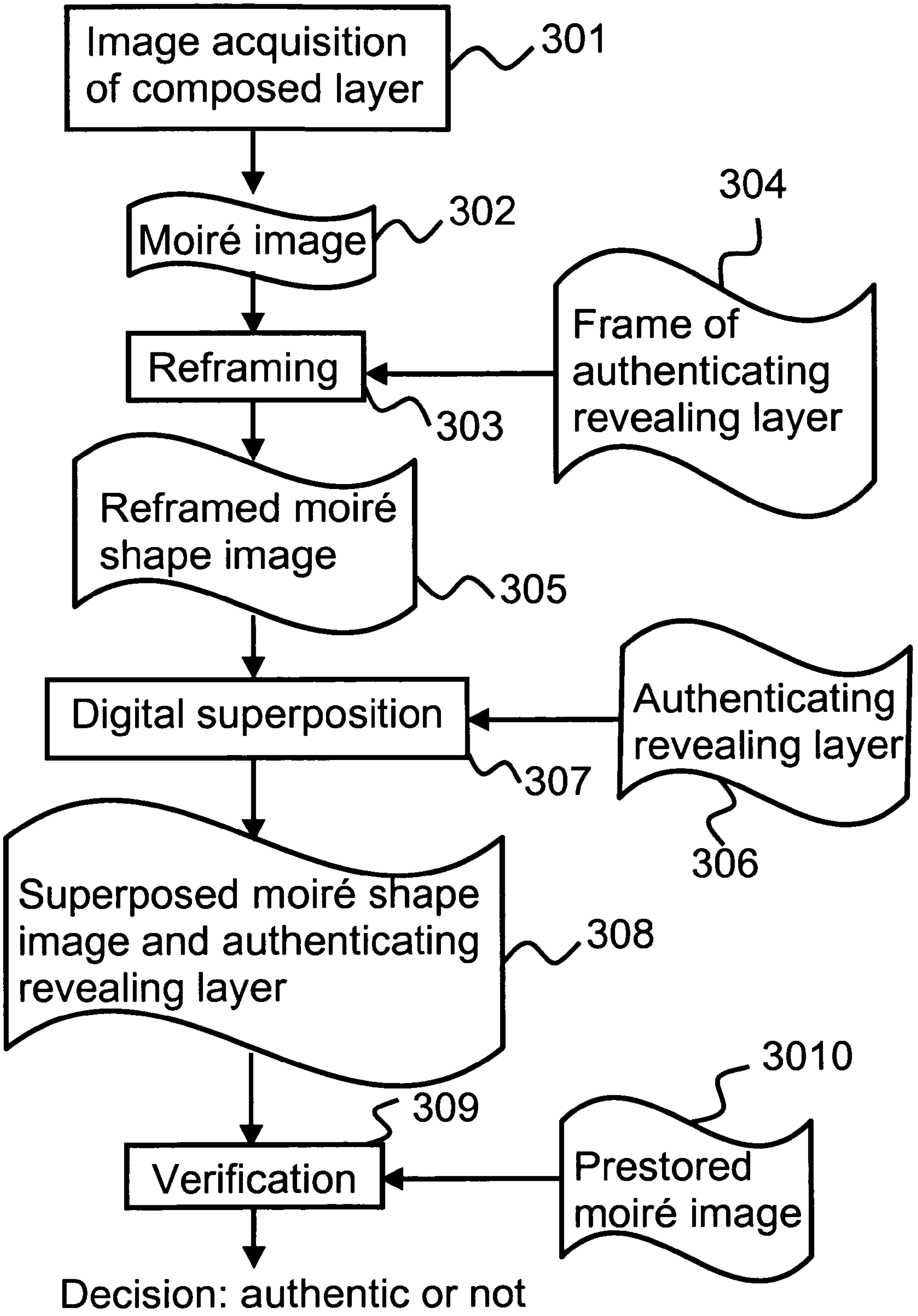
FIG. 30 shows the main steps performed by s-random moire authentication software running on a computing device connected to an image acquisition device performing the image acquisition of the compound layer.

The authentication of the compound layer by the authenticating software can be carried out, for example, as shown in FIG. 30, by 1. reframing 303 the digitized moire shape image by rotation, scaling and resampling so as to put it within the same frame 304 as the authenticating revealing layer;
2. digitally superposing the reframed acquired moire shape image 305 with the digital authenticating revealing layer 306 for example by cross-correlation to ensure an optimal relative phase between the two, followed by a pixel by pixel multiplication operation at the optimal phase;
3. verifying 309 on the digital superposition 308 by known template matching techniques the presence of one of the prestored moire shape images 3010; and
4. according to the verification, deciding if the compound layer is authentic or not.

The authenticating software may be executed on a computing device such as a computer, a portable cellular telephone or a hand-held communicating pen computer. The image acquisition means may be embodied by a separate camera, by a desktop scanner or by the digital photograph capturing device (FIG. 29, 292) integrated into a portable cellular telephone 293 or into a pen computer, or any similar device.

Authenticating of a Compound Layer by Communicating with a Distant Server

Another possibility of authenticating a compound layer consists in acquiring the information expressed by the moire shapes (FIG. 29, 291), transmitting it 296 to a remote authentication server 297 (e.g. through the Web) and obtaining from the authentication server the answer stating whether the transmitted information is valid or not. The acquisition of information expressed by the moire shapes can be carried out by acquiring the image of the moire shapes 295 and transmitting it to the authentication server or by extracting from the moire shapes the information (for example, in FIG. 29, the "RSI2405" message to be validated) and by transmitting that information to the authentication server. This can be performed automatically, by software recognizing the typographic characters forming the message to be validated. It can also be performed by a human operator typing the message into a communicating device (laptop computer, pen computer, portable phone, etc.). Finally, the moire shapes may, instead of forming alphanumeric characters, form 1D or 2D bar codes, directly scannable and recognizable by bar code readers hooked onto a communicating computer. Here also, the communicating computer transmits the recognized barcode content to the authentication server for validation.

The Multichromatic Case

As previously mentioned, the present invention is not limited only to the monochromatic case; on the contrary, it may largely benefit from the use of different colors in any of the dot-screens or base band gratings being used.

One way of using colored dot-screens (or base band gratings) in the present invention is similar to the standard multichromatic printing technique, where several (usually three or four) dot-screens (or base band gratings) of different colors (usually: cyan, magenta, yellow and black) are superposed in order to generate a full-color image by halftoning. As it is already known in the art, if the layers being used for the different colors are independent (i.e. non-correlated) s-random dot screens (or s-random base band gratings), no moire artifacts are generated between them, even if the number of color layers exceeds the standard number of three or four. If one of these colored random layers is now used as a random base layer according to the present invention, the moire intensity profile that will be generated with a corresponding random revealing layer will closely approximate the color of the color base layer.

Another possible way of using colored dot-screens (or base band gratings) in the present invention is by using a base layer whose individual elements are composed of sub-elements of different colors, as disclosed by Amidror and Hersch in their previous U.S. Pat. No. 5,995,638, also shown in FIGS. 14A-14C therein. An important advantage of this method as an anticounterfeiting means is gained from the extreme difficulty in printing perfectly juxtaposed sub-elements of the screen dots (or base bands), due to the high precision it requires between the different colors in multi-pass color printing. Only the best high-performance security printing equipment which is used for printing security documents such as banknotes is capable of giving the required precision in the alignment (hereinafter: "registration") of the different colors. Registration errors which are unavoidable when counterfeiting the document on lower-performance equipment will cause small shifts between the different colored sub-elements of the basic screen elements; such registration errors will be largely magnified by the moire effect, and they will significantly corrupt the form and the color of the moire profiles obtained by the revealing layer.

Hence, counterfeiters trying to counterfeit the color document by printing it using a standard printing process will also have, in addition to the problems of creating the base layer, problems of color registration. Without correct color registration, the base layer will incorporate distorted screen dots (or basebands). Therefore, the intensity profile of the moire in a counterfeited document will clearly distinguish itself, in terms of form and intensity as well as in terms of color, from the moire profile obtained in an authentic document. Since counterfeiters will always have color printers with less accuracy than the official bodies responsible for printing the original valuable documents (banknotes, checks, etc.), the disclosed authentication method remains valid even with the quality improvement of color reproduction technologies.

One possible way for printing color images using standard or non-standard color inks (standard or non-standard color separation) has been described in U.S. Pat. No. 7,054,038 (Ostromoukhov, Hersch) and in the paper "Multi-color and artistic dithering" by V. Ostromoukhov and R. D. Hersch, SIGGRAPH Annual Conference, 1999, pp. 425-432. This method, hereafter called "multicolor dithering", uses dither matrices similar to standard dithering, and provides for each pixel of the base layer (the halftoned image) a means for selecting its color, i.e. the ink, ink combination or the background color to be assigned for that pixel. A random or geometric transformation can be then applied to this dither matrix in the same way as in the monochromatic case. It should be noted, as explained in detail in the above mentioned references, that the multicolor dithering method ensures by construction that the contributing colors are printed side by side. This method is therefore ideal for high-end printing equipment that benefits from high registration accuracy, and that is capable of printing with non-standard inks, thus making the printed document very difficult to counterfeit, and easy to authenticate by means of the disclosed method, as explained above.

Another advantage of the multichromatic case is obtained when non-standard inks are used to create the base layer. Non-standard inks are often inks whose colors are located out the gamut of standard cyan magenta and yellow inks. Due to the high frequency of the colored patterns located in the base layer and printed with non-standard inks, standard cyan, magenta, yellow and black reproduction systems will need to halftone the original color, thereby destroying the original color patterns. Due to the destruction of the microstructure of the base layer, the revealing layer will not be able to yield the original moire effects. This provides an additional protection against counterfeiting.

Finally, using special inks that are visible under ultra-violet light (hereinafter called UV inks) for printing the base layer allows to reveal moire images under UV light, but may either hide them completely or partially under normal viewing conditions. If UV inks which are partly visible under day light are combined with standard inks, for example by applying the multicolor dithering method cited above, photocopiers will not be able to extract the region where the UV ink is applied and therefore potential counterfeiters will not be able to generate the base layer. In the resulting counterfeited document, no moire image will appear under UV light.

Embodiments of Base and Revealing Layers

The base layer and the revealing layer may be embodied using a large variety of technologies. For example, the layers (the base layer, the revealing layer, or both) can be generated by offset printing, ink-jet printing, dye sublimation printing, foil stamping, etc. The layers may be also obtained by a complete or partial removal of matter, for example by laser or chemical etching or engraving.

The revealing layer can be embodied by an opaque film or plastic support incorporating a set of transparent lines (in the 1D case) or a set of pinholes (in the 2D case).

In another embodiment, the revealing layer may be made of a microlens structure, namely, an s-random microlens array (in the 2D case) or an s-random 1D microlens array (in the 1D case). Microlens arrays are composed of a multitude of tiny lenslets that are traditionally arranged in a periodic structure (see, for example, "Microlens arrays" by Hutley et al., Physics World, July 1991, pp. 27-32), but they can be also arranged on any s-random grid. They have the particularity of enlarging on each grid element only a very small region of the underlying source image, and therefore they behave in a similar manner as screens comprising small transparent dots or pinholes. Similarly, cylindric microlens arrays (1D microlens arrays) behave in a similar way as line gratings comprising thin transparent line slits. However, microlens structures have the advantage of letting most of the incident light pass through the structure. They can therefore be used for producing moire intensity profiles either by reflection or by transmission. It should be noted that the role of microlens arrays in generating moire effects where a periodic microlens array is superposed on a periodic array of identical objects having the same pitch is known since long ago (see, for example, "New imaging functions of moire by fly's eye lenses" by O. Mikami, Japan Journal of Applied Physics, Vol. 14, 1975, pp. 417-418, and "New image-rotation using moire lenses" by O. Mikami, Japan Journal of Applied Physics, Vol. 14, 1975, pp. 1065-1066). But none of these known references disclosed an implementation of this phenomenon for document authentication and anti-counterfeiting. Furthermore, none of them has forseen, as the present inventors did, the possibility of using real halftoned images with full gray levels or colors as base layers, or the possibility of using s-random microlens structures and s-random base layers—neither for document authentication and anti-counterfeiting nor for any other purpose.

It should be noted that it is also possible to emulate a microlens array with a diffractive device made of Fresnel Zone Plates (see B. Saleh, M. C. Teich, Fundamentals of Photonics, John Wiley, 1991, p. 116). In a similar way, one may also use instead of cylindric microlenses a diffractive device emulating the behavior of cylindric microlenses.

In the case that the base layer is incorporated into an optically variable surface pattern, such as a diffractive device, Kinegram, etc., the image forming the base layer needs to be further processed to yield for each of its pattern image pixels or at least for its active pixels (e.g. black or white pixels) a relief structure made for example of periodic function profiles (such as gratings of tiny lines) having an orientation, a period, a relief and a surface ratio according to the desired incident and diffracted light angles, according to the desired diffracted light intensity and possibly according to the desired variation in color of the diffracted light in respect to the diffracted color of neighbouring areas (see for example U.S. Pat. No. 5,032,003 (Antes) and U.S. Pat. No. 4,984,824 (Antes and Saxer)). This relief structure is reproduced on a master structure used for creating an embossing die. The embossing die is then used to emboss the relief structure incorporating the base layer on the optical device substrate (further information can be found, for example, in U.S. Pat. No. 4,761,253 (Antes) or in the chapter "Document Protection by Optically Variable Graphics (Kinegram)" in [Renesse98 pp. 247-266].

It should be noted that in general the base and the revealing layers need not be complete: they may be masked by additional layers or by random shapes. Nevertheless, when tilting the compound layer, the moire patterns will still become apparent.

Furthermore, the base layer can be diffusely reflecting, in order to be viewed in reflection mode, or partially transparent, in order to be viewed in transmission mode.

As already illustrated in the sub-section "Personalization/individualization of pairs of s-random base and revealing layers" above, the compound layer can be produced in many different ways. In one possible variant, the base layer and the revealing layer can be deposited on the document successively by the entity (official government office, credit card company, etc.) which issues the personalized document (passport, identity card, driving license, credit card, etc.). In a second possible variant, the base layer is pre-printed by a centralized office or printing facility on the paper (or substrate) that will be used later to produce the individual documents, and the revealing layer is affixed or deposited on top of it only later, for example in one of several local offices that issue the final documents to the public. In a further variant, the revealing layer is pre-deposited (engraved, etched, embossed, etc.) on one face of the substrate by the manufacturer of the substrate (plastic card, etc.), and the base layer is later printed on the opposite face of the substrate, for example in one of several offices that issue the final product to the public. These variants are provided here by way of example only, in a non-restrictive manner, and it should be understood that many other embodiments, configurations and variants may be also conceived which are covered by the present invention.

Any attempt to counterfeit a document produced in accordance with the present invention by photocopying, by means of a desk-top publishing system, by a photographic process, or by any other counterfeiting method, be it digital or analog, will inevitably influence (even if slightly) the size or the shape of the tiny screen dots or base bands of the base layer comprised in the document (for example, due to dot-gain or ink-propagation, as is well known in the art). But since moire effects are very sensitive to any microscopic variations, this makes any document protected according to the present invention very difficult to counterfeit, and serves as a means to distinguish between a real document and a counterfeited one.

Various embodiments of the present invention can be used as security devices for the protection and authentication of multimedia products, including music, video, software products, etc. that are provided on optical disk media. Various embodiments of the present invention can be also used as security devices for the protection and authentication of other industrial packages, such as boxes for pharmaceutics, cosmetics, alcoholic beverages, etc.

Advantages of the Present Invention

The new authentication and anti-counterfeiting methods and devices disclosed in the present invention have numerous advantages.

First, random (and optionally geometrically transformed) dot-screens or base band gratings are much more difficult to design than their repetitive counterparts, and therefore they are very hard to reverse engineer and to counterfeit.

Second, a major advantage of the 2D or 1D random moire methods in the present invention is in their built-in encryption system due to the arbitrary choice of the s-random number sequences for the generation of the specially designed s-random dot screens, respectively base band gratings, that are used in this invention. This provides an additional protection at the same price.

Thirdly, the validity of the compound layer's encryption can be separately checked by a separate authenticating revealing layer, having the same layout as the revealing layer.

The present invention also presents a significant advantage with respect to the previous U.S. Pat. No. 7,058,202 (Amidror). In this patent the base layer and the revealing layer are random dot screens (or microlens arrays) that can be freely moved on top of each other, so that the resulting single instance of the moire effect freely moves accordingly. In the present invention, however, the two layers are fixed together, and thus the layer superposition (fixed setup) can be manufactured such that the single instance of the moire effect is generated in the center of the zone of interest (e.g. window on the document); and since the two random layers are fixed together, the moire effect cannot move too much away or scroll outside this region, and thus disappear to the eye. Moreover, the high registration that is required between the two layers of the fixed setup to guarantee the centering of the moire effect provides a further major difficulty for potential counterfeiters, and thus offers a further degree of security against counterfeiting.

Furthermore, the fact that moire effects generated by superposing tiny base layer elements and revealing layer sampling elements are very sensitive to any microscopic variations in the layers makes any document protected according to the present invention very difficult to counterfeit, and serves as a means to easily distinguish between a real document and a counterfeited one.

Since the mathematical theory used for the design of 2D or 1D moires allows, for a given moire layout, to freely choose the layout of the revealing layer, one may optimize the layouts of the base and the revealing layers so as to reveal details which are only printable at the high resolution and with the possibly non-standard inks of the original printing device. Lower resolution devices or devices which do not print with the same inks as the original printing device will not be able to print these details and therefore no valid moire effect will be generated.

A base layer that is designed in accordance with the present invention may be populated with opaque color patterns printed side by side at a high registration accuracy, for example with the method described in U.S. Pat. No. 7,054,038 (Ostromoukhov, Hersch). Since the moire effects are very sensitive to any microscopic variations of the pattern residing in the base layer, any document protected according to the present invention is very difficult to counterfeit. The revealed moire patterns serve as a means to easily distinguish between a real document and a falsified one.

A further important advantage of the present invention is that it can be used for authenticating documents printed on any kind of support, including paper, plastic materials, diffractive devices (e.g. holograms or kinegrams) etc., which may be opaque, semi-transparent or transparent. Furthermore, the present invented method can be incorporated into halftoned B/W or color images (simple constant images, tone or color gradations, or complex photographs), and it can be even incorporated into the background of security documents (for example by placing the base layer or the entire fixed setup in the background and by allowing to write or print on top of it). In a further embodiment, the halftoned image may also be visible in the back side of the document, while in the front side, when looking through the revealing layer, only the moire parallax effect is visible.

Furthermore, the random base layers printed on the document in accordance with the present invention need not be of a constant intensity level. On the contrary, they may include base layer elements of gradually varying sizes and shapes, and they can be incorporated (or dissimulated) within any variable intensity halftoned image on the document (such as a portrait, landscape, or any decorative motif, which may be different from the motif generated by the moire effect in the superposition). This has the advantage of making counterfeiting still more difficult, thus further increasing the security provided by the present invention.

One of the most characteristic properties of all of our moire based methods (2D or 1D, repetitive or random), including the new methods of the present disclosure, and which clearly distinguishes them from other moire based methods such as phase modulation methods (see the section "Background of the invention"), is the dynamic nature of the resulting moire intensity profiles. In the present invention, any tilting or change of viewing angle causes the resulting moire effect (2D or 1D) to gradually scroll across the superposition, increase or decrease, rotate, or undergo other spectacular dynamic transformations (depending on the case and on the geometric transformations undergone by the base layer and the revealing layer). This inherent dynamic behaviour of the moire intensity profiles makes them very spectacular and very easy to recognize by the observer, and hence particularly useful for the authentication of documents and valuable products in many different configurations.

Moreover, thanks to the availability of an unlimited number of geometric transformations and transformation variants (e.g. different values for the transformation constants), one may create classes of documents where each class of documents has its own individualized or personalized document protection. Thanks to the unlimited number of geometric transformations being available, a large number of base layer and revealing layer designs can be created according to different criteria. For example, the triplet formed by base layer layout, revealing layer layout and moire layout may be different for each individual document, for each class of documents or for documents issued within different time intervals. The immense number of variations in base layer layout, revealing layer layout and moire layout makes it very difficult for potential counterfeiters to counterfeit documents whose layouts may vary according to information located within the document or according to time.

In addition, different pairs of base and revealing layers may be juxtaposed, partially superposed or completely superposed to yield moires shapes which either move independently of one another, or move in a coordinated manner, for example by coming together and forming a composed shape at a certain tilt angle of the compound layer.

Furthermore, if the compound layer is designed to include sufficiently strong background random noise (for example by an appropriate choice of the s-random sequence being used), then the resulting moire effect completely disappears within the random background noise, and it can only be seen upon tilting movement of the compound layer (or movements of the observer). This prevents the appearance of the moire shape in simple image acquisitions such as photocopies and digitized images.

Finally, the acquired moire shapes may represent information, such as a succession of letters or digits, which, when entered or transferred to an authenticating Web server, allow, according to the reply of the Web server, to validate or not the information appearing as moire shapes and therefore to authenticate the valuable item displaying these moire shapes.

REFERENCES CITED

U.S. Patent Documents

U.S. Pat. No. 5,995,638 (Amidror, Hersch), November 1999. Methods and apparatus for authentication of documents by using the intensity profile of moire patterns.

U.S. Pat. No. 6,249,588 (Amidror, Hersch), June 2001. Method and apparatus for authentication of documents by using the intensity profile of moire patterns.

U.S. Pat. No. 6,819,775 (Amidror, Hersch), November 2004. Authentication of documents and valuable articles by using moire intensity profiles.

U.S. Pat. No. 7,058,202 (Amidror), June 2006. Authentication with built-in encryption by using moire intensity profiles between random layers.

U.S. Pat. No. 7,194,105 (Hersch and Chosson), March 2007. Authentication of documents and articles by moire patterns.

U.S. patent application Ser. No. 10/879,218 (Hersch and Chosson) filed Jun. 30 2004. Model-based synthesis of band moire images for authenticating security documents and valuable products.

U.S. patent application Ser. No. 11/349,992 (Hersch and Chosson) filed Feb. 9, 2006. Model-based synthesis of band moire images for authentication purposes.

U.S. Pat. No. 7,295,717 (Hersch et al.), November 2007. Synthesis of superposition images for watches, valuable articles and publicity.

U.S. Pat. No. 7,305,105 (Chosson and Hersch), December 2007. Authentication of secure items by shape level lines.

U.S. Pat. No. 5,018,767 (Wicker), May 1991. Counterfeit protected document.

U.S. Pat. No. 5,275,870 (Halope et al.), January 1994. Watermarked plastic support.

U.S. Pat. No. 5,396,559 (McGrew), March 1995. Anticounterfeiting method and device utilizing holograms and pseudorandom dot patterns.

U.S. Pat. No. 5,708,717 (Alasia), January 1998. Digital anticounterfeiting software method and apparatus.

U.S. Pat. No. 5,999,280 (Huang), December 1999. Holographic anti-imitation method and device for preventing unauthorized reproduction.

U.S. Pat. No. 6,494,491 (Zeiter et al.), December 2002. Object with an optical effect.

U.S. Pat. No. 5,712,731 (Drinkwater et al.), January 1998. Security device for security documents such as bank notes and credit cards.

U.S. Pat. No. 7,333,268 (Steenblik et al.), February 2008, Micro-optic security and image presentation system.

U.S. patent application Ser. No. 11/771,623 (Steenblik et al.) filed Jun. 29, 2007. Micro-optic security and image presentation system for a security device.

U.S. patent application Ser. No. 11/770,592, (Steenblik et al.), Micro-optic security and image presentation system, filed Jun. 28, 2007

U.S. Pat. No. 7,468,842 (Steenblik et al.), December 2008, Image presentation and micro-optic security system.

U.S. Pat. No. 7,265,775 (Hirayama), September 2007. Three dimensional display apparatus.

U.S. Pat. No. 2,432,896 (Hotchner), December 1947. Retroreflective animation display.

U.S. Pat. No. 2,833,176 (Ossoinak), May 1958. Arrangement for the exhibition of dynamic scenes to an observer in movement with respect to a screen.

U.S. Pat. No. 6,286,873 (Seder), September 2001. Visual display device with continuous animation.

U.S. Pat. No. 5,113,213 (Sandor et al.), May 1992. Computer-generated autostereography method and apparatus.

U.S. Pat. No. 4,761,253 (Antes), August 1988. Method and apparatus for producing a relief pattern with a microscopic structure, in particular having an optical diffraction effect.

U.S. Pat. No. 5,032,003 (Antes), July 1991. Optically variable surface pattern

U.S. Pat. No. 4,984,824 (Antes and Saxer), January 1991. Document with an optical diffraction safety element.

U.S. Pat. No. 7,054,038 (Ostromoukhov, Hersch), May 2006. Method and apparatus for generating digital halftone images by multi color dithering.

Foreign Patent Documents

United Kingdom Patent No. 1,138,011 (Canadian Bank Note Company), December 1968. Improvements in printed matter for the purpose of rendering counterfeiting more difficult.

United Kingdom Patent Application No. 2,224,240 A (Kenrick & Jefferson), May 1990. Copy protection of multicolor documents.

Other Publications

Fourier-based analysis and synthesis of moires in the superposition of geometrically transformed periodic structures, by I. Amidror and R. D. Hersch; Journal of the Optical Society of America A, Vol. 15, 1998; pp. 1100-1113.

The Theory of the Moire Phenomenon, by I. Amidror, Kluwer Academic Publishers, 2000.

The Theory of the Moire Phenomenon, Vol. II: Aperiodic layers, by I. Amidror, Springer, published May 2007.

A Generalized Fourier-Based Method for the Analysis of 2D Moire Envelope-Forms in Screen Superpositions, by I. Amidror; Journal of Modern Optics, Vol. 41, No. 9, 1994; pp. 1837-1862.

Moire patterns between aperiodic layers: quantitative analysis and synthesis, by I. Amidror; Journal of the Optical Society of America A, Vol. 20, No. 10, 2003; pp. 1900-1919.

Glass patterns as moire effects: new surprising results, by I. Amidror; Optics Letters, Vol. 28, 2003; pp. 7-9.

Glass patterns in the superposition of random line gratings, by I. Amidror; Journal of Optics A, Vol. 5, 2003; pp. 205-215.

Unified approach for the explanation of stochastic and periodic moires, by I. Amidror; Journal of Electronic Imaging, Vol. 12, No. 4, 2003; pp. 669-681.

Moire patterns and the illusion of depth, by J. Huck; Proc. of the fifth Interdisciplinary Conf. of the International Soc. of the Arts, Mathematics and Architecture (ISAMA 2004), Chicago, June 2004.

Theory of parallax barriers, by S. H. Kaplan; Journal of the SMPTE, Vol. 59, No. 7, 1952, pp. 11-21.

Microlens arrays, by M. Hutley et al.; Physics World, July 1991; pp. 27-32.

New imaging functions of moire by fly's eye lenses, by O. Mikami; Japan Journal of Applied Physics, Vol. 14, No. 3, 1975; pp. 417-418.

New image-rotation using moire lenses, by 0. Mikami; Japan Journal of Applied Physics, Vol. 14, No. 7, 1975; pp. 1065-1066.

Optical Document Security, ed. R. van Renesse, Artech House, 1998 (Second Edition), pp. 207-211.

Multi-color and artistic dithering, by V. Ostromoukhov and R. D. Hersch; SIGGRAPH Annual Conference, 1999, pp. 425-432.

Fundamentals of Photonics, by B. Saleh and M. C. Teich, John Wiley, 1991, p. 116.

Band moiré images, by R. D. Hersch and Sylvain Chosson; Proc. SIGGRAPH 2004, pp. 239-248.

We claim:

1. A method for creating counterfeit-resistant valuable documents and articles relying on a compound layer displaying a dynamically evolving moire shape, said compound layer comprising an s-random base layer and an s-random revealing layer, the method comprising the steps of:

a) generating the element positions of the s-random base layer according to base layer layout parameters and base layer s-random displacement values;

b) generating the element positions of the s-random revealing layer according to revealing layer layout parameters and s-random displacement values derived from said base layer s-random displacement values;

c) creating the s-random base layer by associating to each position in the layout of the s-random base layer an instance of a base layer element shape;

d) creating the s-random revealing layer by associating to each position in the layout of the s-random revealing layer an instance of a revealing layer sampling element;

e) forming the compound layer by superposing the resulting base and revealing layers with a gap between them; and f) integrating the compound layer onto the valuable document, respectively article;

where the compound layer shows, due to the superposition of said s-random base and revealing layers, a single moire shape instance which, when tilting the compound layer in respect to the observation orientation, undergoes a dynamic evolution comprising elements selected from the set of scalings, shearings, rotations, and movements along a trajectory determined by the base layer and revealing layer layout parameters.

2. The method of claim 1, where said s-random displacement values are formed by a set of non-repetitive numbers.

3. The method of claim 1, where said moire shape instance is hidden within background random noise, and becomes clearly visible due to said dynamic evolution only when said compound layer is tilted.

4. The method of claim 3, where the s-random base layer is embodied by a diffractive device, where the background random noise comprises scrambled rainbow color elements, and where, when tilting the compound layer, said clearly visible moire shape instance is formed by rainbow colors which are subject to said dynamic evolution.

5. The method of claim 3, where the s-random base layer is embodied by an optically variable device, where the background random noise comprises scrambled intensity variations, and where, when tilting the compound layer, said clearly visible moire shape instance is formed by light intensities which are subject to said dynamic evolution.

6. The method of claim 3, where the s-random base layer is made of multiple colors, where the background random noise shows scrambled color elements, and where, when tilting the compound layer, said clearly visible moire shape instance is formed by color shapes which are subject to said dynamic evolution.

7. The method of claim 1, where the s-random base layer is masked by tiny patterns, hiding said moire shape instance when the compound layer does not move and showing said moire shape instance dynamically evolving and moving along its trajectory when the compound layer is tilted.

8. The method of claim 1, where the moire shape is formed as a 1D moire characterized by said base layer element shapes positioned at said s-random positions along one dimension.

9. The method of claim 1, where the moire shape is formed as a 2D moire characterized by said base layer element shapes positioned at said s-random positions along two dimensions.

10. The method of claim 1, where vertical tilting yields a substantially horizontal movement of the moire shape instance.

11. The method of claim 1, where horizontal tilting yields a substantially vertical movement of the moire shape instance.

12. The method of claim 1, where the revealing layer is selected from the set of s-random 1D microlens arrays and s-random 2D microlens arrays.

13. The method of claim 1, with additional steps of (i) creating a transformed s-random revealing layer by applying a selected geometric transformation to the yet untransformed s-random revealing layer layout; and (ii) according to a selected geometric transformation of the moire shape instance, and according to said selected geometric transformation applied to the untransformed s-random revealing layer, deducing the corresponding base layer geometric transformation and applying it to the yet untransformed s-random base layer;

where said additional steps allow creating a moire shape instance moving along trajectories selected from the set of rectilinear, radial and curvilinear trajectories.

14. The method of claim 13, where the moire shape is formed as a 1D moire, and the geometric transformations defining the transformed moire shape instance, the transformed s-random base layer and the transformed s-random revealing layer in the transformed coordinate space $(x_t, y_t)$ respect the relationship $$h_x(x_t, y_t) = (g_y(x_t, y_t) - m_y(x_t, y_t)) \cdot \frac{t_x}{T_r} + m_x(x_t, y_t)$$

$$h_y(x_t, y_t) = g_y(x_t, y_t) \cdot \frac{t_y}{T_r} + m_y(x_t, y_t) \cdot \frac{T_r - t_y}{T_r}$$

where $(m_x, m_y)$ express said geometric transformation of the moire shape instance, $g_y$ expresses the revealing layer geometric transformation and $(h_x, h_y)$ express the base layer geometric transformation and where $(t_x, t_y)$ is the baseband layout parameter specifying a replication vector and $T_r$ is the revealing layer layout parameter specifying a revealing layer period.

15. The method of claim 13, where the moire shape is formed as a 2D moire, and the respective geometric transformations defining the transformed moire shape instance, the transformed s-random base layer and the transformed s-random revealing layer respect the relationship $g_R(x,y)=g_M(x,y)-g_B(x,y)$ where $g_M(x,y)$ expresses the geometric transformation of the moire shape instance, $g_R(x,y)$ expresses the revealing layer geometric transformation and $g_B(x,y)$ expresses the base layer geometric transformation.

16. The method of claim 13, where the moire shape is formed as a 1D moire, and the layout of the moire is selected from the set of circular and ellipsoidal layouts and where the moire shape instance moves along a trajectory selected from the set of radial and spiral trajectories.

17. The method of claim 13, where the moire shape is formed as a 2D moire, and a horizontal tilt of the compound layer gives a circular rotation of the moire shape instance, and a vertical tilt of the compound layer gives a radial motion of the moire shape instance.

18. The method of claim 1, where the authenticity of the compound layer is verified by superposing on the compound layer an additional s-random revealing layer whose layout parameters and s-random displacement values are known to be authentic and by checking that the correct moire shape instance is present.

19. The method of claim 18, where checking that the correct moire shape instance is present is carried out by authenticating software.

20. A compound layer incorporated into a valuable item to be protected from counterfeits, said compound layer comprising a base layer of given layout parameters, a revealing layer of given layout parameters and a gap between them, where the base layer is an s-random layer whose base layer element shape instances are placed at base layer positions according to base layer layout parameters and to s-random displacement values, where the revealing layer is an s-random layer whose element positions are derived from the element positions of said base layer, and where, due to the superposition of said base layer and said revealing layer, a single instance of a moire shape appears, that, by tilting the compound layer, undergoes a dynamic evolution comprising elements selected from scalings, rotations, shearings and movements along a trajectory being determined according to the layout parameters of said base and revealing layers and according to the compound layer tilt angles.

21. The compound layer of claim 20, where said s-random displacement values are formed by a set of non-repetitive numbers.

22. The compound layer of claim 20, where at least the base layer is a geometrically transformed layer, where the layout of said moire shape instance is selected from the group of curvilinear and rectilinear layouts and where upon tilting said compound layer, said moire shape trajectory is selected from the set of rectilinear, radial, spiral and curvilinear trajectories.

23. The compound layer of claim 20, whose authenticity is verified by superposing onto it an additional authenticating revealing layer with authentic layout parameters and authentic s-random displacement values and by checking that the correct moire shape instance is present.

24. The compound layer of claim 23, where said authenticating revealing layer is a digital authenticating revealing layer and where checking that the correct moire shape instance is present is performed by authenticating software.

25. The compound layer of claim 20, whose authenticity is verified by transfering information provided by said moire shape instance to a Web authentication server, and by receiving from said Web authentication server a reply specifying whether said information is valid.

26. The compound layer of claim 20, whose authenticity is verified by image acquisition of said moire shape instance and by processing the digitized moire shape instance with an authentication software, said authentication software verifying the presence of said moire shape instance.

27. The compound layer of claim 20, whose base and revealing layers are spatially segmented into multiple juxtaposed sub-domains, each sub-domain having its own layout parameters and s-random displacement values, and where the resulting moire shape produced by the superpositions of respective sub-domains of the base layer and of the revealing layer move together in a coordinated manner when tilting the compound layer.

28. The compound layer of claim 20, whose base and revealing layers are segmented into multiple partially overlapping sub-domains, each sub-domain having its own layout parameters and s-random displacements, and where different sub-domains generate different partially overlapping moire shapes moving along their own trajectories.

29. The compound layer of claim 20, whose base layer element shape instances are formed of juxtaposed colored sub-elements which have the effect of creating a color moire shape.

30. The compound layer of claim 20, whose base layer element shape instance are formed by variable width elements which have the effect of showing a halftone image when said compound layer is viewed from the base layer side and of showing said moire shape when said compound layer is viewed from the revealing layer side.

31. The compound layer of claim 20, whose base layer is created by a process for transferring an image onto a support, said process being selected from the set comprising lithographic, photolithographic, photographic, electro-photographic, engraving, etching, perforating, embossing, ink jet and dye sublimation processes.

32. The compound layer of claim 20, where the base layer is embodied by an element selected from the set of transparent support, opaque support, diffusely reflecting support, paper, plastic, optically variable devices and diffractive devices.

33. The compound layer of claim 20, where the revealing layer is embodied by an element selected from the set of opaque support with transparent lines, opaque support with transparent dots, 1D microlenses, 2D microlenses, and Fresnel zone lenses emulating the behavior of microlenses.

34. The compound layer of claim 20, where said valuable item is an element selected from the group of banknote, check, trust paper, identification card, passport, travel document, ticket, optical disk, DVD, watch, clock, hand-held phone, hand-held computer, perfume, optical disk, software product, medical product, fashion product, industrial product, label affixed on a valuable product, and package of a valuable product.

* * * * *